(12) United States Patent
Sanji et al.

(10) Patent No.: US 9,637,086 B2
(45) Date of Patent: May 2, 2017

(54) SMART SYSTEM

(71) Applicants: DENSO CORPORATION, Kariya, Aichi-pref. (JP); NIPPON SOKEN, INC., Nishio, Aichi-pref. (JP)

(72) Inventors: Kenichiro Sanji, Nishio (JP); Munenori Matsumoto, Kariya (JP); Takatoshi Sekizawa, Obu (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 0 days.

(21) Appl. No.: 14/403,116

(22) PCT Filed: May 23, 2013

(86) PCT No.: PCT/JP2013/003293
§ 371 (c)(1),
(2) Date: Nov. 21, 2014

(87) PCT Pub. No.: WO2013/175799
PCT Pub. Date: Nov. 28, 2013

(65) Prior Publication Data
US 2015/0120085 A1    Apr. 30, 2015

(30) Foreign Application Priority Data

May 25, 2012    (JP) ................................ 2012-119563

(51) Int. Cl.
*B60R 25/00* (2013.01)
*B60R 25/24* (2013.01)
*G07C 9/00* (2006.01)

(52) U.S. Cl.
CPC .............. *B60R 25/00* (2013.01); *B60R 25/24* (2013.01); *G07C 9/00309* (2013.01); *G07C 2009/00555* (2013.01); *G07C 2009/00793* (2013.01)

(58) Field of Classification Search
CPC ...... B60R 25/00; B60R 25/24; G07C 9/00309
See application file for complete search history.

(56) References Cited

U.S. PATENT DOCUMENTS

| 2003/0001723 | A1* | 1/2003 | Masudaya | B60R 25/24 340/5.61 |
| 2006/0273888 | A1 | 12/2006 | Yamamoto | |
| 2008/0079602 | A1* | 4/2008 | King | G08C 17/02 340/12.22 |

FOREIGN PATENT DOCUMENTS

| JP | 2003013644 A | 1/2003 |
| JP | 2006319846 A | 11/2006 |

OTHER PUBLICATIONS

International Search Report and Written Opinion (in Japanese with English Translation) for PCT/JP2013/003293, mailed Jul. 16, 2013; ISA/JP.

* cited by examiner

*Primary Examiner* — Basil T Jos
(74) *Attorney, Agent, or Firm* — Harness, Dickey & Pierce, P.L.C.

(57) ABSTRACT

In a smart system, an onboard system transmits a request signal. A portable device receives the request signal. An LF demodulation portion demodulates the request signal to acquire request data and returns an answer signal based on acquisition of the request data. The onboard system receives the answer signal and performs smart drive based on reception of the answer signal. The onboard system also transmits a specified counter-RA signal. A switching circuit of the portable device outputs the received counter-RA signal to a modulation portion while bypassing the LF demodulation portion. The modulation portion performs RF modulation using the counter-RA signal to acquire a counter-RA modulation signal and transmits the counter-RA modulation signal. When receiving the counter-RA modulation signal, the onboard system determines whether to allow or disallow the smart drive based on delay time of timing to receive the counter-RA modulation signal with reference to timing to transmit the counter-RA signal. This enables to suppress variations in the transmission/reception delay time inherent in the smart system.

10 Claims, 25 Drawing Sheets

SMART SYSTEM

CROSS-REFERENCE TO RELATED APPLICATIONS

This application is a U.S. National Phase Application under 35 U.S.C. 371 of International Application No. PCT/JP2013/003293 filed on May 23, 2013 and published in Japanese as WO 2013/175799 A1 on Nov. 28, 2013. This application is based on and claims the benefit of priority from Japanese Patent Application No. 2012-119563 filed on May 25, 2012. The entire disclosures of all of the above applications are incorporated herein by reference.

TECHNICAL FIELD

The present disclosure relates to a smart system.

BACKGROUND ART

FIG. 39 illustrates a known smart system technology of the related art. According to the technology, a user 91 of a vehicle 90 carries a portable device 92 and approaches the vehicle 90. The portable device 92 receives request signal Req transmitted from the vehicle 90. Based on reception of this request signal Req, the portable device 92 transmits answer signal Ans to the vehicle 90. Based on reception of this request signal Req, the vehicle performs smart drive (either or both unlocking a door of the vehicle 90 and starting a vehicle drive apparatus). A receivable range of request signal Req transmitted from the vehicle 90 is limited to vicinity 93 of the vehicle. The purpose is to prevent the smart drive from being activated when the portable device 92 is distant from the vehicle 90.

Such a smart system technology may be subject to relay station attack (hereinafter referred to as RA) that enables communication between the portable device 92 and the vehicle 90 using a relay station and allows the vehicle 90 to perform smart drive even if the portable device 92 is distant from the vehicle 90.

FIGS. 40 and 41 illustrate the relay station attack. An RA relay station 94 is placed in a communicable range 93 of request signal Req. An RA relay station 95 is placed near a portable device 95. The RA relay station 94 receives request signal Req transmitted from the vehicle 90 and transfers request signal Req to the RA relay station 95. The RA relay station 95 receives the transferred signal and transfers it to the portable device 92. The vehicle 90 directly receives answer signal Ans transmitted from the portable device 92 by way of no relay station as illustrated in FIG. 40 or receives answer signal Ans by way of relay stations 96 and 97 as illustrated in FIG. 41.

Patent document 1 describes the technology that counteracts the relay attack including the RA relay station. The technology uses the fact that the RA relay station performs modulation and demodulation during the transfer to increase the communication relay time. The technology determines intervention of an RA relay station if an increase in the communication relay time differs from an allowable time range of the delay time estimated in the normal smart system operation. The technology thereby inhibits the smart drive.

PRIOR ART DOCUMENT

Patent Document

Patent Document 1: JP 2006-319846 A

SUMMARY OF INVENTION

When the RA relay station 94 transfers the request signal Req to the RA relay station 95 as described above, intervention of the RA relay stations 94 and 95 causes a delay time to be as short as approximately 35 microseconds. On the other hand, the smart system is inherently subject to a large variation (e.g., approximately 100 microseconds) in the delay time during transmission and reception. An error range of variations in the delay time for the smart system covers a delay due to intervention of RA relay stations, if any. Effectively, it is difficult to accurately determine the presence or absence of RA relay station intervention.

The present disclosure has been made in consideration of the foregoing. It is an object of the disclosure to suppress variations in the transmission/reception delay time inherent in a smart system as regards a technology that determines the presence or absence of relay station attack intervention based on a delay time in smart system communication.

According to an aspect of the present disclosure, a smart system includes an onboard system mounted on a vehicle and a portable device carried by a user. The onboard system includes: a first modulation portion that performs modulation in a first modulation system using specified request data; and a first transmission antenna that transmits a request signal resulting from the modulation to the portable device. The portable device includes: a first reception antenna that receives the request signal; a first demodulation portion that performs demodulation in a first demodulation system corresponding to the first modulation system using the request signal received by the first reception antenna; an answer data output portion that outputs specified answer data based on acquisition of the request data resulting from demodulation in the first demodulation portion; a switching portion that outputs the output answer data for transmission; a second modulation portion that performs modulation in a second modulation system using the answer data for transmission output from the switching portion; and a second transmission antenna that transmits an answer signal resulting from the modulation to the onboard system. The onboard system includes a smart drive portion that receives the answer signal and performs smart drive to operate an actuator in the vehicle based on the answer data contained in the received answer signal. The first modulation portion performs modulation using specified counter-RA data according to the first modulation system and the first transmission antenna transmits a counter-RA signal resulting from the modulation to the portable device. The first reception antenna receives the transmitted counter-RA signal. The switching portion outputs the counter-RA signal received by the first reception antenna to the second modulation portion while bypassing the first demodulation portion. The second modulation portion performs modulation according to the second modulation system using the input counter-RA signal. The second transmission antenna transmits a counter-RA modulation signal resulting from the modulation to the onboard system. The onboard system includes an RA determination portion that determines whether to allow the smart drive performed by the smart drive portion based on delay time of timing to receive the counter-RA modulation signal with reference to timing to transmit the counter-RA signal.

The onboard system transmits a counter-RA signal to the portable device. The portable device returns a counter-RA modulation signal to the onboard system. When receiving the counter-RA modulation signal, the onboard system determines whether to allow or disallow the smart drive based on delay time of timing to receive the counter-RA modulation signal with reference to timing to transmit the counter-RA signal.

The portable device acquires the counter-RA modulation signal by outputting the received counter-RA signal to the second modulation portion while bypassing the first demodulation portion. The counter-RA signal is changed to the counter-RA modulation signal and returns to the onboard system without demodulation (demodulation according to the first demodulation system) that is performed on a request signal. Therefore, it is possible to suppress variations in the transmission/reception delay time inherent in the smart system.

BRIEF DESCRIPTION OF DRAWINGS

The above and other objects, features, and advantages of the disclosure will be more apparent from the following detailed description with reference to the accompanying drawings, in which.

DESCRIPTION OF EMBODIMENTS

First Embodiment

Figure 1:
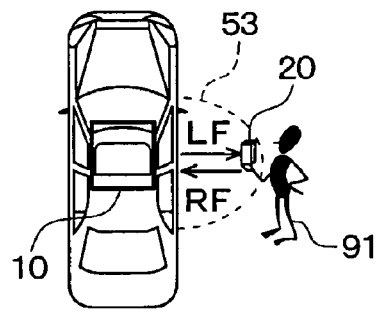
FIG. 1 is a schematic diagram illustrating operation of a smart system according to a first embodiment.

The following describes a first embodiment of the disclosure. With reference to FIG. 1, the following describes an overview of the smart system according to the embodiment. The smart system according to the embodiment includes an onboard system 10 mounted on a vehicle and a portable device 20 carried by a user 91. The onboard system 10 and the portable device 20 perform bidirectional communication with each other. According to a communication result, smart drive is performed to unlock a door of the vehicle and/or start a vehicle drive apparatus (e.g., engine).

Specifically, the onboard system 10 wirelessly transmits a request signal in an LF band (approximately 100 kHz). The portable device 20 receives a request signal if the user 91 approaches the vehicle and the portable device 20 is placed in a request-signal detectable range 53. The portable device 20 determines whether the received request signal contains authentic request data. If authentic request data is contained, the portable device 20 wirelessly transmits an answer signal in an RF band (e.g., 300 MHz band in Japan, North America, Korea, and China or 400 MHz band in Europe). The onboard system 10 receives the answer signal and determines whether the received answer signal contains authentic answer data. If authentic answer data is contained, the onboard system 10 performs smart drive on the vehicle.

The portable device 20 does not transmit an answer signal if the request data is not authentic. The onboard system 10 disables smart drive if the answer data is not authentic. The smart drive is available only if the onboard system 10 and the portable device 20 are authentic. The vehicle transmits an LF band signal to the portable device 20 because a receivable range 53 of LF band signals needs to be limited to the vicinity of the vehicle to disable the smart drive when the portable device 20 is distant from the vehicle.

Such a smart system technology may accompany relay station attack that enables communication between the portable device 20 and the onboard system 10 using a relay station to perform the smart drive even if the portable device 20 is distant from the vehicle.

Figure 2:
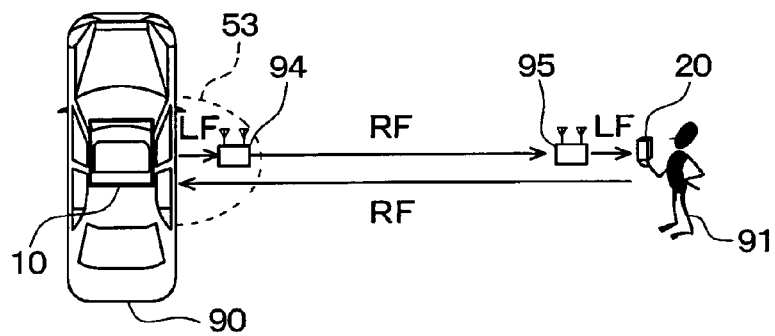
FIG. 2 is a schematic diagram illustrating operation of a smart system in the event of relay station attack intervention.
Figure 3:
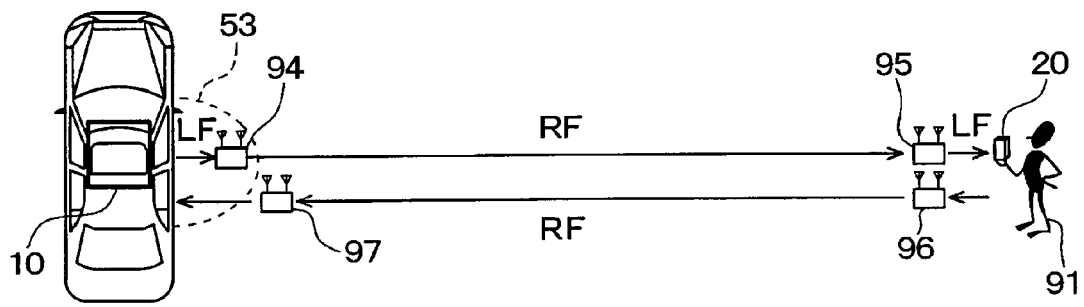
FIG. 3 is a schematic diagram illustrating operation of a smart system in the event of relay station attack intervention.

FIGS. 2 and 3 illustrate the relay station attack. The RA relay station 94 is placed within the communicable range 53 of request signals. The RA relay station 95 is placed near the portable device 20.

The RA relay station 94 receives and demodulates an LF band request signal transmitted from the onboard system 10. The RA relay station 94 performs modulation using demodulated data to convert the LF band request signal into an RF band signal and transmits the RF band signal to the RA relay station 95.

The RA relay station 95 receives and demodulates the RF band signal and performs modulation using demodulated data. The RA relay station 95 thereby restores the LF band request signal and transmits it to the portable device 20. The onboard system 10 directly receives an answer signal transmitted from the portable device 20 by way of no relay station as illustrated in FIG. 2 or receives the answer signal by way of the relay stations 96 and 97 as illustrated in FIG. 3. The relay stations 96 and 97, when used, respectively perform demodulation and modulation.

As illustrated in FIGS. 2 and 3, the embodiment proposes the technology that determines the presence or absence of relay station attack and inhibits the smart drive if the relay station attack occurs.

Figure 4:
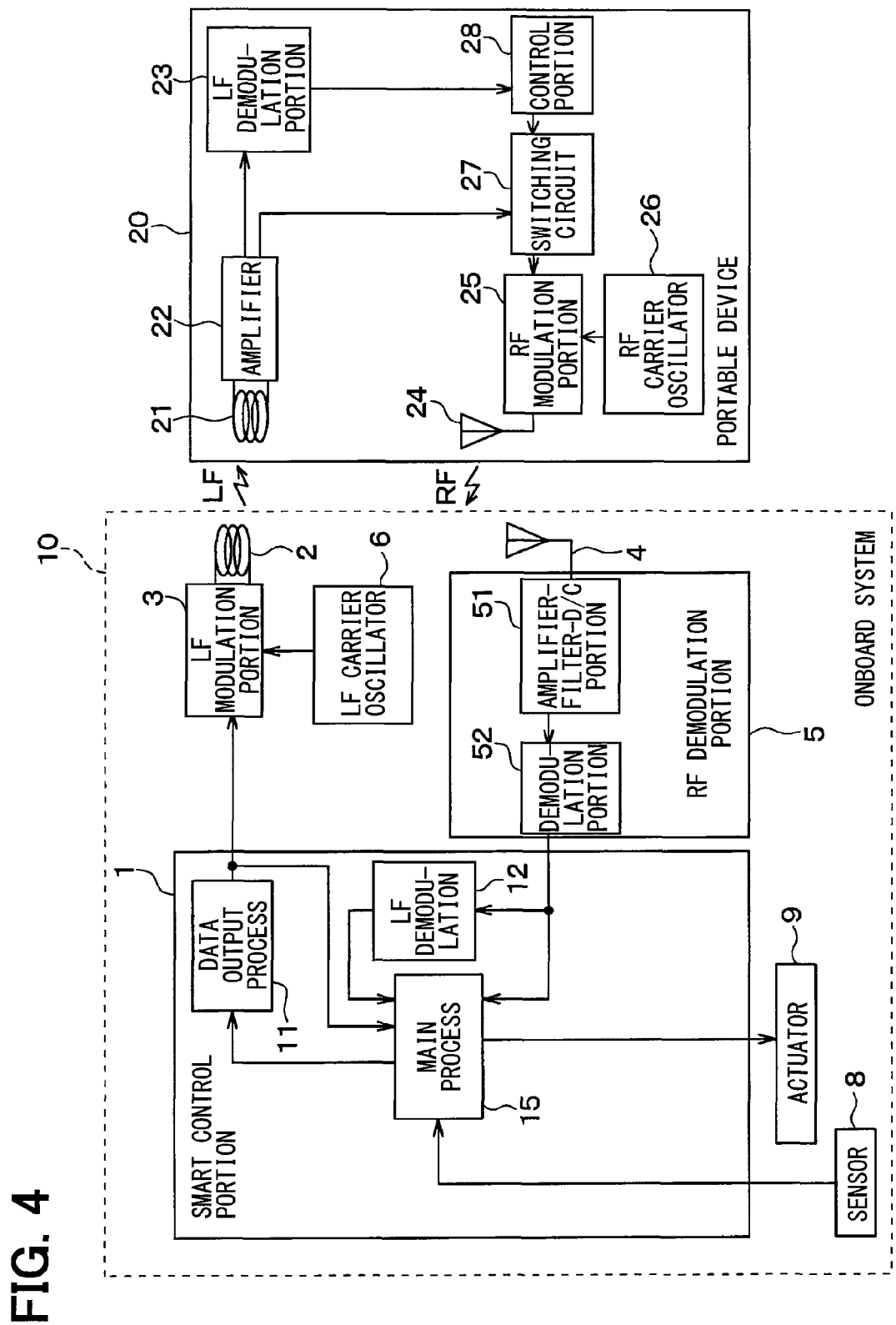
FIG. 4 is a configuration diagram illustrating a smart system.

The following describes in detail the configuration and operation of the smart system according to the embodiment. FIG. 4 is a configuration diagram illustrating the onboard system 10 and the portable device 20 according to the embodiment. The onboard system 10 includes a smart control portion 1, an LF transmission antenna 2, an LF modulation portion 3, an RF reception antenna 4, an RF demodulation portion 5, an LF carrier oscillator 6, a sensor 8, and an actuator 9. The LF transmission antenna 2 exemplifies a first transmission antenna. The LF modulation portion 3 exemplifies a first modulation portion.

The smart control portion 1 can be embodied as a microcomputer having a CPU, RAM, ROM, and an I/O device. The CPU reads a program recorded in the ROM and performs the program using the RAM as a work area to communicate with the portable device 20, determine the presence or absence of relay station attack, and perform various processes of the smart control portion 1 for smart drive.

The LF transmission antenna 2 wirelessly transmits an LF band signal (LF radio wave). The LF modulation portion 3 is provided as a circuit that modulates a carrier signal output from the LF carrier oscillator 6 using a data signal output from the smart control portion 1 and outputs an LF band signal resulting from the modulation to the LF transmission antenna 2. Available modulation systems include ASK, FSK, and PSK. The embodiment uses an ASK (Amplitude Shift Keying) modulation system to be described below.

The RF reception antenna 4 wirelessly receives an RF band signal (RF radio wave). The RF demodulation portion 5 is provided as a circuit that demodulates the RF band signal received by the RF reception antenna 4 and outputs the demodulated signal to the smart control portion 1.

The RF demodulation portion 5 will be described in detail. The RF demodulation portion 5 includes an amplifier-filter-D/C portion 51 and a demodulation portion 52. The amplifier-filter-D/C portion 51 amplifies an RF band signal received by the RF reception antenna 4, filters the RF band signal frequency, and performs frequency down-conversion on the RF band signal into an IF band (an intermediate frequency band or a band approximate to 300 kHz according to the embodiment). The RF band signal is then input to the demodulation portion 52. The demodulation portion 52 RF-demodulates a digital signal input from the amplifier-filter-D/C portion 51 and inputs data resulting from the demodulation to the smart control portion 1. Specifically, the RF demodulation is available as BPSK (Binary Shift Keying) demodulation using a carrier signal in the above-mentioned intermediate frequency band and exemplifies a second demodulation system. The RF demodulation portion 5 demodulates an input RF band signal and inputs it to the smart control portion 1.

The LF carrier oscillator 6 outputs a carrier signal of a predetermined frequency (e.g., 134 kHz) in the LF band to the LF modulation portion 3. The LF modulation portion 3 multiplies this carrier signal by the data signal input from the smart control portion 1. That is, the data signal modulates the carrier signal.

The sensor 8 is attached to a door handle of a vehicle door, detects user's manipulation on the door, and outputs a detection result to the smart control portion 1. For example, the sensor 8 may be embodied as a touch sensor.

The actuator 9 belongs to smart drive targets. The actuator 9 includes a starter motor (or an engine ECU to control the starter motor) for the vehicle engine and a door lock mechanism (or a door ECU to control the door lock mechanism) to lock or unlock the vehicle door.

The portable device 20 includes an LF reception antenna 21, an amplifier 22, an LF demodulation portion 23, an RF transmission antenna 24, an RF modulation portion 25, an RF carrier oscillator 26, a switching circuit 27, and a mobile control portion 28. The LF reception antenna 21 exemplifies a first reception antenna. The LF demodulation portion 23 exemplifies a first demodulation portion. The switching circuit 27 exemplifies a switching portion. The RF modulation portion 25 exemplifies a second modulation portion.

The LF reception antenna 21 receives an LF band signal transmitted from the onboard system 10. The amplifier 22 provides a circuit that amplifies an LF band signal received by the LF reception antenna 21. The LF demodulation portion 23 provides a circuit that demodulates the LF band signal received by the LF reception antenna 21 and amplified by the amplifier 22 and outputs data resulting from the demodulation to the mobile control portion 28. Available demodulation systems include ASK, FSK, and PSK. The embodiment uses the ASK demodulation system same as the modulation system.

The RF transmission antenna 24 wirelessly transmits an RF band signal (RF radio wave). The RF modulation portion 25 uses a signal output from the switching circuit 27 to modulate an RF carrier signal output from the RF carrier oscillator 26 according to a BPSK modulation system (exemplifying a second modulation system) and outputs the RF band signal resulting from the modulation to the RF transmission antenna 24. The RF modulation portion 25 may be embodied as a DBM (Double Balanced Mixer).

The RF carrier oscillator 26 outputs an RF carrier signal (exemplifying a second carrier signal) of a predetermined frequency (e.g., 312 MHz) in the RF band.

The switching circuit 27 switches between a data output state and a reception signal output state. The data output state outputs a signal output from the mobile control portion 28 to the RF modulation portion 25. The reception signal output state outputs a signal output from the amplifier (e.g., an LF carrier output from the LF transmission antenna 2) to the RF modulation portion 25. The switching circuit 27 operates under control of the mobile control portion 28.

The mobile control portion 28 is embodied as a microcomputer having a CPU, RAM, ROM, and an I/O device. The CPU reads a program recorded in the ROM and performs the program using the RAM as a work area to perform various processes of the mobile control portion 28.

The following describes in detail operation of the smart system according to the above-mentioned configuration. As illustrated in FIG. 4, the smart control portion 1 concurrently performs a data output process 11, an LF demodulation process 12, and a main process 15.

The data output process 11 inputs a data signal to the LF modulation portion 3 under control of the main process 15. The LF demodulation process 12 multiplies a signal output from the demodulation portion 52 by a predetermined LF carrier signal to demodulate the signal output from the demodulation portion 52. The LF carrier signal has the same frequency as an LF carrier signal output from the LF carrier oscillator 6 or may be replaced by the latter LF carrier signal. The LF demodulation process 12 further performs an HPF (high-pass filtering) process on the demodulated signal to remove unnecessary low frequency components and inputs the resulting remaining signal to the main process 15.

Figure 5:
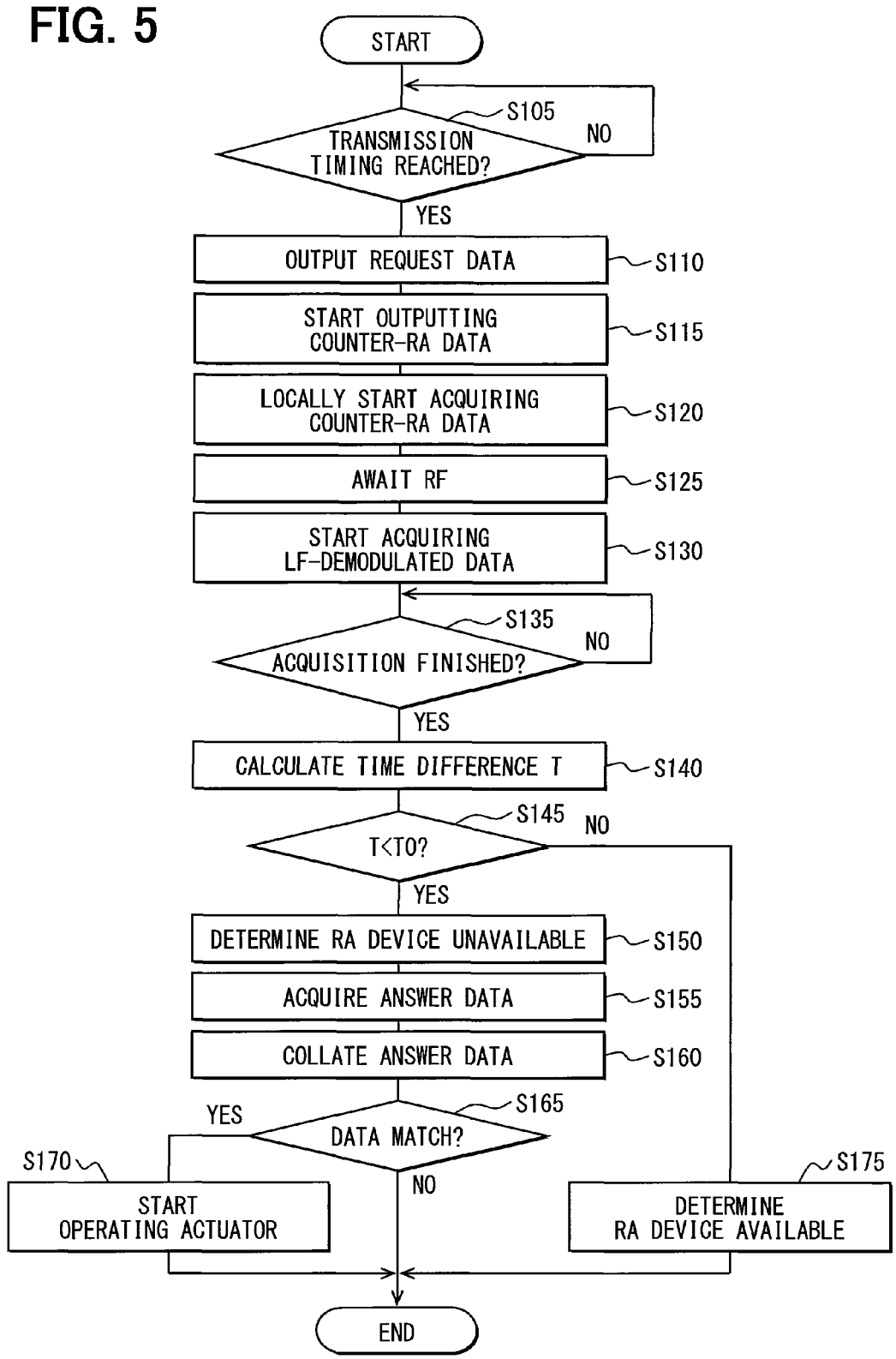
FIG. 5 is a flowchart illustrating a main process of a smart control portion.
Figure 6:
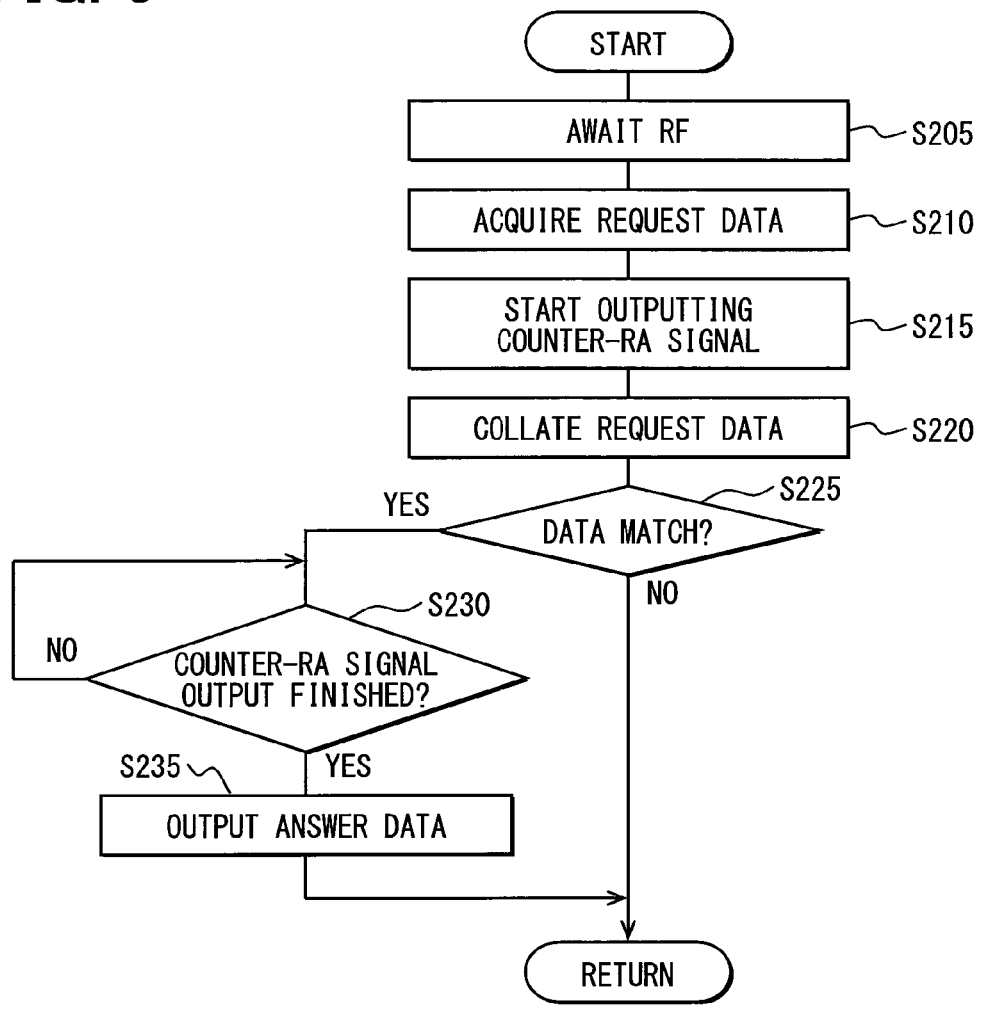
FIG. 6 is a flowchart illustrating a process performed by a mobile control portion.
Figure 7:
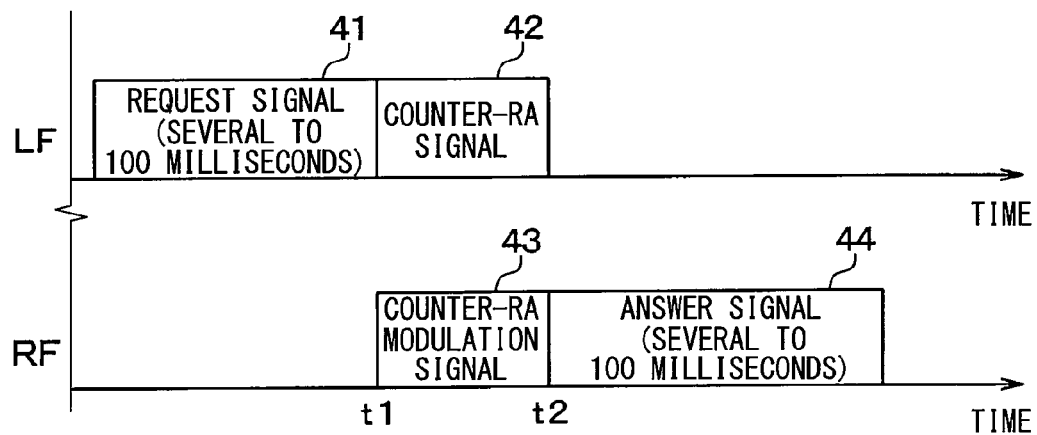
FIG. 7 illustrates timings of signals 41 and 42 exchanged in an LF band and signals 43 and 44 exchanged in an RF band.

The main process 15 determines the presence or absence of relay station attack or performs smart drive. FIG. 5 illustrates a flowchart of the main process 15. FIG. 6 illustrates a flowchart of a process performed by the mobile control portion 28. FIG. 7 illustrates a timing chart of signals exchanged in the LF band and the RF band.

The following describes a case where the user 91 carrying the portable device 20 approaches a vehicle and the portable device 20 enters the communicable range 53 of the onboard system 10 as illustrated in FIG. 1. At S205 in FIG. 6, the mobile control portion 28 of the portable device 20 waits until acquiring an LF band signal (namely, until the LF demodulation portion 23 of the portable device 20 receives a signal of predetermined intensity or more). The switching circuit 27 is set to a data output state that does not output a signal input from the amplifier 22 to the RF modulation portion 25 and allows a signal input from the mobile control portion 28 to be output to the RF modulation portion 25.

At S105 of the main process 15, the smart control portion 1 of the onboard system 10 waits for a transmission timing. Available transmission timings include a polling timing occurring periodically (e.g., one-second cycle) and a timing for the sensor 8 to detect user's manipulation on the door.

When the transmission timing is reached, the main process 15 proceeds to S110 to generate specified request data and instructs the data output process 11 to output the request data. The data output process 11 outputs the request data to the LF modulation portion 3. The LF modulation portion 3 uses the request data to modulate the LF carrier signal output from the LF carrier oscillator 6. The LF modulation portion 3 uses the LF transmission antenna 2 to wirelessly transmit a request signal 41 (containing the request data as illustrated in FIG. 7) resulting from the modulation. The time (transmission time) to transmit the request signal from the beginning to the end ranges from several to 100 milliseconds.

In the portable device 20, the LF reception antenna 21 receives the request signal 41. The amplifier 22 amplifies the request signal 41. The amplified request signal 41 is input to the LF demodulation portion 23 and the switching circuit 27. Since the switching circuit 27 is set to the data output state, the request signal 41 is not input to the RF modulation portion 25 from the switching circuit 27. The LF demodulation portion 23 demodulates the input request signal 41 to acquire the request data and inputs the acquired request data to the mobile control portion 28.

When the request data input starts, the mobile control portion 28 proceeds to S210 to acquire the input request data. The mobile control portion 28 proceeds to S215 at time t1 (see FIG. 7) when the request data acquisition finishes. To start outputting a counter-RA signal, the mobile control portion 28 changes the switching circuit 27 to enable the reception signal output state that does not output data input from the mobile control portion 28 to the RF modulation portion 25 and outputs a signal input from the amplifier 22 to the RF modulation portion 25.

In the main process 15, the smart control portion 1 proceeds to S115 to provide control to start outputting a signal containing counter-RA data at time t1 when the data output process 11 finishes outputting the request data. Specifically, the smart control portion 1 issues an instruction to the data output process 11 to output counter-RA data. The embodiment predetermines the counter-RA data (e.g., data containing successive bits representing 1) to be output as a DC signal whose level is constant (specifically set to Hi).

The data output process 11 starts outputting the counter-RA data according to the instruction. The data output process 11 thereby starts inputting the counter-RA data to the main process 15. The smart control portion 1 starts inputting a DC signal corresponding to the counter-RA data to the LF modulation portion 3.

The LF modulation portion 3 multiplies the DC signal by the LF carrier signal from the LF carrier oscillator 6 to start outputting a resulting signal to the LF transmission antenna 2. The LF transmission antenna 2 starts wirelessly transmitting a counter-RA signal 42 as an unmodulated wave. The counter-RA signal 42 contains counter-RA data and equals the LF carrier signal itself.

The data output process 11 and the LF modulation portion 3 continue to transmit the counter-RA signal 42 for a period (e.g., several milliseconds) from time t1 to time t2 in parallel with the process in FIG. 5. The time to transmit the counter-RA signal (the period from time t1 to time t2) is found according to a value previously recorded in a storage medium (e.g., the ROM of the smart control portion 1).

After starting the output of the signal containing the counter-RA data at S115, the main process 15 immediately proceeds to S120 (without waiting for completion of the output) and locally (i.e., in the onboard system 10) starts acquiring the same counter-RA data as used for the output. Specifically, the main process 15 starts acquiring the signal (DC signal) containing the counter-RA data that starts being output from the data output process.

The main process 15 immediately (without waiting for completion of acquiring the counter-RA data) proceeds to S125 and waits until the RF demodulation portion 5 receives an RF band signal. Actually, as will be described later, the RF demodulation portion 5 soon receives an RF band signal.

On the other hand, the switching circuit 27 of the portable device 20 enters the reception signal output state. In this state, the LF reception antenna 21 receives the counter-RA signal 42. The amplifier 22 amplifies the counter-RA signal 42 and inputs it to the switching circuit 27.

The counter-RA signal 42 received by the LF reception antenna 21 is amplified and is input to the RF modulation portion 25. The RF modulation portion 25 uses the counter-RA signal 42 to BPSK-modulate the RF carrier signal (exemplifying a second carrier signal) from the RF carrier oscillator 26. The RF modulation portion 25 outputs a counter-RA modulation signal 43 (containing the counter-RA data) resulting from the modulation to the RF transmission antenna 24. The RF transmission antenna 24 then wirelessly transmits the counter-RA modulation signal 43 in the RF band.

At S220 after S215 while the RF transmission antenna 24 transmits the counter-RA modulation signal 43, the mobile control portion 28 collates the acquired request data with authentic request data previously stored in a storage medium (e.g., the ROM of the mobile control portion 28) to determine whether the acquired request data is authentic. At S225, the mobile control portion 28 determines whether the acquired request data matches the authentic request data, namely, whether the acquired request data is authentic.

In this example, the request data is received from the authentic onboard system 10 (i.e., corresponding to the portable device 20). At S225, the mobile control portion 28 determines that the request data is authentic, and then proceeds to S230.

Unlike the example, unauthentic request data results from the demodulation of the LF demodulation portion 23 if the portable device 20 receives a signal from an unauthentic onboard system 10 or other communication devices. At S225, the request data does not match the authentic request data. The mobile control portion 28 determines that the request data is unauthentic. In this case, the process returns to S205 without outputting answer data. Consequently, the portable device 20 does not wirelessly transmit an answer signal to the onboard system 10. The onboard system 10 performs no smart drive.

Returning back to the description of the example, the following assumes that the mobile control portion 28 determines the request data to be authentic at S225, and then proceeds to S230. At S230, the mobile control portion 28 waits until the switching circuit 27 finishes outputting the counter-RA signal 42 to the RF modulation portion 25.

The storage medium (e.g., the ROM of the mobile control portion 28) previously stores the predetermined transmission time of the counter-RA signal 42. To determine completion of outputting the counter-RA signal 42, the mobile control portion 28 determines whether the predetermined transmission time elapses from the time to complete reception of the request data at S210. The mobile control portion 28 and the smart control portion 1 record the same value for the transmission time information about the counter-RA signal 42.

As another method to determine completion of outputting the counter-RA signal 42, the mobile control portion 28 may AM-demodulate a voltage applied to the switching circuit 27 from the amplifier 22 and determine completion of outputting the counter-RA signal 42 if the voltage or a variation in the voltage reaches a previously designed threshold value or smaller.

In the onboard system 10, the main process 15 for the smart control portion 1 starts transmitting the counter-RA signal 42, passes S120, and then proceeds to S125 to wait until wireless reception by the RF demodulation portion 5. As described above, however, the portable device 20 transmits the counter-RA modulation signal 43 soon after the onboard system 10 transmits the counter-RA signal 42. The RF demodulation portion 5 receives the counter-RA modulation signal 43 via the RF reception antenna 4, BPSK-demodulates the counter-RA modulation signal 43 using an RF carrier signal, and outputs the counter-RA modulation signal 43 to the smart control portion 1.

The main process 15 proceeds to S130 when the BPSK-demodulated signal starts being input to the smart control portion 1. At S130, the smart control portion 1 instructs the LF demodulation process 12 to start LF demodulation.

In the LF demodulation process 12, the smart control portion 1 uses an LF carrier to start demodulating a signal demodulated by the RF demodulation portion 5 using an RF carrier. Demodulated signals are successively input to the main process 15.

The main process 15 proceeds to S135 when the LF demodulation process 12 starts LF-demodulating the RF-demodulated signal (equal to the counter-RA signal 42). The main process 15 determines whether it has acquired counter-RA data from the data output process 11 and the LF demodulation process 12 has acquired the LF-demodulated signal (equal to the counter-RA signal 42). The determination process is repeated until the acquisition processes are complete.

These two acquisition processes are not completed at S135. The timing to finish acquiring counter-RA data from the data output process 11 hardly occurs later than the timing to finish acquiring the signal LF-demodulated by the LF demodulation process 12, namely, the RF-demodulated counter-RA modulation signal 43. Therefore, the process at S135 may only determine whether to finish acquiring the LF-demodulated signal from the LF demodulation process 12.

For example, the smart control portion 1 may AM-demodulate a signal input to the main process 15 from the LF demodulation process 12 and determine completion of acquiring the LF-demodulated signal from the LF demodulation process 12 if the input signal voltage or a variation in the voltage reaches a previously designed threshold value or smaller. Alternatively, the smart control portion 1 may determine completion of the signal acquisition based on a signal input to the main process 15 from the LF demodulation process 12 if the input signal voltage or a variation in the voltage reaches a previously designed threshold value or smaller for a predetermined period (e.g., one-cycle time of a 134 kHz carrier signal).

Figure 8:
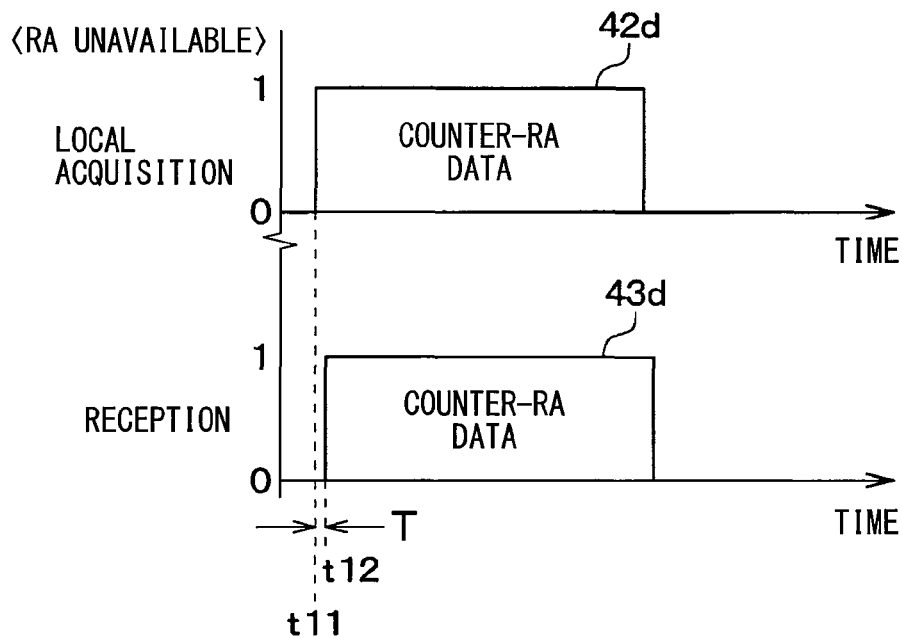
FIG. 8 illustrates time difference T in the absence of relay station attack.

When determining completion of the acquisition processes, the smart control portion 1 proceeds to S140 to calculate time difference T. As illustrated in FIG. 8, time difference T is calculated as delay time $T=t12-t11$, where t11 signifies timing for the smart control portion 1 to transmit counter-RA data 42d (counter-RA data contained in the counter-RA signal 42) to the portable device 20 and t12 signifies timing for the smart control portion 1 to receive counter-RA data 43d (counter-RA data contained in the counter-RA modulation signal 43) from the portable device 20. If no relay station attack intervenes like this example, time difference T is very small compared to intervention of the relay station attack to be described later.

At S140, the smart control portion 1 calculates time difference T as follows. The counter-RA data is output to the LF modulation portion 3 from the data output process portion 11 and is used to modulate an LF carrier. That counter-RA data corresponds to the counter-RA data transmitted to the portable device 20. The smart control portion 1 branches a signal containing the counter-RA data output from the data output process portion 11. The smart control portion 1 inputs one of the branched signals to the main process 15 and inputs the other to the LF modulation portion 3. Consequently, the timing for the main process 15 to acquire the counter-RA data from the data output process 11 substantially equals timing t11 to transmit the counter-RA data to the portable device 20.

As described above, the RF demodulation portion 5 RF-demodulates the counter-RA modulation signal 43 to generate a counter-RA signal (LF carrier signal). The LF demodulation process 12 LF-demodulates this counter-RA signal to generate a counter-RA data. Therefore, the LF demodulation process 12 supplies the main process 15 with the counter-RA data transmitted to the portable device 20. Therefore, the timing for the main process 15 to acquire the counter-RA data from the LF demodulation process 12 equals timing t12 to receive the counter-RA data from the portable device 20.

In consideration of the foregoing, time difference T is defined as the delay time between the timing for the main process 15 to acquire counter-RA data from the data output process 11 (i.e., the timing to transmit the counter-RA signal 42) and the timing for the main process 15 to acquire counter-RA data from the LF demodulation process 12 (i.e., the timing to receive the counter-RA modulation signal 43). As illustrated in FIG. 8, time difference T may be measured at rising edges of two pieces of the acquired counter-RA data 42d and 43d described above or at trailing edges thereof.

At S145, the smart control portion 1 determines whether calculated time difference T is smaller than predetermined reference time T0. Reference time T0 may be set to 35 microseconds, for example.

In the example, time difference T is smaller than reference time T0 because no RA relay station intervenes in communication between the onboard system 10 and the portable device 20. Therefore, the process proceeds to S150. Proceeding to S150 from S145 corresponds to enabling the smart drive (under condition that the answer signal is authentic).

At S150, the smart control portion 1 determines that no relay station attack intervenes. Specifically, the smart control portion 1 turns off the value of a specified RA flag. The specified RA flag is initially turned off when the onboard system 10 starts. At S155, the smart control portion 1 waits until acquiring answer data from the RF demodulation portion 5.

In the portable device 20, the mobile control portion 28 determines at S230 that the switching circuit 27 has finished outputting the counter-RA signal 42 to the RF modulation portion 25 at the timing (timing after predetermined time elapsed from the start of S215) to complete transmission of the counter-RA modulation signal. The process then proceeds to S235.

At S235, the mobile control portion 28 changes the switching circuit 27 to the data output state, generates specified answer data, and outputs the generated answer data to the switching circuit 27. The switching circuit 27 outputs the answer data to the RF modulation portion 25. The RF modulation portion 25 uses the answer data to BPSK-modulate the RF carrier signal from the RF carrier oscillator 26 and wirelessly transmits the modulated signal (i.e., an answer signal 44 containing the answer data) from the RF transmission antenna 24. The process then returns to S205. The time to transmit the answer signal 44 ranges from several to 100 milliseconds.

In the onboard system 10, the RF demodulation portion 5 uses the RF reception antenna 4 to receive the answer signal 44 transmitted from the portable device 20 as described above. The RF demodulation portion 5 BPSK-demodulates the answer signal 44. The RF demodulation portion 5 thereby inputs the answer data contained in the answer signal 44 to the smart control portion 1.

At S155 of the main process 15, the smart control portion 1 acquires the answer data. At S160, the smart control portion 1 collates the answer data with authentic answer data previously stored in a storage medium (e.g., the ROM of the smart control portion 1) to determine whether the acquired answer data is authentic. At S165, the smart control portion 1 determines whether the acquired answer data matches the authentic answer data, namely, whether the acquired answer data is authentic.

In the example, the answer data is received from the authentic portable device 20 (i.e., compliant with the onboard system 10). At S165, the smart control portion 1 determines that the answer data is authentic. The smart control portion 1 proceeds to S170 to perform the smart drive. This enables a user to open the door, get in the vehicle, and start the engine. The process in FIG. 5 terminates after S170.

Unlike the example, unauthentic answer data results from the demodulation of the RF demodulation portion 5 if the onboard system 10 receives a signal from an unauthentic portable device or other communication devices. At S165, the answer data does not match the authentic answer data. The smart control portion 1 determines that the answer data is unauthentic. In this case, the smart control portion 1 skips S170, inhibits the smart drive, and returns the process to S105.

As described above, the onboard system 10 transmits the counter-RA signal 42 to the portable device 20. The portable device 20 uses the counter-RA signal to modulate an RF carrier and returns it as the counter-RA modulation signal 43 to the onboard system 10. If no relay station attack intervenes as in the example, the smart control portion 1 transmits counter-RA data to the portable device 20 at timing t11. The portable device 20 transmits the counter-RA data (as the counter-RA modulation signal 43) to the onboard system 10 at timing t12. Delay time T from timings t11 to t12 should be smaller than reference time T0. Therefore, the smart control portion 1 can enable the smart drive.

The following mainly describes a difference between the above-mentioned example of no relay station attack intervention and examples of the relay station attack intervention as illustrated in FIGS. 2 and 3.

According to the examples illustrated in FIGS. 2 and 3, the onboard system 10 transmits the request signal 41 (containing the request data) and the counter-RA signal 42

(containing the counter-RA data). The RA relay stations 94 and 95 relay the signals. The portable device 20 receives the signals.

According to the example in FIG. 2, the portable device 20 transmits the counter-RA modulation signal 43 (containing the counter-RA data) and the answer signal 41 (containing the answer data). The onboard system 10 receives the signals similarly to the above-mentioned example where no relay station attack intervenes.

According to the example in FIG. 3, the portable device 20 transmits the counter-RA modulation signal 43 (containing the counter-RA data) and the answer signal 41 (containing the answer data). The RA relay stations 96 and 97 relay the signals. The onboard system 10 receives the signals.

Therefore, operation of the portable device 20 equals the above-mentioned example where no relay station attack intervenes. Operation of the onboard system 10 equals the above-mentioned example where no relay station attack intervenes until the smart control portion 1 proceeds to S140 of the main process 15.

Figure 9:
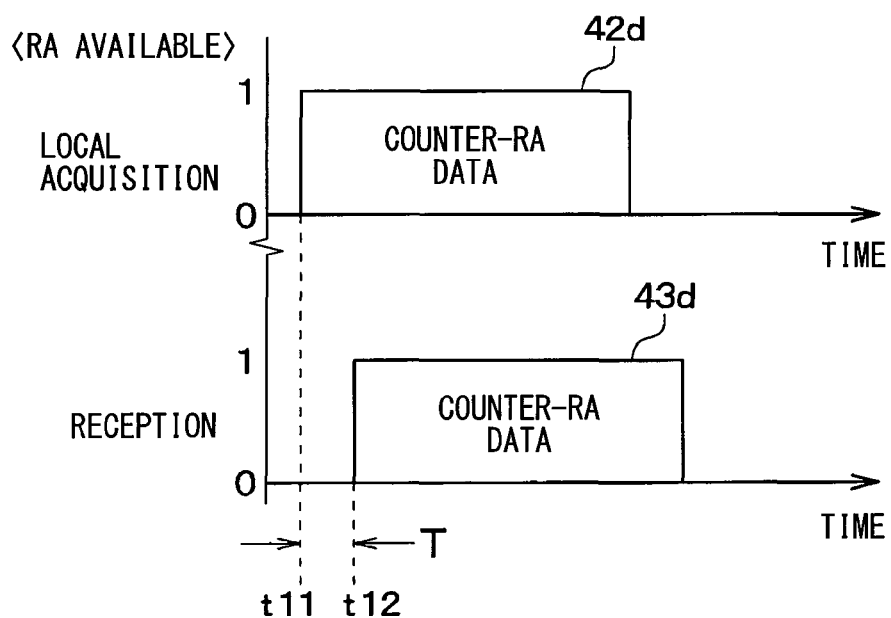
FIG. 9 illustrates time difference T in the absence of relay station attack.

However, the RA relay stations 94 and 95 perform demodulation and modulation, respectively, thus increasing the communication delay time. As illustrated in FIG. 9, intervention of the relay station attack increases time difference T=t12−t11 calculated at S140 of the main process 15 as illustrated in FIG. 5 compared to the case of no relay station attack. As a result, the smart control portion 1 determines that time difference T is greater than reference time T0. The process proceeds to S175.

Advancing the process to S175 from S145 corresponds to inhibition of the smart drive.

At S175, the smart control portion 1 determines that the relay station attack intervenes. Specifically, the smart control portion 1 turns on the RA flag value described above. After S175, the process returns to S105. The smart control portion 1 generates an alarm outside the vehicle based on the fact that the RA flag value turns on. The smart control portion 1 may provide control to sound the vehicle's horn.

According to the embodiment, the smart control portion 1 transmits the counter-RA signal 42 to the portable device 20 at transmission timing t11. The smart control portion 1 receives the counter-RA modulation signal 43 from the portable device 20 at reception timing t12. The smart control portion 1 finds delay time T between timings t11 and t12. The smart control portion 1 compares delay time T with reference time T0. The smart control portion 1 determines no intervention of the relay station attack if delay time T is smaller than reference time T0. The smart control portion 1 determines intervention of the relay station attack if delay time T is greater than or equal to reference time T0.

Demodulation and modulation performed by the RA relay stations increase the delay time. The presence or absence of relay station attack is determined according to the delay time of a signal that is transmitted to the portable device 20 from the onboard system 10 and returns to the onboard system 10 from the portable device 20. This technology is also described in patent document 1.

Intervention of the RA relay stations causes an increase in the delay time to be as short as approximately 35 microseconds. On the other hand, the smart system is inherently subject to a large variation of approximately 100 microseconds in the delay time during transmission and reception (without intervention of the relay station attack). An error range of variations in the delay time for the smart system covers a delay due to intervention of RA relay stations, if any. Effectively, it has been difficult to accurately determine the presence or absence of RA relay station intervention.

Figure 10:
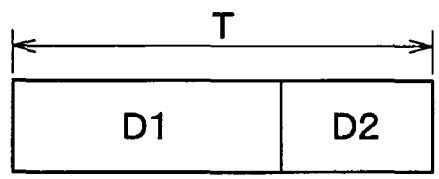
FIG. 10 illustrates delay times D1 and D2.

The following describes a cause of variations in the delay time during transmission and reception in the prior-art smart system. FIG. 10 illustrates delay time (i.e., time difference T) during transmission and reception in a prior-art smart system without intervention of the relay station attack. The delay time is a sum of D1 and D2, where D1 denotes the unchanged delay time and D2 denotes the delay time that greatly varies with the LF reception field intensity. The LF reception field intensity is applicable to an LF band signal the portable device receives from the onboard system.

Figure 11:
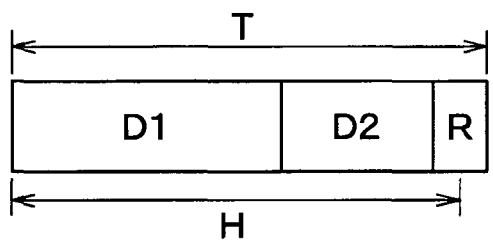
FIG. 11 illustrates delay times D1, D2, and R.

Suppose that the relay station attack intervention causes increased amount R in the delay time. As illustrated in FIG. 11, the relay station attack intervention necessitates the delay time (i.e., time difference T) of D1+D2+R for transmission and reception in the smart system. A value corresponding to H in FIG. 11 needs to be used for the reference time (corresponding to reference time T0 according to the above-mentioned embodiment) compared to time difference T to determine whether the relay station attack intervenes.

Figure 12:
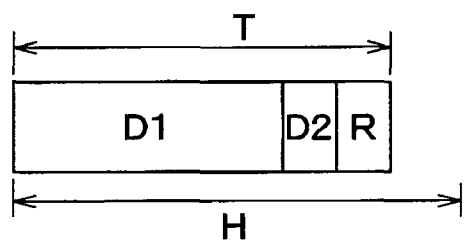
FIG. 12 illustrates delay times D1, D2, and R.

However, D2 varies more largely than R. If D2 is very small as illustrated in FIG. 12, setting the above-mentioned value H to the reference time value makes it impossible to appropriately determine the presence or absence of relay station attack intervention.

Figure 13:
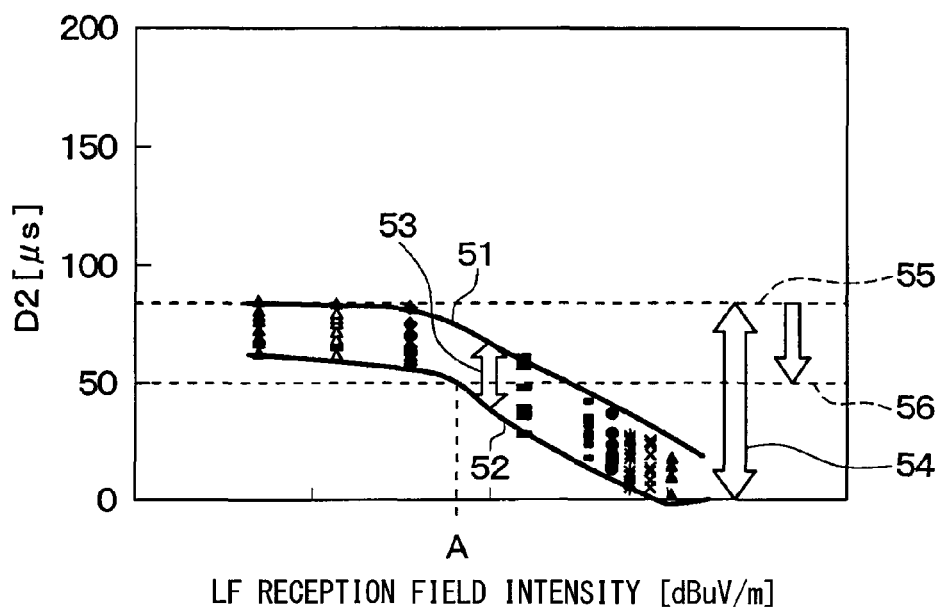
FIG. 13 illustrates relationship between a delay time of the related art and LF reception field intensity.

FIG. 13 illustrates relationship between delay time D2 and the LF reception field intensity. In FIG. 13, a solid line 51 represents a maximum value of delay time D2 for each received power and a solid line 52 represents a minimum value thereof.

As illustrated in FIG. 13, delay time D2 decreases as the LF reception field intensity increases. The same received power is subject to a variation of approximately 30 microseconds corresponding to a range indicated by an arrow 53. The variation is independent of the received power. The maximum variation in delay time D2 results in 80 microseconds corresponding to a range indicated by an arrow 54 after adding variations independent of the LF reception field intensity and variations dependent on the LF reception field intensity together.

Suppose that the portable device is placed at the outermost in the communicable range of the onboard system (to receive an LF band signal at the lowest receiving sensitivity). To correctly determine the presence or absence of the relay station attack, threshold value T0 needs to be configured so that T0−D1, namely, the above-mentioned threshold value T0 minus unchanged delay time D1, equals a maximum value 55 (or a larger value) for D2.

Suppose that intervention of the RA relay stations 94 and 95 causes the delay time of approximately 35 microseconds. Delay time D1+D2+R does not exceed reference time T0 in the range from A [dBuV/m] or more in FIG. 13. The range allows delay time D2 to exceed a limit value 56 smaller than the maximum value 55 of D2 by 35 microseconds. The range is also applicable to a distance of approximately 30 cm or smaller between the portable device and the onboard system. There has been a possibility of determining no intervention of the relay station attack even though the RA relay stations 94 and 95 intervene.

According to the embodiment, by contrast, delay time D2 is independent of the LF reception field intensity. This is because the portable device 20 according to the embodiment does not demodulate the received counter-RA signal 42 (containing the counter-RA data). The counter-RA signal 42 is input to the RF modulation portion 25 from the amplifier 22 via the switching circuit 27 to bypass the LF demodulation portion 23.

Figure 14:
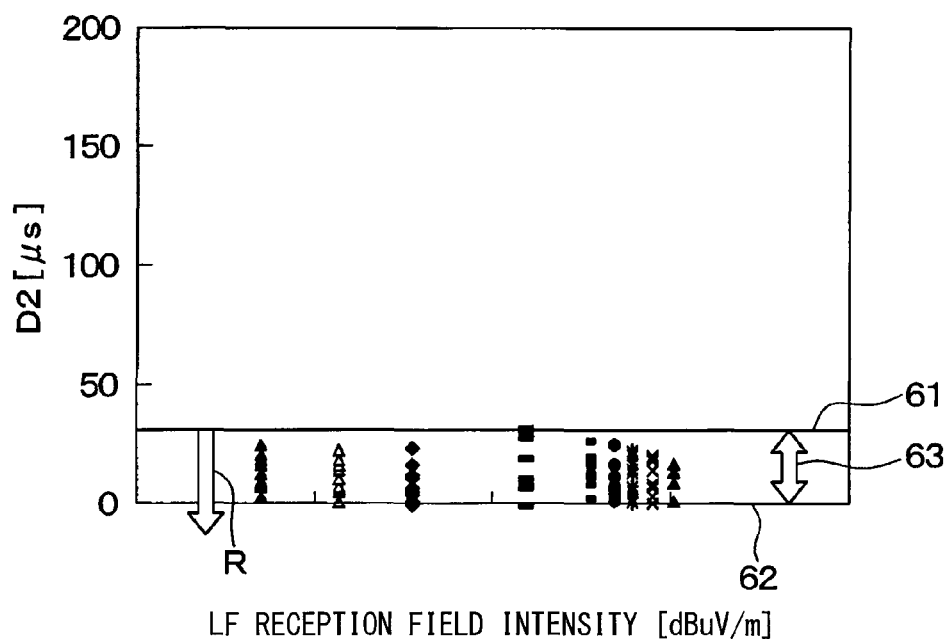
FIG. 14 illustrates relationship between a delay time according to the first embodiment and LF reception field intensity.

FIG. 14 illustrates delay time D2 in a case of directly using the counter-RA signal 42 for RF modulation without LF demodulation and transmitting the modulated signal to the onboard system 10. Delay time D2 applies to a range 63 between solid lines 61 and 62 and hardly depends on the LF reception field intensity.

The range 63 set to approximately 30 microseconds is shorter than delay time R set to 35 microseconds due to intervention of the RA relay stations 94 and 95. Threshold value T0 may be configured so that value T0−D1, namely, the above-mentioned threshold value T0 minus unchanged delay time D1, equals a maximum value 61 (or a slightly larger value) of D2.

The presence or absence of relay station attack intervention can be determined with a high probability regardless of the LF reception field intensity, namely, a distance between the onboard system and the portable device 20.

The following describes a difference between the LF demodulation process 12 of the smart control portion 1 and the LF demodulation portion 23 of the portable device 20. According to the embodiment, the RF demodulation portion 5 RF-demodulates the counter-RA modulation signal 43. The resulting signal (equal to the counter-RA signal 42) is input to the smart control portion 1. The LF demodulation process 12 in the smart control portion 1 LF-demodulates the input signal.

An A/D converter (low frequency and high input impedance) provided for the smart control portion 1 A/D-samples the RF-demodulated signal (equal to the counter-RA signal 42) when input to the smart control portion 1. The LF demodulation process 12 digitally demodulates the sampled digital data. In this case, the LF demodulation process 12 may be replaced by a digital LF demodulator.

The A/D converter uses higher input impedance than input impedance of the LF demodulation portion 23 of the portable device 20. Therefore, a delay time variation (corresponding to the reception field intensity) resulting from the A/D converter and the LF demodulation process of the smart control portion 1 is smaller than a delay time variation (corresponding to the reception field intensity) resulting from the LF demodulation portion 23.

The following describes why the onboard system 10 can use a device that causes a variation in the delay time corresponding to the reception field intensity to be smaller than a variation in the portable device 20. The portable device 20 needs to always await an LF radio wave. To minimize the power consumption, the LF reception portion 23 of the portable device 20 starts when the reception field intensity (detected by an RSSI circuit) of the signal input from the amplifier 22 exceeds a specified value. For example, an extraneous noise may frequently cause inadvertent activation of the LF reception portion 23 to increase the power consumption. To solve this problem, the input impedance of the LF reception portion 23 is decreased to prevent the LF reception portion 23 from responding fast.

The portable device 20 returns the counter-RA modulation signal 43 for the first time when the onboard system 10 itself transmits the counter-RA signal 42. The A/D converter and the LF demodulation process 12 (or the digital LF demodulator) need not be always active, but may be active only during a predetermined period after transmission of the counter-RA signal 42. There is a small possibility of increasing a consumption current even if the A/D converter and the LF demodulation process 12 (or the digital LF demodulator) are designed to fast respond (highly sensitive or high-impedance).

The A/D converter and the LF demodulation process 12 (or the digital LF demodulator) may be replaced by a fast-response analog LF demodulator. The fast-response analog LF demodulator features higher sensitivity, lower frequency, and higher impedance than the LF demodulation portion 23 of the portable device 20. The other operations of the fast-response analog LF demodulator are equal to those of the LF demodulation portion 23.

Second Embodiment

The following describes the second embodiment of the disclosure mainly with respect to differences from the first embodiment. The onboard system 10 and the portable device 20 according to the second embodiment use the same hardware configuration as the first embodiment. The second embodiment differs from the first embodiment in transmission timings of the counter-RA signal 42, the counter-RA modulation signal 43, the request signal 41, and the answer signal 44 as well as contents of the main process 15 in the smart control portion 1 and process contents of the mobile control portion 28 to implement the transmission timings.

Figure 15:
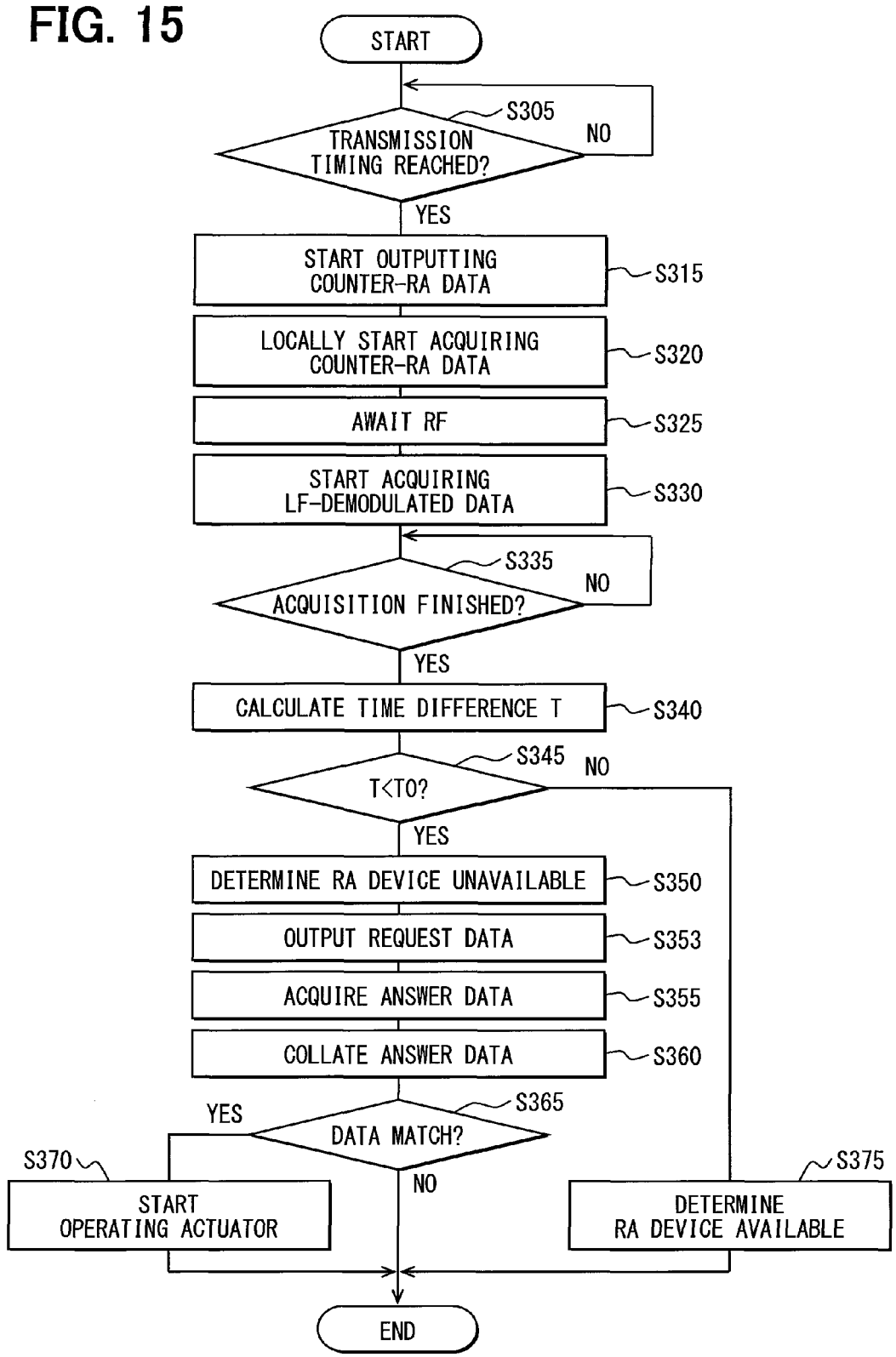
FIG. 15 is a flowchart illustrating a main process performed by a smart control portion according to a second embodiment.
Figure 16:
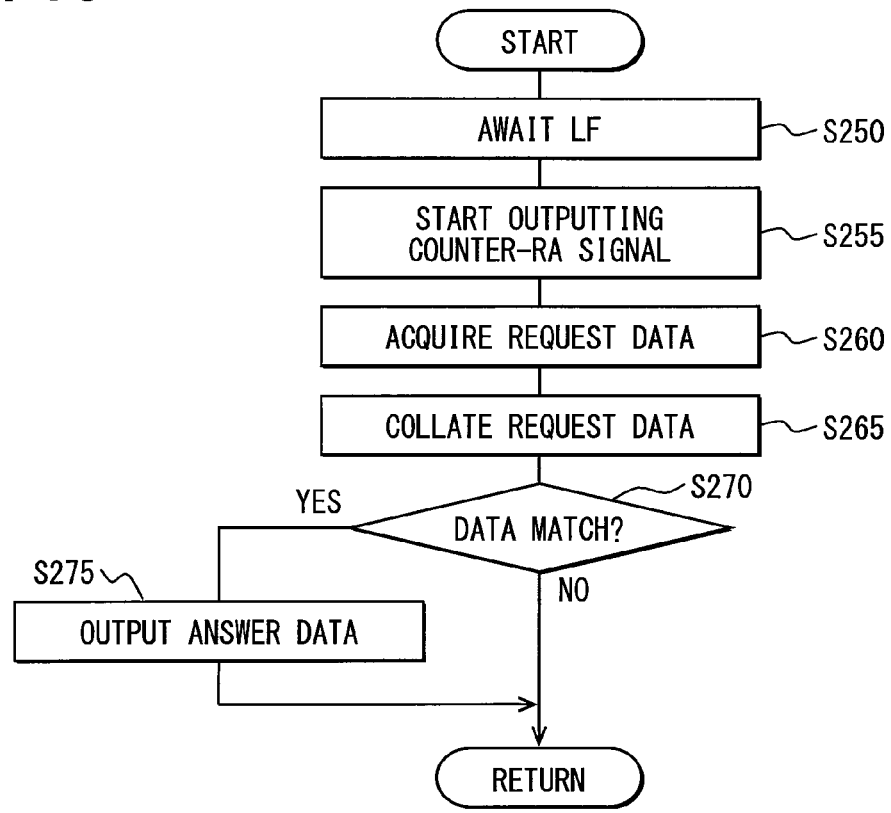
FIG. 16 is a flowchart illustrating a process performed by a mobile control portion according to the second embodiment.
Figure 17:
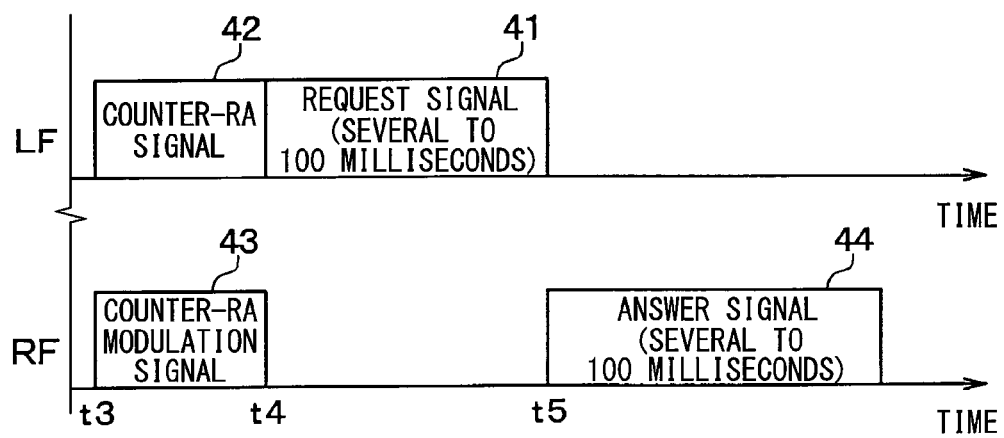
FIG. 17 illustrates timings of signals 41 and 42 exchanged in an LF band and signals 43 and 44 exchanged in an RF band according to the second embodiment.

FIG. 15 illustrates a flowchart of the main process 15 according to the embodiment. FIG. 16 illustrates a flowchart of the mobile control portion 28 according to the embodiment. FIG. 17 is a timing chart illustrating timings of signals (counter-RA signal 42, request signal 41, counter-RA modulation signal 43, and answer signal 44) exchanged in the LF band and the RF band. As illustrated in FIG. 17, the second embodiment differs from the first embodiment in that the onboard system 10 first transmits the counter-RA signal 42 and then the request signal 41. The following describes operation of the smart system according to the second embodiment mainly with respect to differences from the first embodiment.

The following describes a case where the user 91 carrying the portable device 20 approaches a vehicle and the portable device 20 enters the communicable range 53 of the onboard system 10 as illustrated in FIG. 1. At S250 in FIG. 16, the mobile control portion 28 of the portable device 20 waits until the portable device 20 receives a signal or an LF band signal (namely, until the LF demodulation portion 23 of the portable device 20 receives a signal of predetermined intensity or more). The switching circuit 27 is set to the data output state similarly to the first embodiment.

At S305 of the main process 15, similarly to S105 of the first embodiment, the smart control portion 1 of the onboard system 10 waits for a transmission timing.

At the transmission timing, the smart control portion 1 proceeds to S315 and controls the data output process 11 to start outputting the counter-RA signal 42 in the same method as S115 of the first embodiment. Similarly to the first embodiment, an LF carrier output from the LF carrier oscillator 6 is multiplied by a signal (DC signal) containing counter-RA data output from the data output process 11. The counter-RA signal 42 as a resulting signal starts being wirelessly transmitted from the LF transmission antenna 2. Transmission of the counter-RA signal 42 (output of the counter-RA data from the data output process 11) continues for a predetermined period (e.g., several milliseconds) between time t3 and time t4.

Soon after the LF modulation portion 3 starts wirelessly transmitting the counter-RA signal 42, the main process 15 proceeds to S320 and locally (i.e., in the onboard system 10) starts acquiring the same counter-RA data as used for the output in the same method as S120 in FIG. 5.

The main process 15 immediately (without waiting for completion of acquiring the counter-RA data) proceeds to S325 and waits until the RF demodulation portion 5 receives an RF band signal. Actually, as will be described later, the RF demodulation portion 5 soon receives an RF band signal.

In the portable device 20, the mobile control portion 28 advances the process to S255 from S250 when the LF reception antenna 21, the amplifier 22, and the LF demodulation portion 23 start receiving the counter-RA signal 42. The mobile control portion 28 changes the switching circuit 27 to the reception signal output state to start inputting the counter-RA signal to the RF modulation portion 25. The LF reception antenna 21 receives the counter-RA signal 42. The amplifier 22 amplifies the signal and starts inputting it to the switching circuit 27. Therefore, the counter-RA signal 42 received by the LF transmission antenna 21 is amplified and is input to the RF modulation portion 25. The RF modulation portion 25 uses the counter-RA signal 42 to BPSK-modulate the RF carrier signal (exemplifying a second carrier signal) from the RF carrier oscillator 26. The RF modulation portion 25 outputs the counter-RA modulation signal 43 resulting from the modulation to the RF transmission antenna 24. The RF transmission antenna 24 then wirelessly transmits the counter-RA modulation signal 43 in the RF band.

At S255, the mobile control portion 28 waits until the switching circuit 27 finishes outputting the counter-RA signal 42 to the RF modulation portion 25 while the RF transmission antenna 24 transmits the counter-RA modulation signal 43. The mobile control portion 28 uses the same method as S230 of the first embodiment to determine whether output of the counter-RA signal 42 finishes.

In the onboard system 10, the main process 15 for the smart control portion 1 starts transmitting the counter-RA signal 42, passes S320, and proceeds to S325 to wait until wireless reception at the RF demodulation portion 5. As described above, the portable device 20 transmits the counter-RA modulation signal 43 soon after the onboard system 10 starts transmitting the counter-RA signal 42. The RF demodulation portion 5 receives the counter-RA modulation signal 43 via the RF reception antenna 4, BPSK-demodulates (RF-demodulates) the signal, and outputs it to the smart control portion 1 and the LF demodulation process 12.

The main process 15 proceeds to S330 when a signal is input to the smart control portion 1. At S330, the smart control portion 1 instructs the LF demodulation process 12 to start LF demodulation.

In the LF demodulation process 12, the smart control portion 1 uses an LF carrier to start demodulating a signal demodulated by the RF demodulation portion 5 using an RF carrier. Demodulated signals are successively input to the main process 15.

The main process 15 proceeds to S335 to perform the same process as S135 in FIG. 5 when the LF demodulation process 12 starts LF-demodulating the RF-demodulated signal (equal to the counter-RA signal 42). Specifically, the main process 15 determines whether it has acquired counter-RA data from the data output process 11 and the LF demodulation process 12 has acquired the LF-demodulated signal. These two acquisition processes are not completed at S335.

When determining completion of the signal acquisition, the smart control portion 1 proceeds to S340 to calculate time difference T. Time difference T is calculated in the same method as S140 in FIG. 5.

At S345, according to the same process as S145 in FIG. 5, the smart control portion 1 determines whether calculated time difference T is smaller than predetermined reference time T0. In the example, time difference T is smaller than reference time T0 because no RA relay station intervenes in communication between the onboard system 10 and the portable device 20. Therefore, the process proceeds to S350. Proceeding to S350 from S345 signifies enabling the smart drive (under condition that the answer signal is authentic). At S350, according to the same process as S150 in FIG. 5, the smart control portion 1 determines that no relay station attack intervenes.

At S353, according to the same process as S110 in FIG. 5, the smart control portion 1 generates specified request data and instructs the data output process 11 to output the request data. The data output process 11 outputs the request data to the LF modulation portion 3. The LF modulation portion 3 modulates an LF carrier signal from the LF carrier oscillator 6 using the request data and wirelessly transmits the request signal 41 (containing the request data) as the modulated signal using the LF transmission antenna 2. At S355, the smart control portion 1 waits until answer data is acquired from the RF demodulation portion 5.

In the portable device 20, the LF reception antenna 21 receives the request signal 41. The amplifier 22 amplifies the request signal 41. The amplified request signal 41 is input to the LF demodulation portion 23 and the switching circuit 27. Since the switching circuit 27 is set to the data output state, the request signal 41 is not input to the RF modulation portion 25 from the switching circuit 27. The LF demodulation portion 23 demodulates the input request signal 41 to acquire the request data and inputs the acquired request data to the mobile control portion 28.

In the portable device 20, the mobile control portion 28 waits at S225 until the switching circuit 27 finishes outputting the counter-RA signal 42 to the RF modulation portion 25. When the output finishes, the mobile control portion 28 changes the switching circuit 27 to the data output state and proceeds to S260 and waits until request data starts being input from the LF demodulation portion 23. When the input starts, the mobile control portion 28 acquires the request data at S260.

When finishing acquisition of the request data, the mobile control portion 28 proceeds to S265 and collates the request data with authentic request data previously stored in the storage medium to determine whether the acquired request data is authentic. At S270, the mobile control portion 28 determines whether the acquired request data matches the authentic request data, namely, whether the acquired request data is authentic.

In this example, the request data is received from the authentic onboard system 10. At S270, the mobile control portion 28 determines that the request data is authentic, and then proceeds to S275.

At S270, the mobile control portion 28 determines that the request data is unauthentic if, unlike the example, the portable device 20 receives a signal from an unauthentic onboard system 10 or other communication devices. In this case, the process returns to S250 without outputting answer data. Consequently, the portable device 20 does not wirelessly transmit an answer signal to the onboard system 10. The onboard system 10 performs no smart drive.

Returning back to the description of the example, the mobile control portion 28 outputs specified answer data to the switching circuit 27 at S275. The RF modulation portion 25 uses the answer data to BPSK-modulate the RF carrier signal from the RF carrier oscillator 26 and wirelessly transmits the modulated signal (i.e., the answer signal 44) from the RF transmission antenna 24. The process then returns to S250.

In the onboard system 10, the RF demodulation portion 5 BPSK-demodulates the answer signal 44 transmitted from the portable device 20 and inputs the signal to the smart control portion 1.

At S355 of the main process 15, the smart control portion 1 acquires the answer data and proceeds to S360. The process at S360, S365, and S370 equals the process at S160, S165, and S170 in the first embodiment. If the acquired answer data is authentic, the smart control portion 1 performs the smart drive and terminates the process in FIG. 15. If the acquired answer data is unauthentic, the smart control portion 1 does not perform the smart drive and returns the process to S305.

As described above, the onboard system 10 transmits the counter-RA signal 42 to the portable device 20. The portable device 20 modulates the counter-RA signal 42 using an RF carrier signal and returns the counter-RA signal 42 as the counter-RA modulation signal 43 to the onboard system 10. If no relay station attack intervenes as described in the example, the counter-RA modulation signal 43 returns to the onboard system from the portable device 20 with the delay time (time difference T) that is smaller than reference time T0.

The following describes cases of relay station attack intervention (in the same intervention method as described in the first embodiment) as illustrated in FIGS. 2 and 3 mainly with respect to differences from the case where no relay station attack intervenes.

According to examples in FIGS. 2 and 3, operation of the portable device 20 equals the above-mentioned example of no relay station attack intervention. Operation of the onboard system 10 equals the above-mentioned example of no relay station attack intervention until the smart control portion 1 proceeds to S340 of the main process 15.

However, the RA relay stations 94 and 95 perform demodulation and modulation, respectively, thus increasing the communication delay time. As illustrated in FIG. 9, the relay station attack intervention increases time difference T=t12−t11 calculated at S340 of the main process 15 as illustrated in FIG. 15 compared to no relay station attack intervention. As a result, at S345, the smart control portion 1 determines that time difference T is greater than reference time T0. The process proceeds to S375. Advancing the process to S375 from S345 inhibits the smart drive.

At S375, according to the same process as S175 in FIG. 5, the smart control portion 1 determines that the relay station attack intervenes. After S375, the process returns to S305.

According to the embodiment, the smart control portion 1 transmits the counter-RA signal 42 to the portable device 20 at transmission timing t11. The smart control portion 1 receives the counter-RA modulation signal 43 from the portable device 20 at reception timing t12. The smart control portion 1 finds delay time T between timings t11 and t12. The smart control portion 1 compares delay time T with reference time T0. The smart control portion 1 determines no intervention of the relay station attack if delay time T is smaller than reference time T0. The smart control portion 1 determines intervention of the relay station attack if delay time T is greater than or equal to reference time T0.

Similarly to the first embodiment, the portable device 20 according to the second embodiment does not demodulate the received counter-RA signal 42 (containing the counter-RA data). The counter-RA signal 42 is input to the RF modulation portion 25 from the amplifier 22 via the switching circuit 27 to bypass the LF demodulation portion 23. Therefore, delay time D2 is independent of the LF reception field intensity.

Since reference time T0 is configured similarly to the first embodiment, the presence or absence of relay station attack intervention can be determined with a high probability regardless of the LF reception field intensity, namely, a distance between the onboard system and the portable device 20.

The onboard system 10 according to the embodiment starts wirelessly transmitting the counter-RA signal 42 (S315). The onboard system 10 starts locally acquiring the same counter-RA data as that contained in the counter-RA signal 42 (S320) simultaneously with the start of wirelessly transmitting the counter-RA signal 42. The portable device 20 starts receiving the counter-RA signal 42, performing RF modulation using the counter-RA signal 42, and wirelessly transmitting the counter-RA modulation signal 43 (S250 and S255). The onboard system 10 receives the carrier modulation signal 43 and calculates the delay time (time difference T) of counter-RA data contained in the carrier modulation signal 43 with reference to the locally acquired counter-RA data (S340). The onboard system 10 compares the calculated time difference T with reference time T0 (S345). The onboard system 10 permits the smart drive (S370) if time difference T is smaller than reference time T0. The onboard system 10 inhibits the smart drive (S375) if time difference T is greater than or equal to reference time T0.

When permitting the smart drive, the onboard system 10 terminates wireless transmission of the counter-RA signal 42 and then wirelessly transmits the request signal 41. The portable device 20 wirelessly receives the request signal 41 and, based on this, wirelessly transmits the answer signal 44. The onboard system 10 wirelessly receives the answer signal 44 and, based on this, performs the smart drive.

The counter-RA signal 42 is transmitted before transmission of the request signal 41. The counter-RA signal 42 is thereby also used as a burst signal that is transmitted from the onboard system 10 at the beginning of the communication. The burst signal is an unmodulated signal that is supplied to the beginning of a signal transmitted to the portable device 20 from the onboard system 10 so that the LF demodulation portion 23 of the portable device 20 is capable of stable demodulation. In a smart system of the related art, the onboard system 10 transmits the burst signal to the portable device 20.

The second embodiment that allows the counter-RA signal 42 to also function as the burst signal shortens the entire communication time and improves a communication response between the onboard system 10 and the portable device 20 compared to the first embodiment that wirelessly transmits the burst signal before the request signal 41, for example.

When disallowing the smart drive, the onboard system 10 does not wirelessly transmit the request signal 41 after finishing wirelessly transmitting the counter-RA signal 42. The portable device 20 does not transmit the answer signal 44 because the request signal 41 is not transmitted. Disallowing the smart drive eliminates the need to unnecessarily transmit the request signal 41 and the answer signal 44 and accordingly saves the power consumption.

Third Embodiment

The following describes the third embodiment of the disclosure mainly with respect to differences from the first embodiment. The onboard system 10 and the portable device 20 according to the second embodiment use the same hardware configuration as the first embodiment. The third embodiment differs from the first embodiment in transmission timings of the counter-RA signal 42, the counter-RA modulation signal 43, the request signal 41, and the answer signal 44 as well as contents of the main process 15 in the smart control portion 1 and process contents of the mobile control portion 28 to implement the transmission timings.

Figure 18:
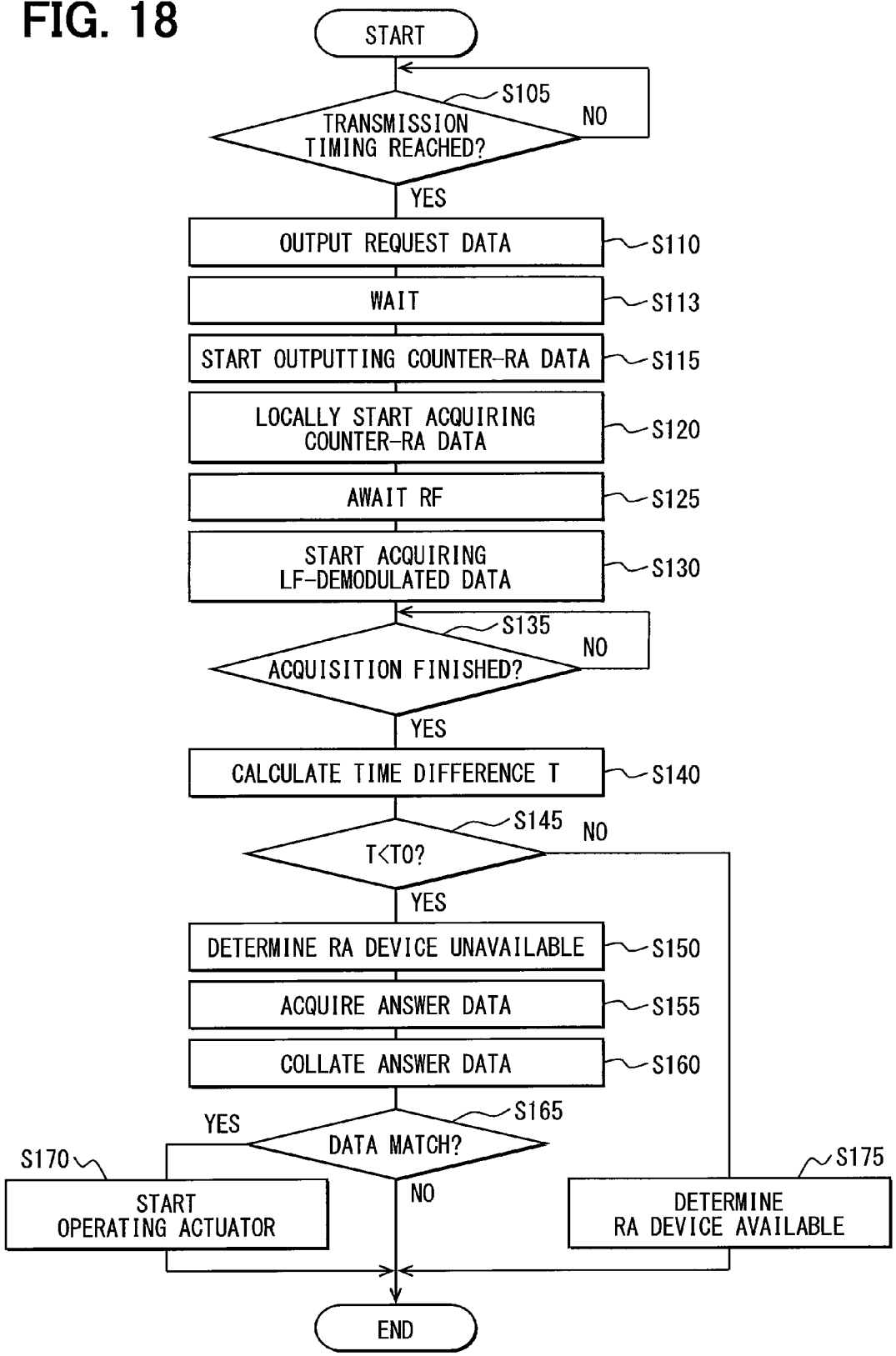
FIG. 18 is a flowchart illustrating a main process performed by a smart control portion according to a third embodiment.
Figure 19:
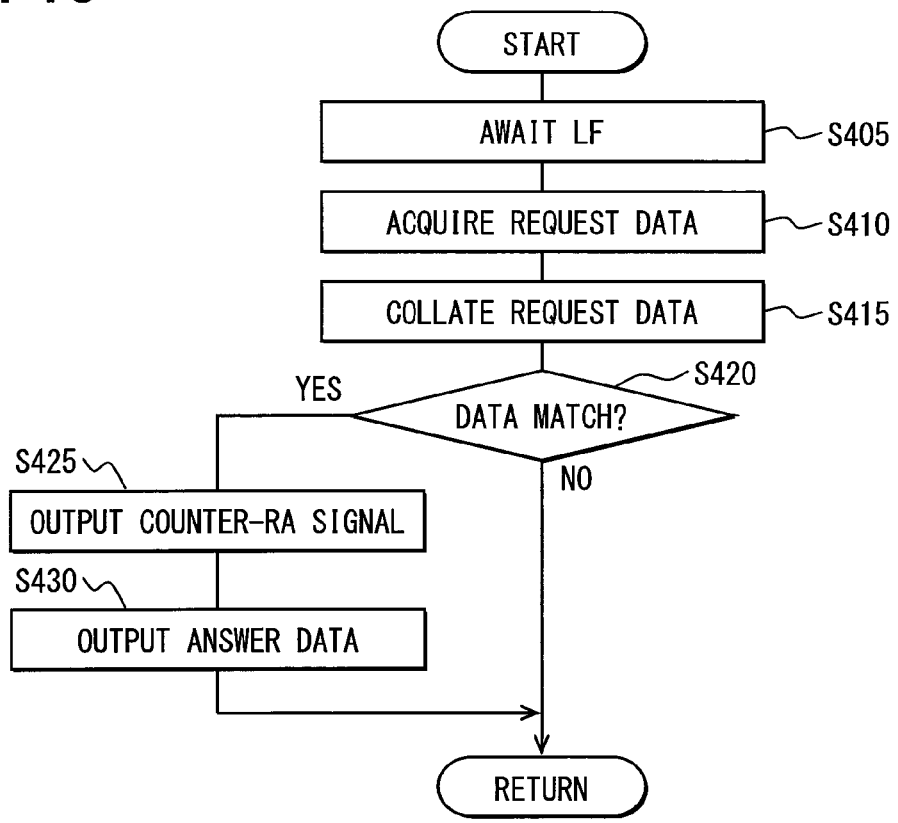
FIG. 19 is a flowchart illustrating a process performed by a mobile control portion according to the third embodiment.
Figure 20:
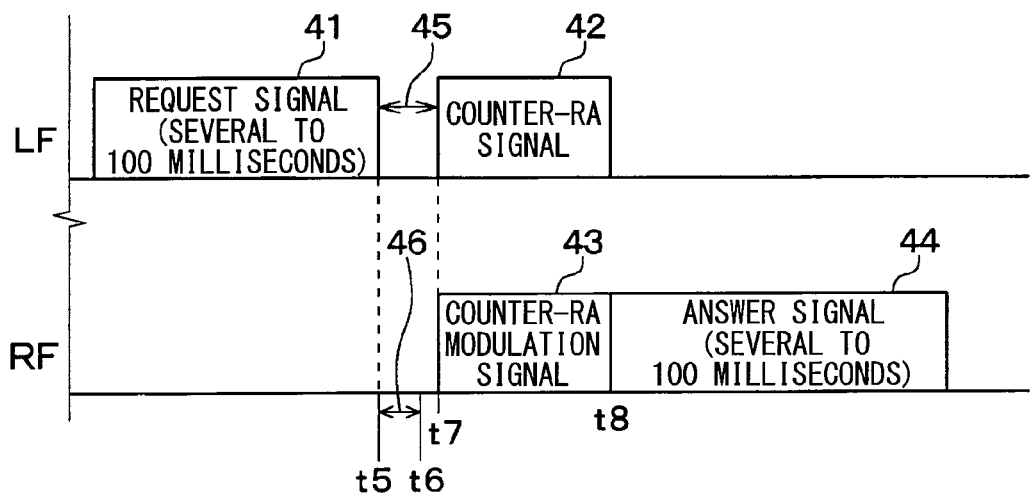
FIG. 20 illustrates timings of signals 41 and 42 exchanged in an LF band and signals 43 and 44 exchanged in an RF band according to the third embodiment.

FIG. 18 illustrates a flowchart of the main process 15 according to the embodiment. FIG. 19 illustrates a flowchart of the mobile control portion 28 according to the embodiment. FIG. 20 is a timing chart illustrating timings of signals (request signal 41, counter-RA signal 42, counter-RA modulation signal 43, and answer signal 44) exchanged in the LF band and the RF band.

Operation of the onboard system 10 according to the second embodiment equals the first embodiment except that the timing to start transmitting the counter-RA signal 42 is later than the first embodiment. Accordingly, the flowchart of the main process 15 is the same as the process in FIG. 5 just supplemented by the process at S113.

Operation of the smart system according to the third embodiment will be described mainly with respect to differences from the first embodiment. The following describes a case where the user 91 carrying the portable device 20 approaches a vehicle and the portable device 20 enters the communicable range 53 of the onboard system 10 as illustrated in FIG. 1.

At S405 in FIG. 19, the mobile control portion 28 of the portable device 20 waits until the portable device 20 receives a signal or an LF band signal (namely, until the LF demodulation portion 23 of the portable device 20 receives a signal of predetermined intensity or more). The switching circuit 27 is set to the data output state similarly to the first embodiment. At S105 of the main process 15, the smart control portion 1 of the onboard system 10 waits for a transmission timing.

When the transmission timing is reached, the main process 15 proceeds to S110 to generate specified request data and instructs the data output process 11 to output the request data. The LF modulation portion 3 uses the request data to modulate the LF carrier signal output from the LF carrier oscillator 6. The LF modulation portion 3 uses the LF transmission antenna 2 to wirelessly transmit the request signal 41 as a modulation result (see FIG. 20). The time (transmission time) to transmit the request signal 41 from the beginning to the end ranges from several to 100 milliseconds.

In the portable device 20, the LF reception antenna 21 receives the request signal 41. The request signal 41 is input to the LF demodulation portion 23 and the switching circuit 27 via the amplifier 22. Since the switching circuit 27 is set to the data output state, the request signal 41 is not input to the RF modulation portion 25 from the switching circuit 27.

The LF demodulation portion 23 demodulates the input request signal 41 to acquire the request data and inputs the acquired request data to the mobile control portion 28. When the request data input starts, the mobile control portion 28 proceeds to S410 to acquire the input request data. When finishing acquisition of the request data at time t5 (see FIG. 20), the mobile control portion 28 proceeds to S415 and collates the request data with authentic request data previously stored in the storage medium to determine whether the acquired request data is authentic. At S420, the mobile control portion 28 determines whether the acquired request data matches the authentic request data, namely, whether the acquired request data is authentic.

In this example, the request data is received from the authentic onboard system 10. At S420, the mobile control portion 28 determines that the request data is authentic, and then proceeds to S425.

The process proceeds to S425 at time t6 that is later than time t5 when acquisition of the request signal 41 has finished. A period 46 between time t5 and time t6 corresponds to the time to authenticate the request data. The period 46 is required to determine whether request data is authentic. At S425, the mobile control portion 28 changes the switching circuit 27 to the reception signal output state.

Unlike the example, unauthentic request data results from the demodulation of the LF demodulation portion 23 if the portable device 20 receives a signal from an unauthentic onboard system 10 or other communication devices. At S420, the request data does not match the authentic request data. The mobile control portion 28 determines that the request data is unauthentic. In this case, the process returns to S405 without outputting answer data. Consequently, the portable device 20 does not wirelessly transmit an answer signal to the onboard system 10. The onboard system 10 performs no smart drive.

Returning back to the description of the example, the smart control portion 1 proceeds to S113 of the main process 15 at time t5 when the data output process 11 finishes outputting the request data. The smart control portion 1 then waits for a predetermined time. The predetermined time corresponds to the time 46 or a longer time 45. The time 46 is previously estimated to be required for the portable device 20 to collate the request data (S415) and determine the authenticity (S420). The storage medium of the smart control portion 1 previously records the predetermined time as a fixed value. At time t7, the smart control portion 1 finishes waiting at S113 and the mobile control portion 28 already finishes the process at S415 and S420 (already at time t6).

After S113, the smart control portion 1 proceeds to S115 to provide control to start outputting an LF carrier similarly to the first embodiment. The LF modulation portion 3 thereby uses the LF transmission antenna 2 to start wirelessly transmitting the counter-RA signal 42 (containing the counter-RA data) as an unmodulated wave from time t7.

The data output process 11 and the LF modulation portion 3 continue to transmit the counter-RA signal 42 for a period (e.g., several milliseconds) from time t7 to time t8.

Soon after the LF modulation portion 3 starts wirelessly transmitting the counter-RA signal 42, the main process 15 proceeds to S120 and locally (i.e., in the onboard system 10) starts acquiring the same counter-RA data as used for the output at S115. Specifically, the main process 15 starts acquiring the signal (DC signal) containing the counter-RA data that starts being output from the data output process.

In the portable device 20, the mobile control portion 28 changes the switching circuit 27 to the reception signal output state at S425 as described above.

From time t7, the counter-RA signal 42 starts being received at the LF reception antenna 21, being input to the switching circuit 27 via the amplifier 22 (the LF demodulation portion 23 bypassed), and being input to the RF modulation portion 25. The RF modulation portion 25 uses the counter-RA signal 42 to BPSK-modulate the RF carrier signal (exemplifying a second carrier signal) from the RF carrier oscillator 26. The RF modulation portion 25 outputs the counter-RA modulation signal 43 resulting from the modulation to the RF transmission antenna 24. The RF transmission antenna 24 then wirelessly transmits the counter-RA modulation signal 43 in the RF band. The counter- RA modulation signal 43 contains the information about the counter-RA data as described in the first embodiment.

At S425, the mobile control portion 28 waits until the switching circuit 27 finishes outputting the counter-RA signal 42 to the RF modulation portion 25 while the switching circuit 27 transmits the counter-RA modulation signal 43. To determine completion of outputting the counter-RA signal 42, the mobile control portion 28 may AM-demodulate a voltage applied to the switching circuit 27 from the amplifier 22 and determine completion of outputting the counter-RA signal 42 if the voltage or a variation in the voltage reaches a previously designed threshold value or smaller.

In the onboard system 10, the main process 15 for the smart control portion 1 starts transmitting the counter-RA signal 42, passes S120, and then proceeds to S125 to wait until wireless reception by the RF demodulation portion 5. As described above, the portable device 20 transmits the counter-RA modulation signal 43 at time t7. The RF demodulation portion 5 uses the RF reception antenna 4 to receive the carrier modulation signal 43, BPSK-demodulates the signal, and outputs the signal (equal to the counter-RA signal 42) resulting from the demodulation to the smart control portion 1.

The main process 15 proceeds to S130 when a signal is input to the smart control portion 1. At S130, the smart control portion 1 instructs the LF demodulation process 12 to start LF demodulation.

In the LF demodulation process 12, the smart control portion 1 uses an LF carrier to start demodulating a signal demodulated by the RF demodulation portion 5 using an RF carrier. Demodulated signals are successively input to the main process 15.

At S130, the smart control portion 1 instructs the LF demodulation process 12 to start LF demodulation. In the LF demodulation process 12, the smart control portion 1 uses an LF carrier to start demodulating a signal demodulated by the RF demodulation portion 5 using an RF carrier. Demodulated signals are successively input to the main process 15.

The main process 15 proceeds to S135 when the LF demodulation process 12 starts LF-demodulating the RF-demodulated signal (equal to the counter-RA signal 42). The main process 15 waits until it finishes acquiring counter-RA data from the data output process 11 and the LF demodulation process 12 finishes acquiring the LF-demodulated signal (equal to the counter-RA signal 42).

When determining completion of the acquisition processes, the smart control portion 1 proceeds to S140 to calculate time difference T similarly to the first embodiment.

At S145, similarly to the first embodiment, the smart control portion 1 determines whether calculated time difference T is smaller than predetermined reference time T0. In the example, time difference T is smaller than reference time T0 because no RA relay station intervenes in communication between the onboard system 10 and the portable device 20. Therefore, the process proceeds to S150. Proceeding to S150 from S145 signifies enabling the smart drive (under condition that the answer signal is authentic). At S150, similarly to the first embodiment, the smart control portion 1 determines that no relay station attack intervenes. At S155, the smart control portion 1 waits until acquiring answer data from the RF demodulation portion 5.

At time t8, the LF modulation portion 3 finishes transmitting the counter-RA signal 42 and the switching circuit 27 in the portable device 20 finishes outputting the counter-RA signal 42 to the RF modulation portion 25. The mobile control portion 28 advances the process to S430.

At S430, the mobile control portion 28 changes the switching circuit 27 to the data output state, generates specified answer data, and outputs the generated answer data to the switching circuit 27. The switching circuit 27 outputs the answer data to the RF modulation portion 25. The RF modulation portion 25 uses the answer data to BPSK-modulate the RF carrier signal from the RF carrier oscillator 26 and wirelessly transmits the modulated signal (i.e., the answer signal 44) from the RF transmission antenna 24. The process then returns to S205. The time to transmit the answer signal 44 ranges from several to 100 milliseconds.

Operation of the onboard system 10 equals that described in the first embodiment after receiving the answer signal 44 (at S155 and later in the main process 15).

The following describes cases of relay station attack intervention (in the same intervention method as described in the first embodiment) as illustrated in FIGS. 2 and 3 mainly with respect to differences from the case where no relay station attack intervenes.

According to examples in FIGS. 2 and 3, operation of the portable device 20 equals the above-mentioned example of no relay station attack intervention. Operation of the onboard system 10 equals the above-mentioned example of no relay station attack intervention until the smart control portion 1 proceeds to S340 of the main process 15.

However, the RA relay stations 94 and 95 perform demodulation and modulation, respectively, thus increasing the communication delay time. As illustrated in FIG. 9, the relay station attack intervention increases time difference T=t12−t11 calculated at S140 of the main process 15 as illustrated in FIG. 18 compared to no relay station attack intervention. As a result, at S145, the smart control portion 1 determines that time difference T is greater than reference time T0. The process proceeds to S175. Advancing the process to S175 from S145 inhibits the smart drive.

At S175, the smart control portion 1 determines that the relay station attack intervenes, by the same process as S175 of FIG. 15. After S175, the process returns to S105.

According to the embodiment, the smart control portion 1 transmits the counter-RA signal 42 to the portable device 20 at transmission timing t11. The smart control portion 1 receives the counter-RA modulation signal 43 from the portable device 20 at reception timing t12. The smart control portion 1 finds delay time T between timings t11 and t12. The smart control portion 1 compares delay time T with reference time T0. The smart control portion 1 determines no intervention of the relay station attack if delay time T is smaller than reference time T0. The smart control portion 1 determines intervention of the relay station attack if delay time T is greater than or equal to reference time T0.

Similarly to the first embodiment, the portable device 20 according to the third embodiment does not demodulate the received counter-RA signal 42 (containing the counter-RA data). The counter-RA signal 42 is input to the RF modulation portion 25 from the amplifier 22 via the switching circuit 27 to bypass the LF demodulation portion 23. Therefore, delay time D2 is independent of the LF reception field intensity.

Since reference time T0 is configured similarly to the first embodiment, the presence or absence of relay station attack intervention can be determined with a high probability regardless of the LF reception field intensity, namely, a distance between the onboard system and the portable device 20.

As described above, the third embodiment provides the effect similar to the first embodiment. According to the embodiment, however, the mobile control portion 28 starts transmitting the counter-RA modulation signal 43 for the first time only when the mobile control portion 28 authenticates the received request data (S410 to S420, times t5 and t6) prior to the timing (S425, t7) to start transmitting the counter-RA modulation signal 43 containing the counter-RA signal 42 and determines the request data to be authentic after the authentication.

The portable device 20 wirelessly receives the request signal 41 and determines whether request data contained in the request signal 41 is authentic after finishing wirelessly receiving the request signal 41. Based on the determination that request data is authentic, the portable device 20 starts modulating the counter-RA signal 42 and wirelessly receiving the counter-RA modulation signal 43. Based on the determination that request data is unauthentic, the portable device 20 does not wirelessly transmit the carrier modulation signal 43 and the answer signal 44. When determining that request data is unauthentic, the portable device 20 need not transmit the counter-RA modulation signal 43 to conserve the power.

Fourth Embodiment

The following describes the fourth embodiment of the disclosure mainly with respect to differences from the first through third embodiments. The fourth embodiment modifies the contents of counter-RA data applicable to the first through third embodiments. According to the first through third embodiments, each of the counter-RA data 42*d* and 43*d* is data in which bits only representing 1 continuously occur as illustrated in FIGS. 8 and 9.

Figure 21:
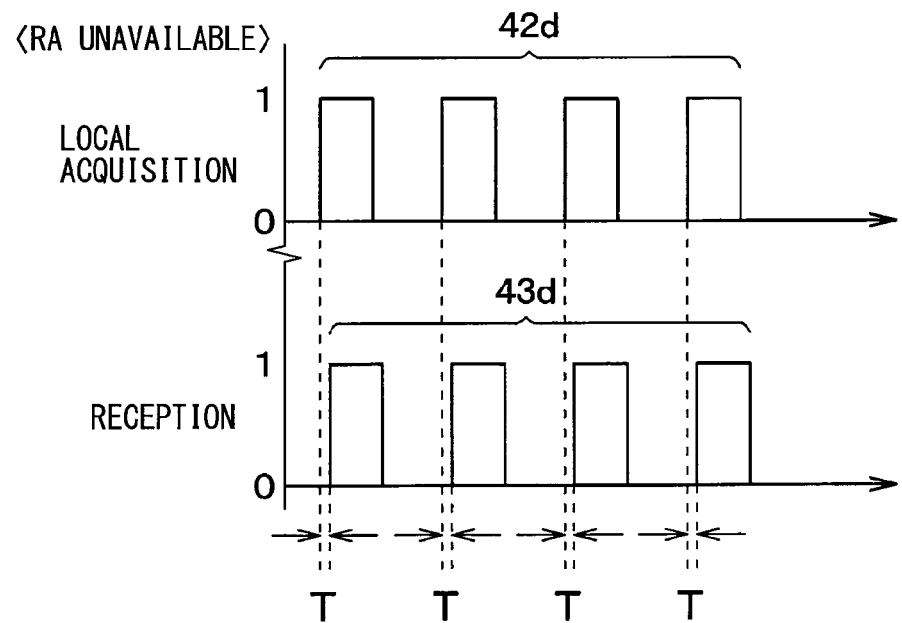
FIG. 21 illustrates time difference T in the absence of relay station attack according to a fourth embodiment.
Figure 22:
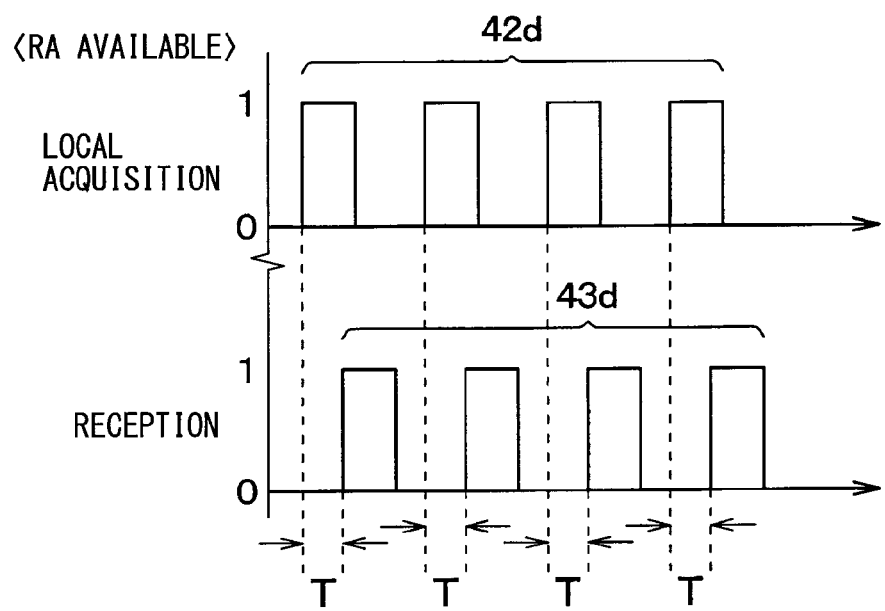
FIG. 22 illustrates time difference T in the absence of relay station attack according to the fourth embodiment.

As illustrated in FIGS. 21 and 22, the counter-RA data 42*d* according to the fourth embodiment is not data in which only bits representing 1 continuously occurs. The counter-RA data 42*a* according to the fourth embodiment is data in which a plurality of successive bits representing 1 a plurality of successive bits representing 0 alternately occur. A successive number of the bits representing 1 is always constant and a successive number of the bits representing 0 is always constant, in one piece of counter-RA data.

Operation of the portable device 20 is unchanged if the above-mentioned counter-RA data is used. Regarding operation of the onboard system 10, the main process 15 performed by the smart control portion 1 differs from the first through third embodiments only in the contents of the process to calculate time difference T (S140 in FIG. 5, S340 in FIG. 15, and S140 in FIG. 18) and the process to compare time difference T with reference time T0 (S145 in FIG. 5, S345 in FIG. 15, and S145 in FIG. 18).

Specifically, the first through third embodiments calculate time difference T only based on the time difference corresponding to the sole rising edge or the sole trailing edge of the locally acquired counter-RA data 42*d* and the counter-RA data 43*d* received from the portable device 20.

As illustrated in FIGS. 21 and 22, however, the fourth embodiment calculates multiple time differences T corresponding to multiple rising edges (or trailing edges) in the counter-RA data 42*d* and 43*d*. The comparison process determines whether average value T of time differences T is smaller than reference time T0.

Since an average value of the time differences corresponding to the edges is used to determine the presence or absence of relay station attack intervention, the possibility of a determination error can be decreased even if an unexpected extraneous noise (pulse or impulse) overlaps the counter-RA modulation signal 43 during communication.

Fifth Embodiment

The following describes the fifth embodiment of the disclosure mainly with respect to differences from the first through third embodiments. The fifth embodiment modifies the contents of counter-RA data applicable to the first through third embodiments. According to the first through third embodiments, each of the counter-RA data 42*d* and 43*d* is data in which only bits representing 1 continuously occurs as illustrated in FIGS. 8 and 9.

Figure 23:
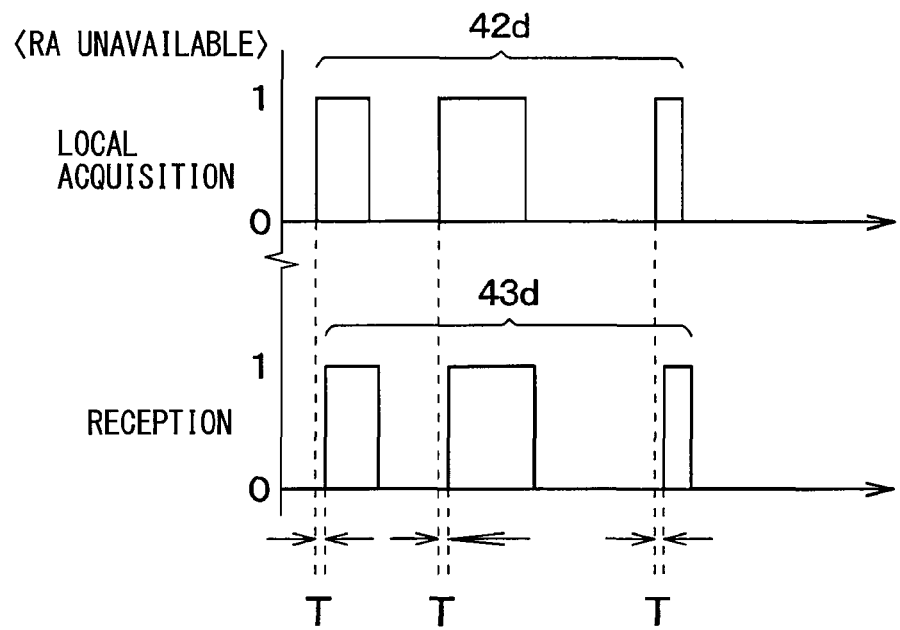
FIG. 23 illustrates time difference T in the absence of relay station attack according to a fifth embodiment.
Figure 24:
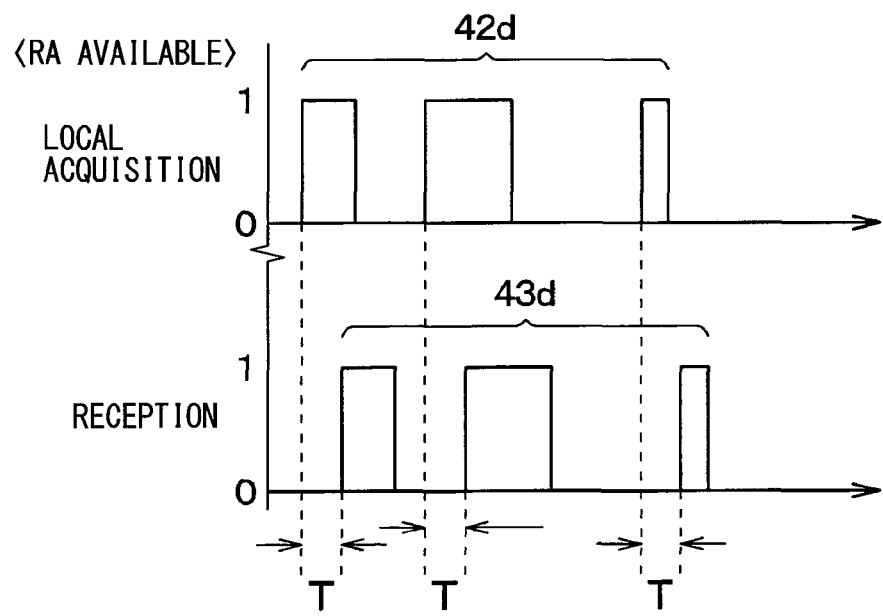
FIG. 24 illustrates time difference T in the absence of relay station attack according to the fifth embodiment.

As illustrated in FIGS. 23 and 24, the counter-RA data 42*d* according to the fifth embodiment is not data in which only bits representing 1 continuously occurs, but is data in which a plurality of bits successively representing 1 and a plurality of bits successively representing 0 alternately occur. A successive number of the bits successively representing 1 and a successive number of the bits successively representing 0 are variable in one piece of counter-RA data.

Operation of the portable device 20 is unchanged if the above-mentioned counter-RA data is used. Regarding operation of the onboard system 10, the main process 15 performed by the smart control portion 1 differs from the first through third embodiments only in the contents of the process to calculate time difference T (S140 in FIG. 5, S340 in FIG. 15, and S140 in FIG. 18) and the process to compare time difference T with reference time T0 (S145 in FIG. 5, S345 in FIG. 15, and S145 in FIG. 18).

Specifically, the first through third embodiments calculate time difference T only based on the time difference corresponding to the sole rising edge or the sole trailing edge of the locally acquired counter-RA data 42*d* and the counter-RA data 43*d* received from the portable device 20.

As illustrated in FIGS. 21 and 22, however, the fourth embodiment calculates multiple time differences T corresponding to multiple rising edges (or trailing edges) in the counter-RA data 42*d* and 43*d*. The comparison process determines whether average value T of time differences T is smaller than reference time T0.

Since an average value of the time differences corresponding to edges is used to determine the presence or absence of relay station attack intervention, the possibility of a determination error can be decreased even if an unexpected extraneous noise (pulse or impulse) overlaps the counter-RA modulation signal 43 during communication.

According to the embodiment, the successive number of the bits representing 1 and the successive number of the bits representing 0 are variable in one piece of the counter-RA data. Since an average value of the time differences corresponding to edges with indefinite length or interval is used to determine the presence or absence of relay station attack intervention, the possibility of a determination error can be decreased even if a periodic extraneous noise (pulse or impulse) overlaps the counter-RA modulation signal 43 during communication.

For example, the embodiment can prevent an RA determination error that may occur if multiple vehicles simultaneously receive a counter-RA modulation signal. Specifically, suppose the vehicle's onboard system 10 communicates with the portable device 20 for this vehicle and another vehicle's onboard system communicates with a portable device for this vehicle. The onboard system 10 receives the counter-RA modulation signal 43 (containing the counter-RA signal 42) from the portable device 20 and, at the same time, may receive a counter-RA modulation signal (containing the counter-RA signal) from the other vehicle's portable device. In such a case, these signals overlap with each other and may cause an error in calculation of time difference T.

By contrast, according to the embodiment, the above-mentioned counter-RA data is used and the counter-RA data is the data in which an arrangement of the successive number of the bits representing 1 and an arrangement of the successive number of the bits representing 0 are different for each vehicle. In this case, there is a high possibility of restricting two signals from overlapping (correctly determining the presence or absence of relay station attack).

As a modification of the embodiment, the counter-RA data may be data in which one bit representing 1 and a plurality of bits successively representing 0 alternately occur. In one piece of the counter-RA data, it is not always necessary that the successive number of the bits representing 0 is constant.

According to the modification, the bit representing 0 always occurs after the bit representing 1. The length of the bit representing 1 is shortened. This enables to accordingly reduce unfavorable effects on the other vehicles. The time length of the bit representing 1 is sufficiently longer than the system delay time (D1+D2 described in the first embodiment).

Sixth Embodiment

Figure 25:
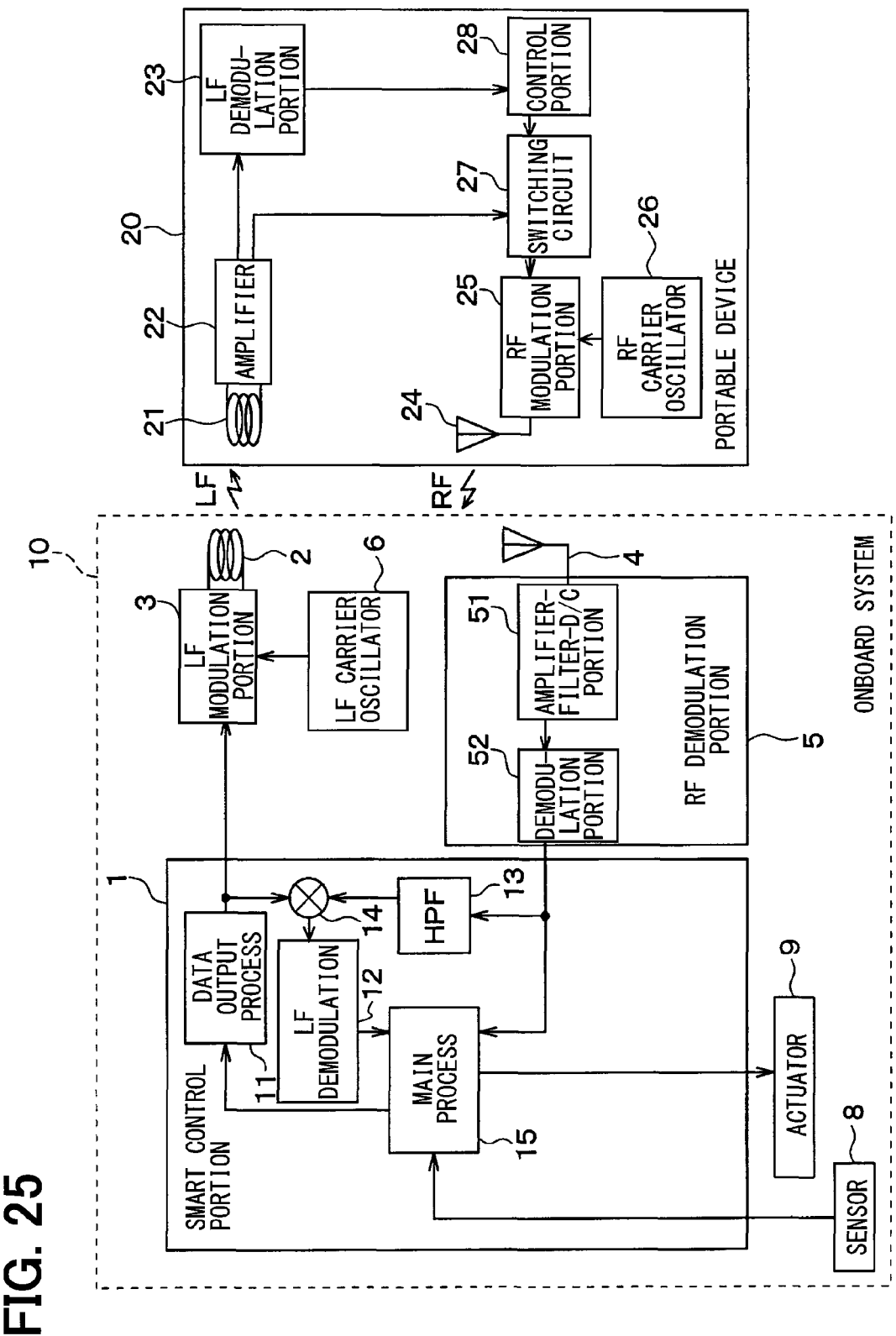
FIG. 25 is a configuration diagram illustrating a smart system according to a sixth embodiment.

The following describes the sixth embodiment of the disclosure mainly with respect to differences from the first embodiment. FIG. 25 is a configuration diagram illustrating the onboard system 10 and the portable device 20 according to the sixth embodiment.

The onboard system 10 differs from the first embodiment in that the smart control portion 1 is further provided with an HPF (high-pass filtering) process 13 and a multiplication process 14. The configuration and the operation of the portable device 20 equal the first embodiment.

According to the embodiment, the demodulation portion 52 of the RF demodulation portion 5 supplies the smart control portion 1 with a signal whose DC component is removed. The signal is input to the HPF process 13 to extract an LF signal and the main process 15. An output from the HPF process 13 and the data output process 11 is input to the multiplication process 14. The multiplication process 14 multiplies the output. A multiplication result is input to the LF demodulation portion 12.

Operation of the embodiment will be described. The following describes a case where the user 91 carrying the portable device 20 approaches a vehicle and the portable device 20 enters the communicable range 53 of the onboard system 10 as illustrated in FIG. 1.

The mobile control portion 28 of the portable device 20 waits until the portable device 20 receives a signal or an LF band signal (namely, until the LF demodulation portion 23 of the portable device 20 receives a signal of predetermined intensity or more) at S250 in FIG. 6. The switching circuit 27 is set to the data output state similarly to the first embodiment.

At S505 of the main process 15, the smart control portion 1 of the onboard system 10 waits for a transmission timing. When the transmission timing is reached, the main process 15 proceeds to S110 to generate specified request data and instructs the data output process 11 to output the request data. The data output process 11 outputs the request data to the LF modulation portion 3.

The LF modulation portion 3 modulates an LF carrier signal from the LF carrier oscillator 6 using the request data and wirelessly transmits the request signal 41 (containing the request data as illustrated in FIG. 7) as the modulated signal using the LF transmission antenna 2.

In the portable device 20 similarly to the first embodiment, the LF demodulation portion 23 receives the request signal 41 via the LF reception antenna 21 and the amplifier 22. The LF demodulation portion 23 LF-demodulates the request signal 41 to acquire the request data and inputs the acquired request data to the mobile control portion 28.

When the request data input starts, the mobile control portion 28 proceeds to S210 to acquire the input request data. The mobile control portion 28 proceeds to S215 at time t1 (see FIG. 7) when the request data acquisition finishes. To start outputting a counter-RF signal, the mobile control portion 28 changes the switching circuit 27 to enable the reception signal output state.

Figure 26:
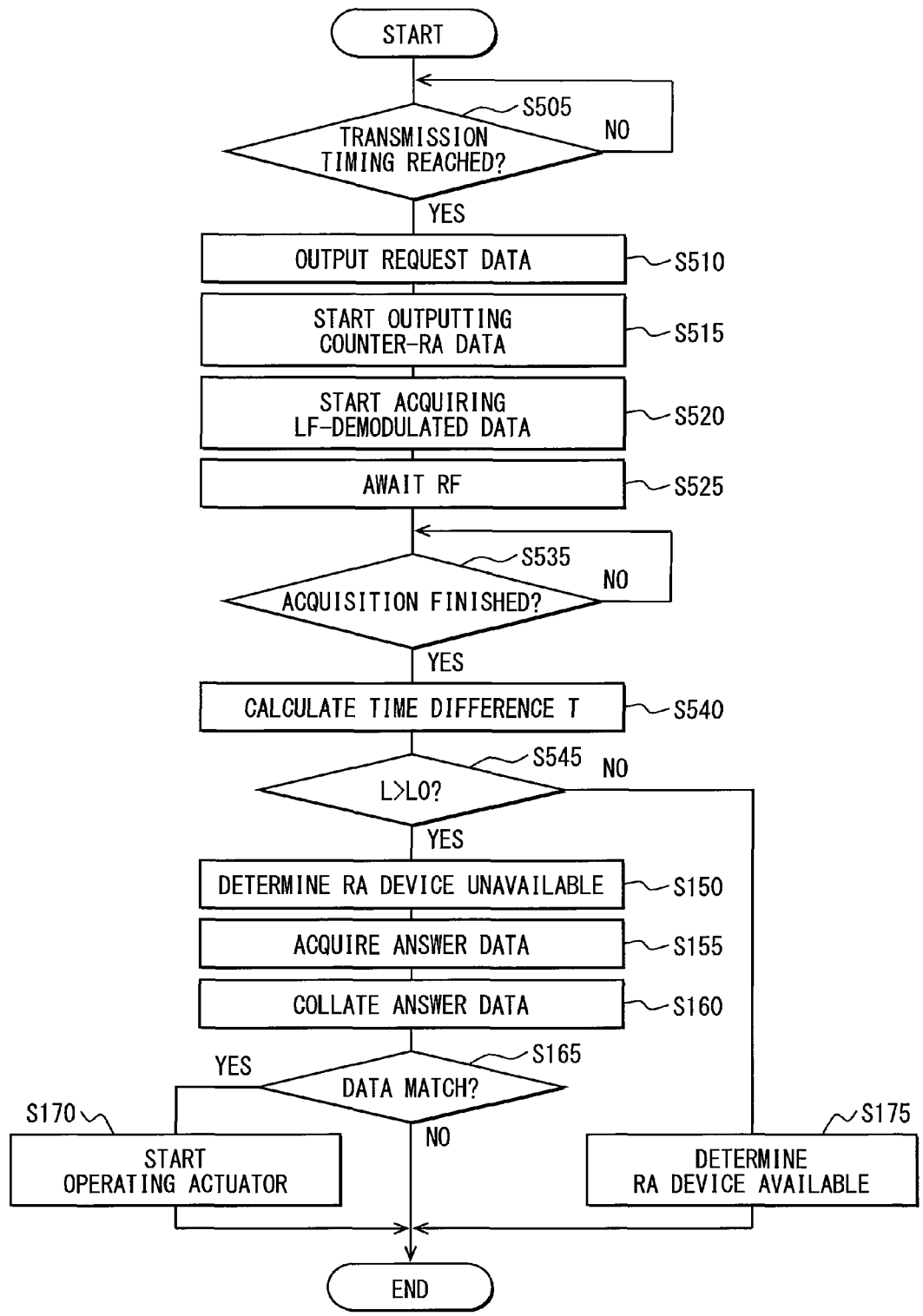
FIG. 26 is a flowchart illustrating a main process of a smart control portion according to the sixth embodiment.

In the main process 15, as illustrated in FIG. 26, the smart control portion 1 proceeds to S515 to provide control to start outputting a signal containing counter-RA data at time t1 when the data output process 11 finishes outputting the request data. Specifically, the smart control portion 1 issues an instruction to the data output process 11 to output counter-RA data. The embodiment predetermines the counter-RA data (e.g., data in which the bits representing 1 successively occurs) to be output as a DC signal whose level is constant (specifically set to Hi).

The data output process 11 starts outputting the counter-RA data according to the instruction. The data output process 11 thereby starts inputting the counter-RA data 42d to the multiplication process 14. The smart control portion 1 starts inputting a DC signal corresponding to the counter-RA data 42d to the LF modulation portion 3.

The LF modulation portion 3 multiplies the DC signal by the LF carrier signal from the LF carrier oscillator 6 to start outputting a resulting signal to the LF transmission antenna 2. Similarly to the first embodiment, the LF transmission antenna 2 starts wirelessly transmitting the counter-RA signal 42 (containing the counter-RA data) as an unmodulated wave.

After starting the output of the signal containing the counter-RA data at S515, the main process 15 immediately proceeds to S520 (without waiting for completion of the output) and starts acquiring data to be input from the LF demodulation process 12.

The smart control portion 1 does not receive the counter-RA modulation signal 43 from the portable device 20 yet at time t21 (see FIG. 27) when the data acquisition started. The multiplication process 14 acquires counter-RA data from the data output process 11 but acquires only data indicating 0 from the HPF process 13. The multiplication process 14 supplies the LF demodulation process 12 with the data containing bits representing 0. Therefore, the data input to the main process by LF demodulated by the LF demodulation process 12 is data made of bits representing 0.

After S520, the smart control portion 1 proceeds to S525 and waits until the RF demodulation portion 5 receives an RF band signal. Actually, as will be described later, the RF demodulation portion 5 receives an RF band signal soon (after several to several tens of microseconds).

On the other hand, the switching circuit 27 of the portable device 20 enters the reception signal output state. In this state, the LF reception antenna 21 receives the counter-RA signal 42. The amplifier 22 amplifies the counter-RA signal 42 and inputs it to the switching circuit 27.

The counter-RA signal 42 received by the LF transmission antenna 21 is amplified and is input to the RF modulation portion 25. The RF modulation portion 25 uses the counter-RA signal 42 to BPSK-modulate the RF carrier signal (exemplifying a second carrier signal) from the RF carrier oscillator 26. The RF modulation portion 25 outputs the counter-RA modulation signal 43 (containing the counter-RA data 43*d*) resulting from the modulation to the RF transmission antenna 24. The RF transmission antenna 24 then wirelessly transmits the counter-RA modulation signal 43 in the RF band.

At S220 after S215, the mobile control portion 28 collates the acquired request data with authentic request data similarly to the first embodiment while the RF transmission antenna 24 transmits the counter-RA modulation signal 43. At S225, the mobile control portion 28 determines whether the acquired request data is authentic.

In this example, the request data is received from the authentic onboard system 10 (i.e., corresponding to the portable device 20). At S225, the mobile control portion 28 determines that the request data is authentic, and then proceeds to S230.

Unlike the example, unauthentic request data results from the demodulation of the LF demodulation portion 23 if the portable device 20 receives a signal from an unauthentic onboard system 10 or other communication devices. At S225, the request data does not match the authentic request data. The mobile control portion 28 determines that the request data is unauthentic. In this case, the process returns to S205 without outputting answer data. Consequently, the portable device 20 does not wirelessly transmit an answer signal to the onboard system 10. The onboard system 10 performs no smart drive.

Returning back to the description of the example, the following assumes that the mobile control portion 28 determines the request data to be authentic at S225, and then proceeds to S230. At S230, the mobile control portion 28 waits until the switching circuit 27 finishes outputting the counter-RA signal 42 to the RF modulation portion 25.

In the onboard system 10, the main process 15 for the smart control portion 1 starts transmitting the counter-RA signal 42, passes S520, and proceeds to S525 to wait until wireless reception at the RF demodulation portion 5. As described above, the portable device 20 transmits the counter-RA modulation signal 43 soon after the onboard system 10 starts transmitting the counter-RA signal 42. The RF demodulation portion 5 receives the counter-RA modulation signal 43 via the RF reception antenna 4, BPSK-demodulates the signal using an RF carrier signal, and outputs the BPSK-demodulated signal to the smart control portion 1.

The main process 15 proceeds to S535 when the BPSK-demodulated signal starts being input to the smart control portion 1. The smart control portion 1 determines whether it finishes acquiring an RF-demodulated signal from the RF demodulation portion 5. The smart control portion 1 repeats the determination process until determining that it finishes acquiring an RF-demodulated signal from the RF demodulation portion 5.

For example, the smart control portion 1 may determine completion of acquiring the RF-demodulated signal from the RF demodulation portion 5 based on a signal input to the main process 15 from the demodulation portion 52 if the input signal voltage or a variation in the voltage reaches a previously designed threshold value or smaller. Alternatively, the smart control portion 1 may determine completion of the signal acquisition based on a signal input to the main process 15 from the LF demodulation process 12 if the input signal voltage or a variation in the voltage reaches a previously designed threshold value or smaller for a predetermined period (e.g., one-cycle time of a 134 kHz carrier signal).

At t22 (see FIG. 27), the RF demodulation portion 5 receives and RF-demodulates the counter-RA modulation signal 43 while the smart control portion 1 awaits completion of acquiring the RF-demodulated signal from the RF demodulation portion 5. The RF-demodulated signal (corresponding to the counter-RA signal 42) is input to the HPF process 13. The HPF process 13 removes a DC component (a frequency lower than the LF band) from the counter-RA signal 42. The multiplication process 14 is supplied with the counter-RA signal 42 whose DC component is removed.

The multiplication process 14 multiplies the RA data 42*d* input from the data output process 11 by the counter-RA signal 42 input from the HPF process 13. Since the RA data 42*d* is set to value 1, the counter-RA signal 42 is input to the LF demodulation process 12 as the multiplication result.

Figure 27:
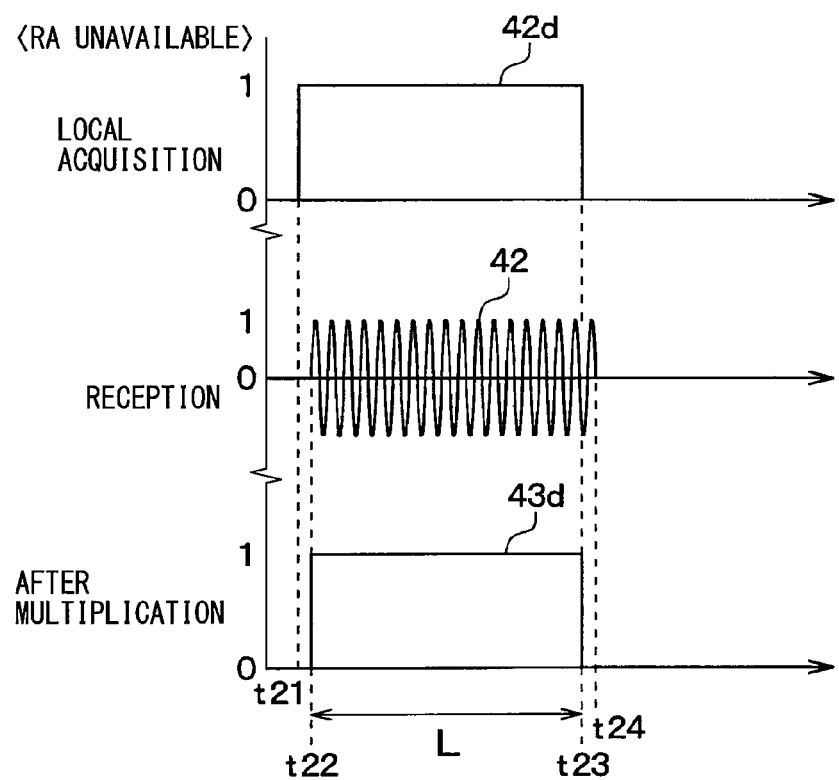
FIG. 27 illustrates duration L in the absence of relay station attack.

The LF demodulation process 12 LF-demodulates the input counter-RA signal 42 to acquire a bit string (a string of bits representing 1) contained in the counter-RA data 43*d* (see FIG. 27). The LF demodulation process 12 inputs the bit string to the main process 15. This state continues from time t22 to time t23 (see FIG. 27).

At time t23, the data output process 11 finishes outputting the counter-RA data 42*d*. Thereafter, the data output process 11 supplies the multiplication process 14 with data of bits whose values are set to 0.

Therefore, the multiplication process 14 supplies the LF demodulation process 12 with a multiplication result set to 0 though the HPF process 13 still inputs the counter-RA signal 42 to the multiplication process 14.

Consequently, the LF demodulation process 12 also supplies the main process 15 with a bit string containing 0. This state continues from time t23 to time t24 (see FIG. 7). At time t24, the RF demodulation portion 5 finishes acquiring the RF-demodulated signal. At S535 in the main process 15, the smart control portion 1 determines completion of the signal acquisition and then proceeds to S540.

At S540, the smart control portion 1 calculates duration L. As illustrated in FIG. 27, duration L equals t23 minus t22 and signifies a duration in which the LF demodulation process 12 continues to supply the main process 15 with a bit string representing 1.

As illustrated in FIG. 27, the smart control portion 1 transmits counter-RA data 42*d* (counter-RA data contained in the counter-RA signal 42) to the portable device 20 at transmission timing t21. The smart control portion 1 receives counter-RA data 43*d* (counter-RA data contained in the returned counter-RA signal 42) from the portable device 20 at reception timing t22. Delay time T for t22 is expressed as T=t22−t21.

Delay time T and duration L maintain the one-to-one relation. Specifically, relation T+L=X is applicable, where X denotes the length of the counter-RA data 42*d* transmitted to the portable device 20.

If no relay station attack intervenes like this example, delay time T is very large compared to intervention of the relay station attack. The presence or absence of relay station attack intervention can be determined according to whether delay time T is greater than or equal to or smaller than reference time T0.

Therefore, the use of duration L can also determine the presence or absence of relay station attack intervention. Specifically, reference duration L0=X−T0 is predetermined. At S545 after S540, the smart control portion 1 determines whether duration L is greater than reference duration L0.

In the example, duration L is greater than reference duration L0 because no RA relay station intervenes in communication between the onboard system 10 and the portable device 20. Therefore, the process proceeds to S150. Proceeding to S150 from S545 signifies enabling the smart drive (under condition that the answer signal is authentic). At S150 and later, operation of the onboard system 10 and corresponding operation of the portable device 20 equal the first embodiment.

The following mainly describes a difference between the above-mentioned example of no relay station attack intervention and examples of the relay station attack intervention as illustrated in FIGS. 2 and 3.

According to the examples illustrated in FIGS. 2 and 3, the onboard system 10 transmits the request signal 41 (containing the request data) and the counter-RA signal 42 (containing the counter-RA data). The RA relay stations 94 and 95 relay the signals. The portable device 20 receives the signals.

According to the example in FIG. 2, the portable device 20 transmits the counter-RA modulation signal 43 (containing the counter-RA data) and the answer signal 41 (containing the answer data). The onboard system 10 receives the signals similarly to the above-mentioned example where no relay station attack intervenes.

According to the example in FIG. 3, the portable device 20 transmits the counter-RA modulation signal 43 (containing the counter-RA data) and the answer signal 41 (containing the answer data). The RA relay stations 96 and 97 relay the signals. The onboard system 10 receives the signals.

Therefore, operation of the portable device 20 equals the above-mentioned example where no relay station attack intervenes. Operation of the onboard system 10 equals the above-mentioned example where no relay station attack intervenes until the smart control portion 1 proceeds to S540 of the main process 15.

Figure 28:
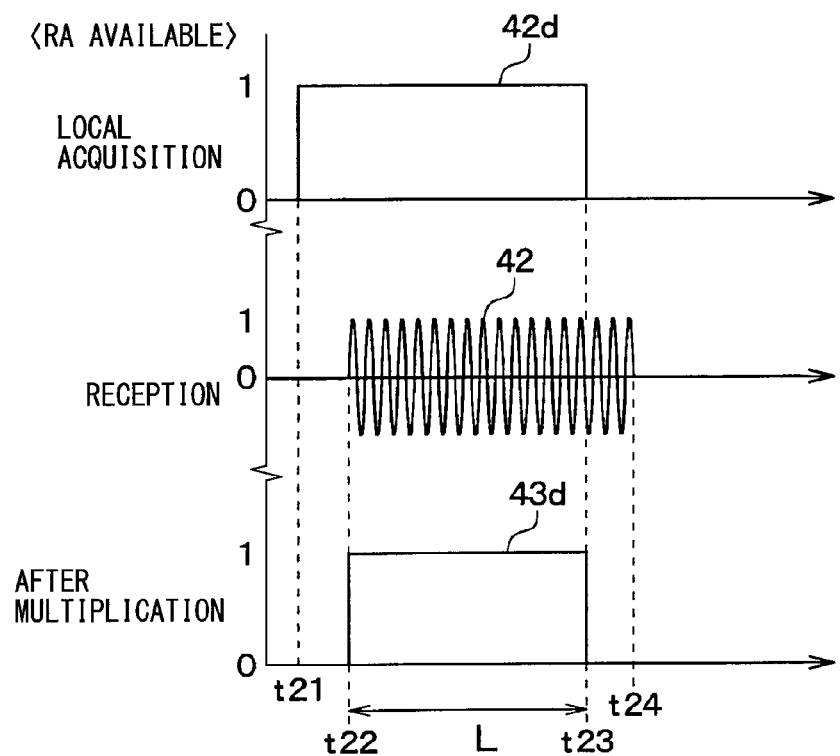
FIG. 28 illustrates duration L in the absence of relay station attack.

However, the RA relay stations 94 and 95 perform demodulation and modulation, respectively, thus increasing the communication delay time. As illustrated in FIG. 28, intervention of the relay station attack increases time difference T=t22−t21 calculated at S140 of the main process 15 as illustrated in FIG. 5 compared to the case of no relay station attack. As a result, the smart control portion 1 determines that duration L is smaller than reference duration L0 at S545. The process proceeds to S175.

Advancing the process to S175 from S545 inhibits the smart drive. At S175, according to the same process as the first embodiment, the smart control portion 1 determines that the relay station attack intervenes.

According to the embodiment, the smart control portion 1 transmits counter-RA data (contained in the counter-RA signal 42) to the portable device 20 at transmission timing t21. The smart control portion 1 receives the counter-RA data (contained in the counter-RA modulation signal 43) from the portable device 20 at reception timing t22. Timing t22 follows timing t21 after delay time T. One-to-one relation exists between delay time T and duration L. The smart control portion 1 compares duration L with reference duration L0. The smart control portion 1 determines no intervention of the relay station attack if duration L exceeds reference duration L0. The smart control portion 1 determines intervention of the relay station attack if duration L is smaller than or equal to reference duration L0.

Similarly to the first embodiment, the portable device 20 according to the third embodiment does not demodulate the received counter-RA signal 42 (containing the counter-RA data). The counter-RA signal 42 is input to the RF modulation portion 25 from the amplifier 22 via the switching circuit 27 to bypass the LF demodulation portion 23. Therefore, delay time D2 is independent of the LF reception field intensity.

Since reference duration L0 is provided, the presence or absence of relay station attack intervention can be determined with a high probability regardless of the LF reception field intensity, namely, a distance between the onboard system and the portable device 20.

Seventh Embodiment

The following describes the seventh embodiment of the disclosure mainly with respect to differences from the sixth embodiment. The onboard system 10 and the portable device 20 according to the seventh embodiment use the same hardware configuration as the sixth embodiment. The seventh embodiment differs from the sixth embodiment in transmission timings of the counter-RA signal 42, the counter-RA modulation signal 43, the request signal 41, and the answer signal 44 as well as contents of the main process 15 in the smart control portion 1 and process contents of the mobile control portion 28 to implement the transmission timings.

Figure 29:
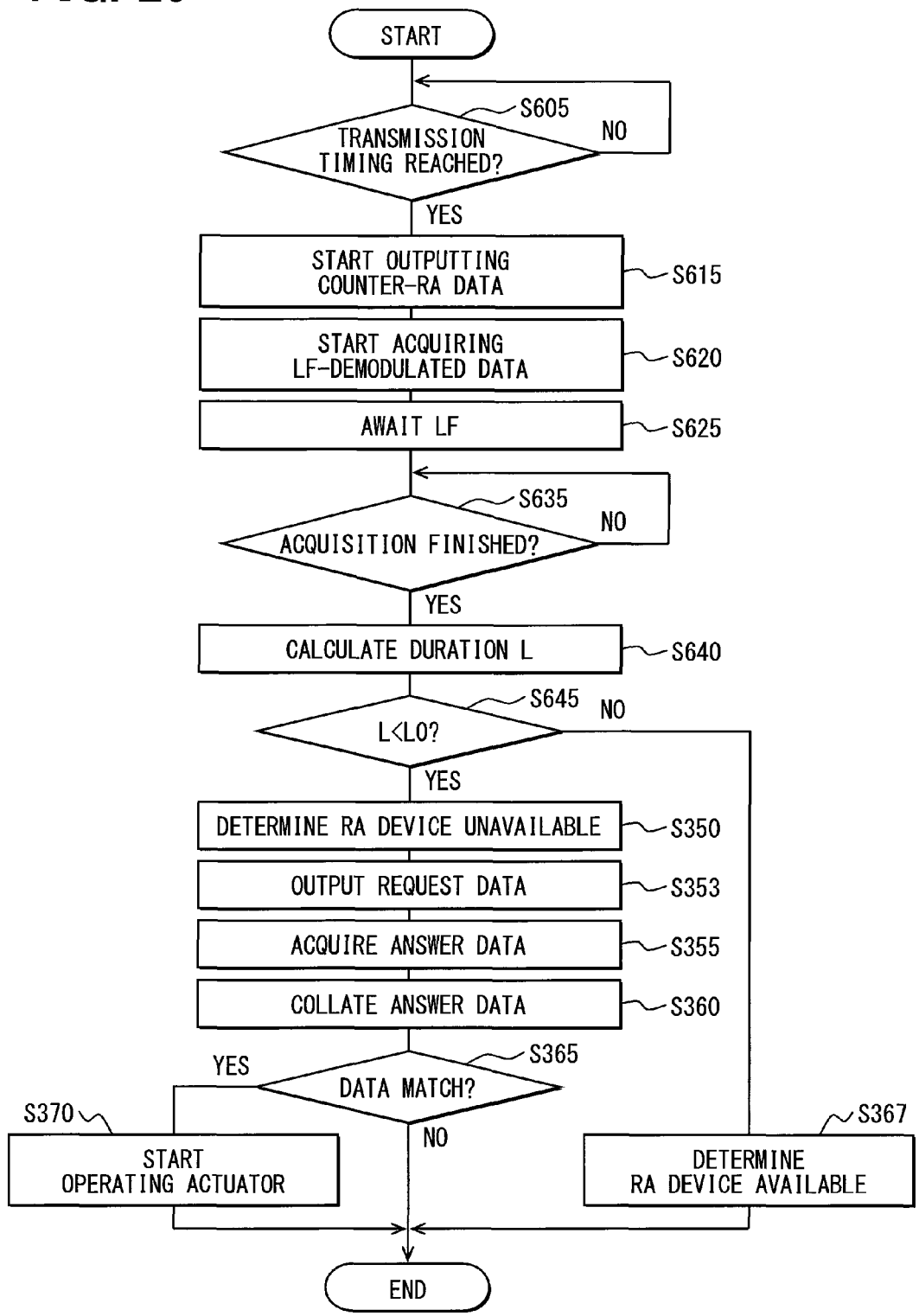
FIG. 29 is a flowchart illustrating a main process of a smart control portion according to a seventh embodiment.

FIG. 29 illustrates a flowchart of the main process 15 according to the embodiment. A flowchart illustrating the process of the mobile control portion 28 according to the seventh embodiment equals FIG. 16 according to the second embodiment. A timing chart illustrating timings of signals (counter-RA signal 42, request signal 41, counter-RA modulation signal 43, and answer signal 44) exchanged in the LF band and the RF band equals FIG. 17.

As illustrated in FIG. 17, the seventh embodiment differs from the first embodiment in that the onboard system 10 first transmits the counter-RA signal 42 and then transmits the request signal 41. The following describes operation of the smart system according to the seventh embodiment mainly with respect to differences from the first embodiment.

The following describes a case where the user 91 carrying the portable device 20 approaches a vehicle and the portable device 20 enters the communicable range 53 of the onboard system 10 as illustrated in FIG. 1. At S250 in FIG. 16, the mobile control portion 28 of the portable device 20 waits until the portable device 20 receives a signal or an LF band signal (namely, until the LF demodulation portion 23 of the portable device 20 receives a signal of predetermined intensity or more). The switching circuit 27 is set to the data output state similarly to the sixth embodiment.

At S605 of the main process 15, the smart control portion 1 of the onboard system 10 waits for a transmission timing similarly to S505 according to the sixth embodiment.

At the transmission timing, the smart control portion 1 proceeds to S615 and controls the data output process 11 to start outputting the counter-RA signal 42 in the same method as S515 of the sixth embodiment. Similarly to the sixth embodiment, an LF carrier output from the LF carrier oscillator 6 is multiplied by a signal (DC signal) containing counter-RA data output from the data output process 11. The counter-RA signal 42 as a resulting signal starts being wirelessly transmitted from the LF transmission antenna 2.

Transmission of the counter-RA signal 42 (output of the counter-RA data 42d from the data output process 11) continues for a predetermined period (e.g., several milliseconds) between time t3 and time t4 (see FIG. 17). During this period, the data output process 11 also locally starts inputting the same the counter-RA signal 42 to the multiplication process 14.

Soon after the LF modulation portion 3 starts wirelessly transmitting the counter-RA signal 42, the main process 15 proceeds to S620 and starts acquiring data input from the LF demodulation process 12 in the same method as S520 in FIG. 26.

The main process 15 immediately (without waiting for completion of acquiring the data from the LF demodulation process 12) proceeds to S625 and waits until the RF demodulation portion 5 receives an RF band signal. Actually, as will be described later, the RF demodulation portion 5 soon receives an RF band signal.

In the portable device 20, the mobile control portion 28 advances the process to S255 from S250 when the LF reception antenna 21, the amplifier 22, and the LF demodulation portion 23 start receiving the counter-RA signal 42. The mobile control portion 28 changes the switching circuit 27 to the reception signal output state to start inputting the counter-RA signal to the RF modulation portion 25. The LF reception antenna 21 receives the counter-RA signal 42. The amplifier 22 amplifies the signal and starts inputting it to the switching circuit 27. Therefore, the counter-RA signal 42 received by the LF transmission antenna 21 is amplified and is input to the RF modulation portion 25. The RF modulation portion 25 uses the counter-RA signal 42 to BPSK-modulate the RF carrier signal (exemplifying a second carrier signal) from the RF carrier oscillator 26. The RF modulation portion 25 outputs the counter-RA modulation signal 43 resulting from the modulation to the RF transmission antenna 24. The RF transmission antenna 24 then wirelessly transmits the counter-RA modulation signal 43 in the RF band.

At S255, the mobile control portion 28 waits until the switching circuit 27 finishes outputting the counter-RA signal 42 to the RF modulation portion 25 while the RF transmission antenna 24 transmits the counter-RA modulation signal 43. The mobile control portion 28 uses the same method as S230 of the first embodiment to determine whether output of the counter-RA signal 42 finishes.

In the onboard system 10, the main process 15 for the smart control portion 1 starts transmitting the counter-RA signal 42, passes S620, and proceeds to S625 to wait until wireless reception at the RF demodulation portion 5. As described above, the portable device 20 transmits the counter-RA modulation signal 43 soon after the onboard system 10 starts transmitting the counter-RA signal 42. The RF demodulation portion 5 receives the counter-RA modulation signal 43 via the RF reception antenna 4, BPSK-demodulates (RF-demodulates) the signal, and outputs it to the smart control portion 1 and the LF demodulation process 12.

The main process 15 proceeds to S635 when the BPSK-demodulated signal starts being input to the smart control portion 1. According to the same process as S535 in FIG. 26, the smart control portion 1 determines whether it finishes acquiring an RF-demodulated signal from the RF demodulation portion 5. The smart control portion 1 repeats the determination process until determining that it finishes acquiring an RF-demodulated signal from the RF demodulation portion 5.

At t22 (see FIG. 27), the RF demodulation portion 5 receives and RF-demodulates the counter-RA modulation signal 43 while the smart control portion 1 awaits completion of acquiring the RF-demodulated signal from the RF demodulation portion 5. The RF-demodulated signal (corresponding to the counter-RA signal 42) is input to the HPF process 13. The HPF process 13 removes a DC component (a frequency lower than the LF) from the counter-RA signal 42. The multiplication process 14 is supplied with the counter-RA signal 42 whose DC component is removed.

The multiplication process 14 multiplies the RA data 42d input from the data output process 11 by the counter-RA signal 42 input from the HPF process 13. Since the RA data 42d is set to value 1, the counter-RA signal 42 is input to the LF demodulation process 12 as the multiplication result.

The LF demodulation process 12 LF-demodulates the input counter-RA signal 42 to acquire a bit string (a string of bits representing 1) contained in the counter-RA data 43d (see FIG. 27). The LF demodulation process 12 inputs the bit string to the main process 15. This state continues from time t22 to time t23 (see FIG. 27).

At time t23, the data output process 11 finishes outputting the counter-RA data 42d. Thereafter, the data output process 11 supplies the multiplication process 14 with data of bits whose values are set to 0.

Therefore, the multiplication process 14 supplies the LF demodulation process 12 with a multiplication result set to 0 though the HPF process 13 still inputs the counter-RA signal 42 to the multiplication process 14.

Consequently, the LF demodulation process 12 also supplies the main process 15 with a bit string containing 0. This state continues from time t23 to time t24 (see FIG. 7). At time t24, the smart control portion 1 finishes acquiring the RF-demodulated signal from the RF demodulation portion 5. At S635 in the main process 15, the smart control portion 1 determines completion of the signal acquisition and then proceeds to S640.

At S640, the smart control portion 1 calculates duration L according to the same process as S540 in FIG. 26. At S545 after S540, the smart control portion 1 determines whether duration L is greater than reference duration L0 (the same as the sixth embodiment).

In the example, duration L is greater than reference duration L0 because no RA relay station intervenes in communication between the onboard system 10 and the portable device 20. Therefore, the process proceeds to S350. Proceeding to S350 from S645 signifies enabling the smart drive (under condition that the answer signal is authentic). At S350 and later, operation of the onboard system 10 and corresponding operation of the portable device 20 equal the second embodiment.

The following describes cases of relay station attack intervention (in the same intervention method as described in the sixth embodiment) as illustrated in FIGS. 2 and 3 mainly with respect to differences from the case where no relay station attack intervenes.

According to examples in FIGS. 2 and 3, operation of the portable device 20 equals the above-mentioned example of no relay station attack intervention. Operation of the onboard system 10 equals the above-mentioned example of no relay station attack intervention until the smart control portion 1 proceeds to S640 of the main process 15.

However, the RA relay stations 94 and 95 perform demodulation and modulation, respectively, thus increasing communication delay time T. As illustrated in FIG. 28, the relay station attack intervention increases duration L=t23−t22 calculated at S640 of the main process 15 as illustrated in FIG. 29 compared to no relay station attack intervention. As a result, at S645, the smart control portion 1 determines that duration L is greater than reference duration L0. The process proceeds to S375. Advancing the process to S375 from S645 inhibits the smart drive.

At S375, according to the same process as S175 in FIG. 6, the smart control portion 1 determines that the relay station attack intervenes. After S375, the process returns to S605.

According to the embodiment, the smart control portion 1 transmits counter-RA data (contained in the counter-RA signal 42) to the portable device 20 at transmission timing t21. The smart control portion 1 receives the counter-RA data (contained in the counter-RA modulation signal 43) from the portable device 20 at reception timing t22. Timing t22 follows timing t21 after delay time T. One-to-one relation exists between delay time T and duration L. The smart control portion 1 compares duration L with reference duration L0. The smart control portion 1 determines no intervention of the relay station attack if duration L exceeds reference duration L0. The smart control portion 1 determines intervention of the relay station attack if duration L is smaller than or equal to reference duration L0.

Similarly to the sixth embodiment, the portable device 20 according to the seventh embodiment does not demodulate the received counter-RA signal 42 (containing the counter-RA data). The counter-RA signal 42 is input to the RF modulation portion 25 from the amplifier 22 via the switching circuit 27 to bypass the LF demodulation portion 23. Therefore, delay time D2 is independent of the LF reception field intensity.

Since reference time L0 is provided similarly to the sixth embodiment, the presence or absence of relay station attack intervention can be determined with a high probability regardless of the LF reception field intensity, namely, a distance between the onboard system and the portable device 20.

The onboard system 10 according to the embodiment starts wirelessly transmitting the counter-RA signal 42 (S615) and starts acquiring data from the LF demodulation process 12 (S620). The portable device 20 starts receiving the counter-RA signal 42, performing RF modulation using the counter-RA signal 42, and wirelessly transmitting the counter-RA modulation signal 43 (S250 and S255). The onboard system 10 receives the carrier modulation signal 43 and calculates duration L (S640) corresponding to time difference T, namely, the delay time of the counter-RA data contained in the carrier modulation signal 43 with reference to the locally acquired counter-RA data 42d. The onboard system 10 transmits the counter-RA signal 42 at the transmission timing and receives the counter-RA modulation signal 43 at the reception timing. Time difference T equals a delay of the reception timing with reference to the transmission timing. The onboard system 10 compares the calculated duration L with reference duration L0 (S645). The onboard system 10 permits the smart drive (S370) if duration L exceeds reference duration L0. The onboard system 10 inhibits the smart drive (S375) if time duration L is smaller than or equal to reference duration L0.

When permitting the smart drive, the onboard system 10 terminates wireless transmission of the counter-RA signal 42 and then wirelessly transmits the request signal 41. The portable device 20 wirelessly receives the request signal 41 and, based on this, wirelessly transmits the answer signal 44. The onboard system 10 wirelessly receives the answer signal 44 and, based on this, performs the smart drive.

The counter-RA signal 42 is transmitted before transmission of the request signal 41. The counter-RA signal 42 is thereby also used as a burst signal that is transmitted from the onboard system 10 at the beginning of the communication. The burst signal is an unmodulated signal that is supplied to the beginning of a signal transmitted to the portable device 20 from the onboard system 10 so that the LF demodulation portion 23 of the portable device 20 is capable of stable demodulation. In a smart system of the related art, the onboard system 10 transmits the burst signal to the portable device 20.

The seventh embodiment that allows the counter-RA signal 42 to also function as the burst signal shortens the entire communication time and improves a communication response between the onboard system 10 and the portable device 20 compared to the sixth embodiment that wirelessly transmits the burst signal before the request signal 41, for example.

When disallowing the smart drive, the onboard system 10 does not wirelessly transmit the request signal 41 after finishing wirelessly transmitting the counter-RA signal 42. The portable device 20 does not transmit the answer signal 44 because the request signal 41 is not transmitted. Disallowing the smart drive eliminates the need to unnecessarily transmit the request signal 41 and the answer signal 44 and accordingly saves the power consumption.

Eighth Embodiment

The following describes the eighth embodiment of the disclosure mainly with respect to differences from the sixth embodiment. The onboard system 10 and the portable device 20 according to the eighth embodiment use the same hardware configuration as the sixth embodiment. The eighth embodiment differs from the sixth embodiment in transmission timings of the counter-RA signal 42, the counter-RA modulation signal 43, the request signal 41, and the answer signal 44 as well as contents of the main process 15 in the smart control portion 1 and process contents of the mobile control portion 28 to implement the transmission timings.

Figure 30:
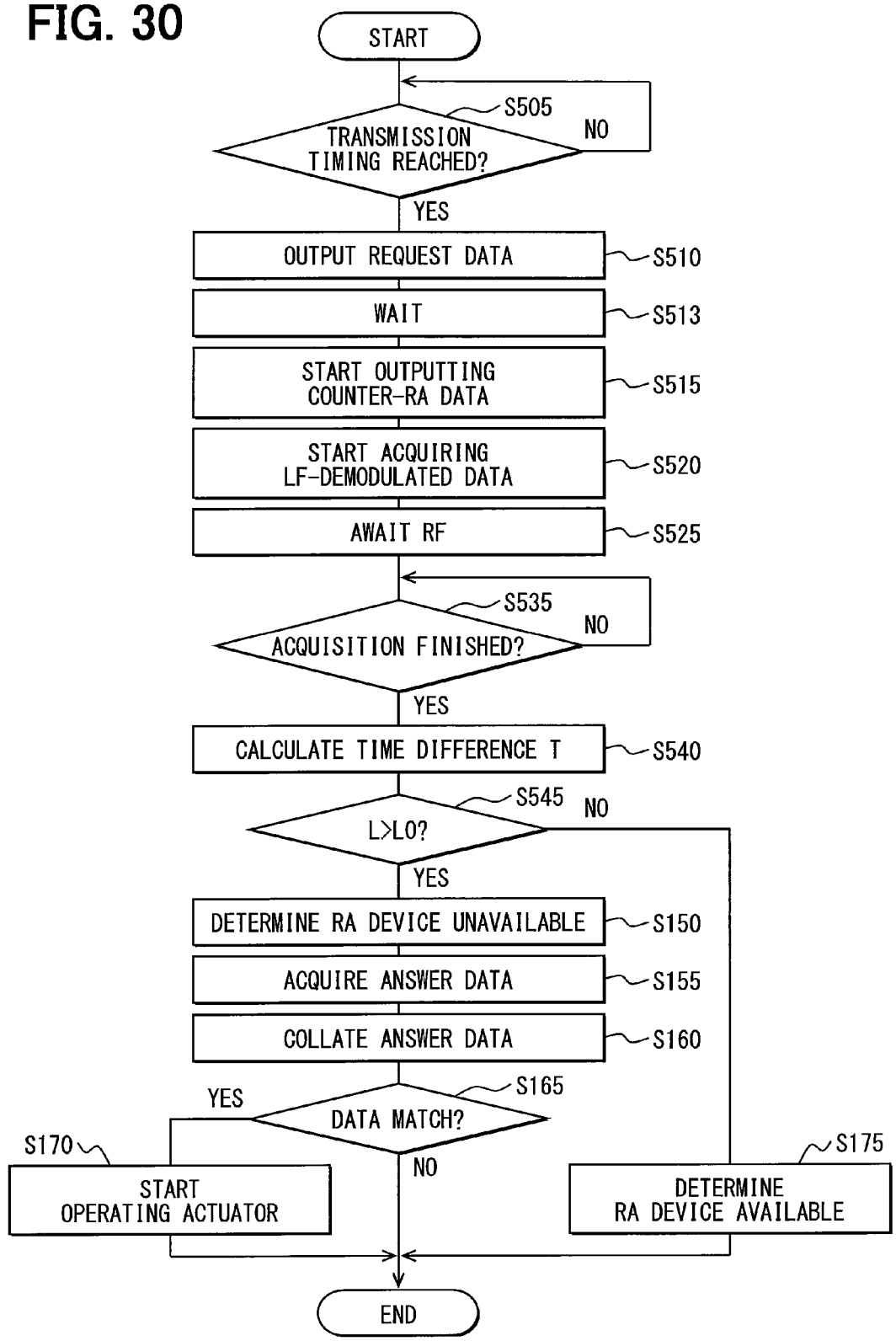
FIG. 30 is a flowchart illustrating a main process of a smart control portion according to an eighth embodiment.

FIG. 30 illustrates a flowchart of the main process 15 according to the embodiment. A flowchart illustrating the process of the mobile control portion 28 according to the eighth embodiment equals FIG. 19 according to the third embodiment. A timing chart illustrating timings of signals (counter-RA signal 42, request signal 41, counter-RA modulation signal 43, and answer signal 44) exchanged in the LF band and the RF band equals FIG. 20.

Operation of the onboard system 10 according to the eighth embodiment equals the sixth embodiment except that the timing to start transmitting the counter-RA signal 42 is later than the sixth embodiment. Accordingly, the flowchart of the main process 15 is the same as the process in FIG. 26 just supplemented by the process at S513.

Operation of the smart system according to the eighth embodiment will be described mainly with respect to differences from the sixth embodiment. The following describes a case where the user 91 carrying the portable device 20 approaches a vehicle and the portable device 20 enters the communicable range 53 of the onboard system 10 as illustrated in FIG. 1.

At S405 in FIG. 19, the mobile control portion 28 of the portable device 20 waits until the portable device 20 receives a signal or an LF band signal (namely, until the LF demodulation portion 23 of the portable device 20 receives a signal of predetermined intensity or more). The switching circuit 27 is set to the data output state similarly to the sixth embodiment. At S505 of the main process 15 in FIG. 30, the smart control portion 1 of the onboard system 10 waits for a transmission timing.

When the transmission timing is reached, the main process 15 proceeds to S510 to generate specified request data and instructs the data output process 11 to output the request data similarly to the sixth embodiment. The LF modulation portion 3 uses the request data to modulate the LF carrier signal output from the LF carrier oscillator 6. The LF modulation portion 3 uses the LF transmission antenna 2 to wirelessly transmit the request signal 41 as a modulation result (see FIG. 20).

In the portable device 20, the LF reception antenna 21 receives the request signal 41. The request signal 41 is input to the LF demodulation portion 23 and the switching circuit 27 via the amplifier 22. Since the switching circuit 27 is set to the data output state, the request signal 41 is not input to the RF modulation portion 25 from the switching circuit 27.

The LF demodulation portion 23 demodulates the input request signal 41 to acquire the request data and inputs the acquired request data to the mobile control portion 28. When the request data input starts, the mobile control portion 28 proceeds to S410 to acquire the input request data. When finishing acquisition of the request data at time t5 (see FIG. 20), the mobile control portion 28 proceeds to S415 and collates the request data with authentic request data previously stored in the storage medium to determine whether the acquired request data is authentic. At S420, the mobile control portion 28 determines whether the acquired request data matches the authentic request data, namely, whether the acquired request data is authentic.

In this example, the request data is received from the authentic onboard system 10. At S420, the mobile control portion 28 determines that the request data is authentic, and then proceeds to S425.

The process proceeds to S425 at time t6 that is later than time t5 when acquisition of the request signal 41 has finished. A period 46 between time t5 and time t6 corresponds to the time to authenticate the request data. The period 46 is required to determine whether request data is authentic. At S425, the mobile control portion 28 changes the switching circuit 27 to the reception signal output state.

Unlike the example, unauthentic request data results from the demodulation of the LF demodulation portion 23 if the portable device 20 receives a signal from an unauthentic onboard system 10 or other communication devices. At S420, the request data does not match the authentic request data. The mobile control portion 28 determines that the request data is unauthentic. In this case, the process returns to S405 without outputting answer data. Consequently, the portable device 20 does not wirelessly transmit an answer signal to the onboard system 10. The onboard system 10 performs no smart drive.

Returning back to the description of the example, the smart control portion 1 proceeds to S513 of the main process 15 at time t5 when the data output process 11 finishes outputting the request data. The smart control portion 1 then waits for a predetermined time. The predetermined time corresponds to the time 46 or a longer time 45. The time 46 is previously estimated to be required for the portable device 20 to collate the request data (S415) and determine the authenticity (S420). The storage medium of the smart control portion 1 previously records the predetermined time as a fixed value. At time t7, the smart control portion 1 finishes waiting at S513 and the mobile control portion 28 already finishes the process at S415 and S420 (already at time t6).

After S513, the smart control portion 1 proceeds to S515 to provide control to start outputting an LF carrier similarly to the sixth embodiment. The LF modulation portion 3 thereby uses the LF transmission antenna 2 to start wirelessly transmitting the counter-RA signal 42 (containing the counter-RA data) as an unmodulated wave from time t7.

The data output process 11 and the LF modulation portion 3 continue to transmit the counter-RA signal 42 for a period (e.g., several milliseconds) from time t7 to time t8.

Soon after the LF modulation portion 3 starts wirelessly transmitting the counter-RA signal 42, the main process 15 proceeds to S520 and starts acquiring data input from the LF demodulation process 12.

The smart control portion 1 does not receive the counter-RA modulation signal 43 from the portable device 20 yet at time t21 (detail of time t7, see FIG. 27) when the data acquisition started. The multiplication process 14 acquires counter-RA data from the data output process 11 but acquires only data indicating 0 from the HPF process 13. The multiplication process 14 supplies the LF demodulation process 12 with the data that contains bits representing 0. Therefore, the data containing bits representing 0 is also LF-demodulated in the LF demodulation portion 12 and is input to the main process.

After S520, the smart control portion 1 proceeds to S525 and waits until the RF demodulation portion 5 receives an RF band signal. Actually, as will be described later, the RF demodulation portion 5 receives an RF band signal soon (after several to several tens of microseconds).

On the other hand, the switching circuit 27 of the portable device 20 enters the reception signal output state. In this state, the LF reception antenna 21 receives the counter-RA signal 42. The amplifier 22 amplifies the counter-RA signal 42 and inputs it to the switching circuit 27.

On the other hand, the switching circuit 27 of the portable device 20 enters the reception signal output state. In this state, the LF reception antenna 21 receives the counter-RA signal 42. The amplifier 22 amplifies the counter-RA signal 42 and inputs it to the switching circuit 27.

The counter-RA signal 42 received by the LF reception antenna 21 is amplified and is input to the RF modulation portion 25. The RF modulation portion 25 uses the counter-RA signal 42 to BPSK-modulate the RF carrier signal (exemplifying a second carrier signal) from the RF carrier oscillator 26. The RF modulation portion 25 outputs the counter-RA modulation signal 43 (containing the counter-RA data 43d) resulting from the modulation to the RF transmission antenna 24. The RF transmission antenna 24 then wirelessly transmits the counter-RA modulation signal 43 in the RF band.

At S425, the mobile control portion 28 waits until the switching circuit 27 finishes outputting the counter-RA signal 42 to the RF modulation portion 25.

In the onboard system 10, the main process 15 for the smart control portion 1 starts transmitting the counter-RA signal 42, passes S520, and proceeds to S525 to wait until wireless reception at the RF demodulation portion 5. As described above, the portable device 20 transmits the counter-RA modulation signal 43 soon after the onboard system 10 starts transmitting the counter-RA signal 42. The RF demodulation portion 5 receives the counter-RA modulation signal 43 via the RF reception antenna 4, BPSK-demodulates the signal using an RF carrier signal, and outputs the BPSK-demodulated signal to the smart control portion 1.

The main process 15 proceeds to S535 when the BPSK-demodulated signal starts being input to the smart control portion 1. The smart control portion 1 determines whether it finishes acquiring an RF-demodulated signal from the RF demodulation portion 5. The smart control portion 1 repeats the determination process until determining that it finishes acquiring an RF-demodulated signal from the RF demodulation portion 5.

For example, the smart control portion 1 may determine completion of acquiring the RF-demodulated signal from the RF demodulation portion 5 based on a signal input to the main process 15 from the demodulation portion 52 if the input signal voltage or a variation in the voltage reaches a previously designed threshold value or smaller. Alternatively, the smart control portion 1 may determine completion of the signal acquisition based on a signal input to the main process 15 from the LF demodulation process 12 if the input signal voltage or a variation in the voltage reaches a previously designed threshold value or smaller for a predetermined period (e.g., one-cycle time of a 134 kHz carrier signal).

At t22 (see FIG. 27), the RF demodulation portion 5 receives and RF-demodulates the counter-RA modulation signal 43 while the smart control portion 1 awaits completion of acquiring the RF-demodulated signal from the RF demodulation portion 5. The RF-demodulated signal (corresponding to the counter-RA signal 42) is input to the HPF process 13. The HPF process 13 removes a high-frequency component (higher than the LF band) from the counter-RA signal 42. The multiplication process 14 is supplied with the counter-RA signal 42 whose high-frequency component is removed.

The multiplication process 14 multiplies the RA data 42d input from the data output process 11 by the counter-RA signal 42 input from the HPF process 13. Since the RA data 42d is set to value 1, the counter-RA signal 42 is input to the LF demodulation process 12 as the multiplication result.

The LF demodulation process 12 LF-demodulates the input counter-RA signal 42 to acquire a bit string (a string of bits representing 1) contained in the counter-RA data 43d (see FIG. 27). The LF demodulation process 12 inputs the bit string to the main process 15. This state continues from time t22 to time t23 (see FIG. 27).

At time t23, the data output process 11 finishes outputting the counter-RA data 42d. Thereafter, the data output process 11 supplies the multiplication process 14 with data of bits whose values are set to 0.

Therefore, the multiplication process 14 supplies the LF demodulation process 12 with a multiplication result set to 0 though the HPF process 13 still inputs the counter-RA signal 42 to the multiplication process 14. Consequently, the LF demodulation process 12 also supplies the main process 15 with a bit string containing 0. This state continues from time t23 to time t24 (see FIG. 7).

At time t24 (detail of time t8), the LF modulation portion 3 finishes transmitting the counter-RA signal and the switching circuit 27 in the portable device 20 finishes outputting the counter-RA signal 42 to the RF modulation portion 25. The mobile control portion 28 advances the process to S430.

At S430, the mobile control portion 28 changes the switching circuit 27 to the data output state, generates specified answer data, and outputs the generated answer data to the switching circuit 27. The switching circuit 27 outputs the answer data to the RF modulation portion 25. The RF modulation portion 25 uses the answer data to BPSK-modulate the RF carrier signal from the RF carrier oscillator 26 and wirelessly transmits the modulated signal (i.e., the answer signal 44) from the RF transmission antenna 24. The process then returns to S205. The time to transmit the answer signal 44 ranges from several to 100 milliseconds.

At time t24, the onboard system finishes acquiring the RF-demodulated signal from the RF demodulation portion 5. At S535 in the main process 15, the smart control portion 1 determines completion of the signal acquisition and then proceeds to S540.

At S540, similarly to the sixth embodiment, the smart control portion 1 calculates duration L. At S545, similarly to the first embodiment, the smart control portion 1 compares duration L with reference duration L0 (the same as the sixth embodiment) and determines whether duration L is greater than reference duration L0.

In the example, duration L is greater than reference duration L0 because no RA relay station intervenes in communication between the onboard system 10 and the portable device 20. Therefore, the process proceeds to S150. Proceeding to S150 from S545 signifies enabling the smart drive (under condition that the answer signal is authentic).

At S150 and later, operation of the onboard system 10 and corresponding operation of the portable device 20 equal the third embodiment.

The following describes cases of relay station attack intervention (in the same intervention method as described in the sixth embodiment) as illustrated in FIGS. 2 and 3 mainly with respect to differences from the case where no relay station attack intervenes.

According to examples in FIGS. 2 and 3, operation of the portable device 20 equals the above-mentioned example of no relay station attack intervention. Operation of the onboard system 10 equals the above-mentioned example of no relay station attack intervention until the smart control portion 1 proceeds to S540 of the main process 15.

However, the RA relay stations 94 and 95 perform demodulation and modulation, respectively, thus increasing communication delay time T. As illustrated in FIG. 28, the relay station attack intervention increases duration L=t23−t22 calculated at S540 of the main process 15 as illustrated in FIG. 30 compared to no relay station attack intervention. As a result, at S545, the smart control portion 1 determines that duration L is greater than reference duration L0. The process proceeds to S175. Advancing the process to S175 from S545 inhibits the smart drive.

At S175, according to the same process as the sixth embodiment, the smart control portion 1 determines that the relay station attack intervenes. After S175, the process returns to S505.

According to the embodiment, the smart control portion 1 transmits counter-RA data (contained in the counter-RA signal 42) to the portable device 20 at transmission timing t21. The smart control portion 1 receives the counter-RA data (contained in the counter-RA modulation signal 43) from the portable device 20 at reception timing t22. Timing t22 follows timing t21 after delay time T. One-to-one relation exists between delay time T and duration L. The smart control portion 1 compares duration L with reference duration L0. The smart control portion 1 determines no intervention of the relay station attack if duration L exceeds reference duration L0. The smart control portion 1 determines intervention of the relay station attack if duration L is smaller than or equal to reference duration L0.

Similarly to the sixth embodiment, the portable device 20 according to the eighth embodiment does not demodulate the received counter-RA signal 42 (containing the counter-RA data). The counter-RA signal 42 is input to the RF modulation portion 25 from the amplifier 22 via the switching circuit 27 to bypass the LF demodulation portion 23. Therefore, delay time D2 is independent of the LF reception field intensity.

Since reference time L0 is provided similarly to the sixth embodiment, the presence or absence of relay station attack intervention can be determined with a high probability regardless of the LF reception field intensity, namely, a distance between the onboard system and the portable device 20.

As described above, the eighth embodiment provides the effect similar to the sixth embodiment. According to the embodiment, however, the mobile control portion 28 starts transmitting the counter-RA modulation signal 43 for the first time only when the mobile control portion 28 authenticates the received request data (S410 to S420, times t5 and t6) prior to the timing (S425, t7) to start transmitting the counter-RA modulation signal 43 containing the counter-RA signal 42 and determines the request data to be authentic after the authentication.

The portable device 20 wirelessly receives the request signal 41 and determines whether request data contained in the request signal 41 is authentic after finishing wirelessly receiving the request signal 41. Based on the determination that request data is authentic, the portable device 20 starts modulating the counter-RA signal 42 and wirelessly receiving the counter-RA modulation signal 43. Based on the determination that request data is unauthentic, the portable device 20 does not wirelessly transmit the carrier modulation signal 43 and the answer signal 44. When determining that request data is unauthentic, the portable device 20 need not transmit the counter-RA modulation signal 43 to conserve the power.

Ninth Embodiment

Figure 31:
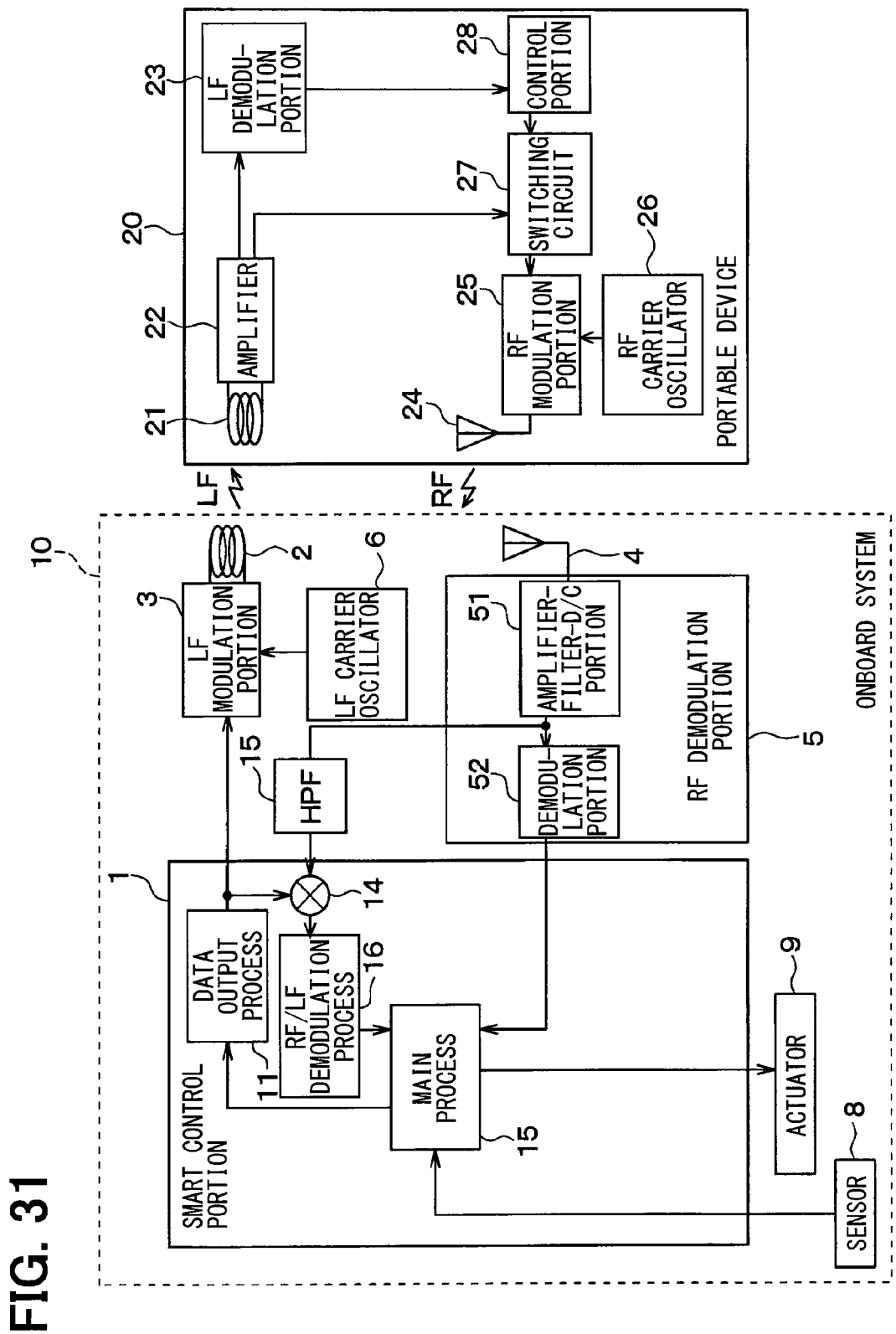
FIG. 31 is a configuration diagram illustrating a smart system according to a ninth embodiment.

The following describes the ninth embodiment of the disclosure. The embodiment changes the configuration of the onboard system 10 as illustrated in FIG. 31 compared to the sixth to eighth embodiments. The ninth embodiment will be described mainly with respect to differences from the sixth to eighth embodiments.

The configuration of the onboard system 10 according to the ninth embodiment differs from the configuration (see FIG. 25) of the onboard system 10 according to the sixth to eighth embodiments in that an HPF portion 15 is provided, the LF demodulation process 12 and the HPF process 13 are eliminated from the smart control portion 1, and an RF/LF demodulation process 16 is newly provided. The configuration and operations of the portable device 20 are unchanged from the sixth to eighth embodiments.

Operation of the onboard system 10 according to the embodiment will be described mainly with respect to differences from the sixth through eighth embodiments. According to the embodiment, the RF reception antenna 4 in the RF demodulation portion 5 receives a signal (e.g., the counter-RA modulation signal 43). The amplifier-filter-D/C portion 51 amplifies the signal, filters its frequency, performs frequency down-conversion on the signal into an IF band (an intermediate frequency band or a band approximate to 300 kHz according to the embodiment). The counter-RA modulation signal 43 is input to the demodulation portion 52 and the HPF portion 15. The HPF portion 15 supplies the smart control portion 1 with the counter-RA modulation signal 43 whose unnecessary low frequency components (lower than the RF carrier frequency) are removed.

The signal input from the HPF portion 15 is input to the multiplication process 14 of the smart control portion 1. The multiplication process 14 multiplies the signal input from the HPF portion 15 by the counter-RA data that is input from the data output process 11 similarly to the sixth to eighth embodiments. The signal resulting from the multiplication is input to the RF/LF demodulation process 16.

The RF/LF demodulation process 16 RF-demodulates (demodulation using a carrier signal in the above-mentioned intermediate frequency band) the signal input from the multiplication process 14. The RF/LF demodulation process 16 LF-demodulates (demodulation using an LF-band carrier signal) the signal resulting from the RF demodulation. The RF/LF demodulation process 16 supplies the main process 15 with the data resulting from the LF demodulation.

The main process 15 is changed from the sixth to eighth embodiments (see FIGS. 26, 29, and 30) as follows according to the above-mentioned basic operations of the multiplication process 14, the HPF portion 15, and the RF/LF demodulation process 16.

At S520 (S620 in the seventh embodiment), the smart control portion 1 acquires the LF-demodulated data from the RF/LF demodulation process 16 instead of acquiring the LF-demodulated data from the LF demodulation process 12.

The smart control portion 1 does not receive the counter-RA modulation signal 43 from the portable device 20 yet at time t21 (see FIG. 27) when the data acquisition started. The multiplication process 14 acquires counter-RA data from the data output process 11 but acquires only data indicating 0 from the HPF portion 15. The multiplication process 14 supplies the RF/LF demodulation process 16 with the data that contains bits representing 0. Therefore, the data containing bits representing 0 is also input to the main process 15 from the RF/LF demodulation process 16.

At t22 (see FIG. 27), the RF demodulation portion 5 receives and RF-demodulates the counter-RA modulation signal 43 while the smart control portion 1 awaits completion of acquiring the RF-demodulated signal from the RF demodulation portion 5 at S535 (S635 in the seventh embodiment).

The multiplication process 14 is supplied with an intermediate frequency band signal, namely, the counter-RA modulation signal 43 whose unnecessary low frequency components (lower than the RF carrier frequency) are removed in the HPF portion 15.

The multiplication process 14 multiplies the RA data 42d input from the data output process 11 by the intermediate frequency band signal input from the HPF portion 15. Since the RA data 42d is set to value 1, the intermediate frequency band signal is input to the RF/LF demodulation process 16 as the multiplication result.

The RF/LF demodulation process 16 RF-demodulates and LF-demodulates the input intermediate frequency band signal to acquire a bit string (a string of bits representing 1) contained in the counter-RA data 43d (see FIG. 27). The RF/LF demodulation process 16 inputs the bit string to the main process 15. This state continues from time t22 to time t23 (see FIG. 27).

At time t23, the data output process 11 finishes outputting the counter-RA data 42d. Thereafter, the data output process 11 supplies the multiplication process 14 with data of bits whose values are set to 0.

Therefore, the multiplication process 14 supplies the RF/LF demodulation process 16 with a multiplication result set to 0 though the HPF portion 15 still inputs the intermediate frequency band signal to the multiplication process 14.

According to the above-mentioned configuration, the smart control portion 1 transmits counter-RA data 42d (counter-RA data contained in the counter-RA signal 42) to the portable device 20 at transmission timing t21. The smart control portion 1 receives counter-RA data 43d (counter-RA data contained in the returned counter-RA signal 42) from the portable device 20 at reception timing t22. Timing t22 follows timing t21 after delay time T. At S540 (S640 in the seventh embodiment), the smart control portion 1 calculates duration L according to an equation of L=X−T similarly to the sixth to eighth embodiments.

At S540 (S640 in the seventh embodiment), the smart control portion 1 calculates duration L during which the RF/LF demodulation process 16, not the LF demodulation portion 12, continues supplying the main process 15 with a bit string representing 1.

A signal input to the RF/LF demodulation process 16 uses the carrier frequency equal to an IF frequency resulting from down-converting the RF. Only the presence or absence of a carrier needs to be determined. Just a detector (e.g., an AM demodulator) capable of determining the presence or absence of RF suffices without the need for RF/LF demodulation.

According to the above-mentioned configuration, the determination at S545 (S645 in the seventh embodiment) similarly to the sixth to eighth embodiments can highly reliably confirm the presence or absence of relay station attack intervention similarly to the sixth to eighth embodiments. The main process 15 operates equally to the sixth to eighth embodiments except the above-mentioned.

There is a difference between the LF demodulation performed by the RF/LF demodulation process 16 of the smart control portion 1 and the LF demodulation performed by the LF demodulation portion 23 of the portable device 20. The difference equals that between the LF demodulation process 12 and the LF demodulation portion 23 described in the first embodiment.

When the HPF portion 15 inputs a signal to the onboard system 10, an A/D converter (low frequency and high input impedance) provided for the smart control portion 1 ND-samples the signal. The RF/LF demodulation process 16 digitally demodulates the sampled digital data. In this case, the RF/LF demodulation process 16 may be replaced by a digital RF demodulator and a digital LF demodulator.

The A/D converter uses higher input impedance than input impedance of the LF demodulation portion 23 of the portable device 20. Therefore, a delay time variation (corresponding to the reception field intensity) resulting from the A/D converter and the RF/LF demodulation process 16 (or the digital RF demodulator and the digital LF demodulator) of the smart control portion 1 is smaller than a delay time variation (corresponding to the reception field intensity) resulting from the LF demodulation portion 23.

The A/D converter and the RF/LF demodulation process 16 (or the digital RF demodulator and the digital LF demodulator) may be replaced by an analog RF demodulator and a fast-response analog LF demodulator. The fast-response analog LF demodulator features higher sensitivity, lower frequency, and higher impedance than the LF demodulation portion 23 of the portable device 20. The other operations of the fast-response analog LF demodulator are equal to those of the LF demodulation portion 23.

Tenth Embodiment

Figure 32:
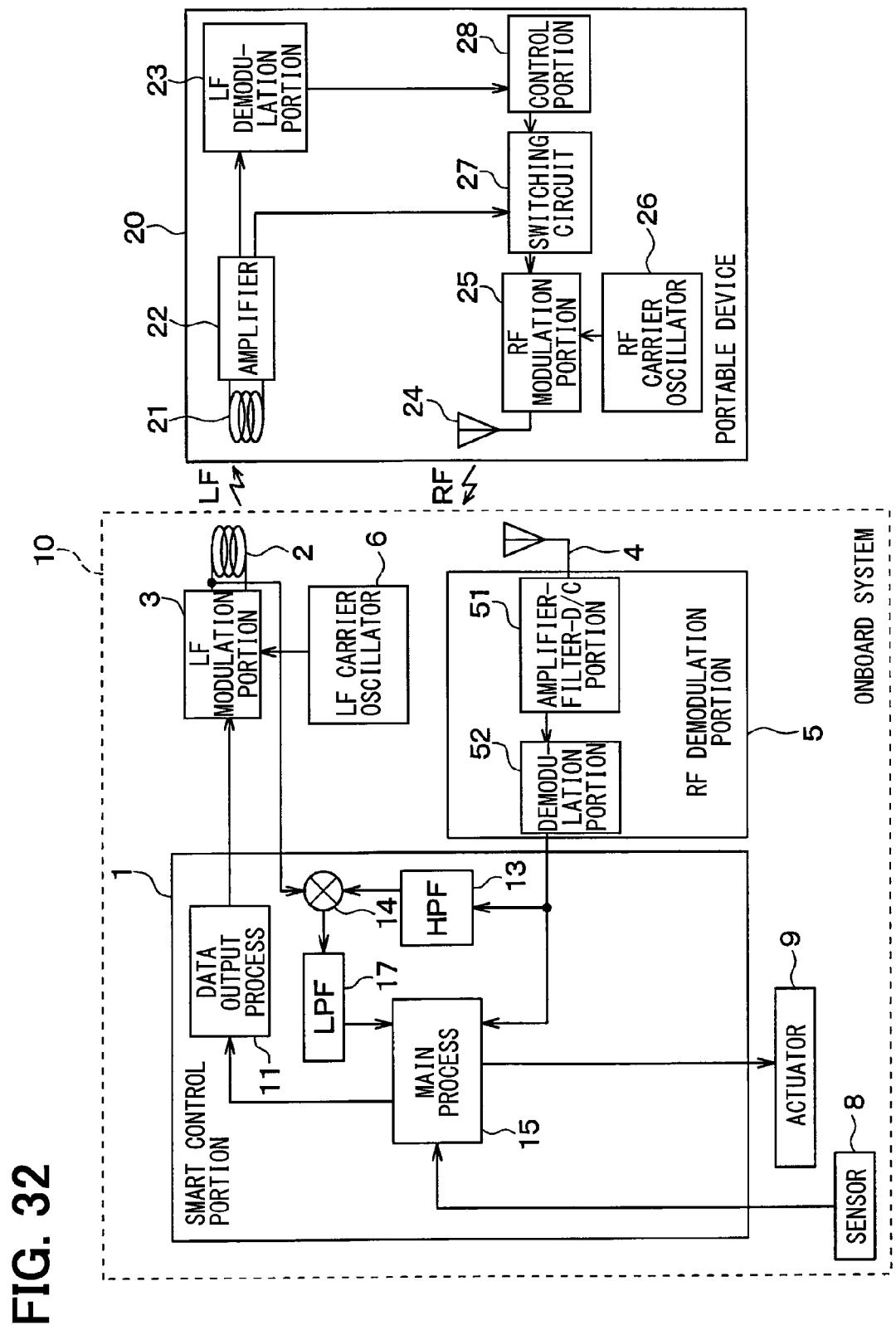
FIG. 32 is a configuration diagram illustrating a smart system according to a tenth embodiment.

The following describes the tenth embodiment of the disclosure. The embodiment changes the configuration of the onboard system 10 as illustrated in FIG. 32 compared to the sixth to eighth embodiments. The tenth embodiment will be described mainly with respect to differences from the sixth to eighth embodiments.

The configuration of the onboard system 10 according to the tenth embodiment differs from the configuration (see FIG. 25) of the onboard system 10 according to the sixth to eighth embodiments in that the multiplication process 14 is supplied with output from the LF modulation portion 3 instead of output from the data output process 11 and the LF demodulation process 12 is replaced by an LFP process 17. The configuration and operations of the portable device 20 are unchanged from the sixth to eighth embodiments.

Operation of the onboard system 10 according to the embodiment will be described mainly with respect to differences from the sixth through eighth embodiments. According to the embodiment, the LF modulation portion 3 modulates an LF carrier using data (e.g., the counter-RA data 42*d*) output from the data output process 11. A resulting signal (e.g., the counter-RA signal 42) is input to the multiplication process 14 of the smart control portion 1.

The multiplication process 14 multiplies the signal input from the LF modulation portion 3 by a signal input from the demodulation portion 52 and the HPF process 13. The multiplication process 14 inputs a signal resulting from the multiplication to the LPF process 17.

The LPF process 17 removes an unnecessary high-frequency band (higher than the LF band) from the signal input from the multiplication process 14. The main process 15 is supplied with the signal from which the unnecessary high-frequency band is removed.

The main process 15 is changed from the sixth to eighth embodiments (see FIGS. 26, 29, and 30) as follows according to the above-mentioned basic operations of the multiplication process 14 and the LPF process 17.

At S520 (S620 in the seventh embodiment), the smart control portion 1 acquires the LF-demodulated data from the LPF process 17 instead of acquiring the LF-demodulated data from the LF demodulation process 12.

The smart control portion 1 does not receive the counter-RA modulation signal 43 from the portable device 20 yet at time t21 (see FIG. 27) when the data acquisition started. The multiplication process 14 acquires the counter-RA signal 42 from the LF modulation portion 3 but acquires only data indicating 0 from the HPF process 13.

The multiplication process 14 supplies the LPF process 17 with the data that contains bits representing 0. Therefore, the data containing bits representing 0 is also input to the main process 15 from the LPF process 17.

At t22 (see FIG. 27), the RF demodulation portion 5 receives and RF-demodulates the counter-RA modulation signal 43 while the smart control portion 1 awaits completion of acquiring the RF-demodulated signal from the RF demodulation portion 5 at S535 (S635 in the seventh embodiment).

The RF-demodulated signal (corresponding to the counter-RA signal 42) is input to the HPF process 13. The HPF process 13 removes a high-frequency component (higher than the LF band) from the counter-RA signal 42. The multiplication process 14 is supplied with the counter-RA signal 42 whose high-frequency component is removed.

The multiplication process 14 multiplies the counter-RA signal 42 input from the LF modulation portion 3 by the counter-RA signal 42 input from the HPF process 13. As a result, the LPF process 17 is supplied with a signal comparable to the sum of a DC component signal corresponding to a phase difference comparable to a delay between the two counter-RA signals 42 and a carrier signal (sine wave signal) having a frequency double that of the counter-RA signal 42.

The LPF process 17 thereby removes the carrier signal having the frequency double that of the counter-RA signal 42 from the input signal and supplies the main process 15 with the DC component signal corresponding to the remaining phase difference. The DC component signal provides data of a string of bits representing 1 because the two the counter-RA signal 42 contains the phase difference. This state continues from time t22 to time t23 (see FIG. 27).

The LPF may be replaced by a set of the HPF and the AM demodulator That is, the HPF removes a DC component and the AM demodulator detects a frequency double that of the LF to generate data of a string of bits representing 1.

At time t23, the LF modulation portion 3 finishes outputting the counter-RA signal 42. Thereafter, the LF modulation portion 3 supplies the multiplication process 14 with a signal whose value (voltage value) is set to 0.

Therefore, the multiplication process 14 supplies the LPF process 17 with a multiplication result set to 0 though the HPF process 13 still inputs the counter-RA signal 42 to the multiplication process 14.

According to the above-mentioned configuration, the smart control portion 1 transmits counter-RA data 42d (counter-RA data contained in the counter-RA signal 42) to the portable device 20 at transmission timing t21. The smart control portion 1 receives counter-RA data 43d (counter-RA data contained in the returned counter-RA signal 42) from the portable device 20 at reception timing t22. Timing t22 follows timing t21 after delay time T. At S540 (S640 in the seventh embodiment), the smart control portion 1 calculates duration L according to an equation of L=X−T similarly to the sixth to eighth embodiments.

At S540 (S640 in the seventh embodiment), the smart control portion 1 calculates duration L during which the LPF process 17, not the LF demodulation portion 12, continues supplying the main process 15 with a string of bits representing 1.

According to the above-mentioned configuration, the determination at S545 (S645 in the seventh embodiment) similarly to the sixth to eighth embodiments can highly reliably confirm the presence or absence of relay station attack intervention similarly to the sixth to eighth embodiments. The main process 15 operates equally to the sixth to eighth embodiments except the above-mentioned.

The embodiment further decreases a variation in delay time T because the portable device 10 does not perform LF demodulation either.

Eleventh Embodiment

Figure 33:
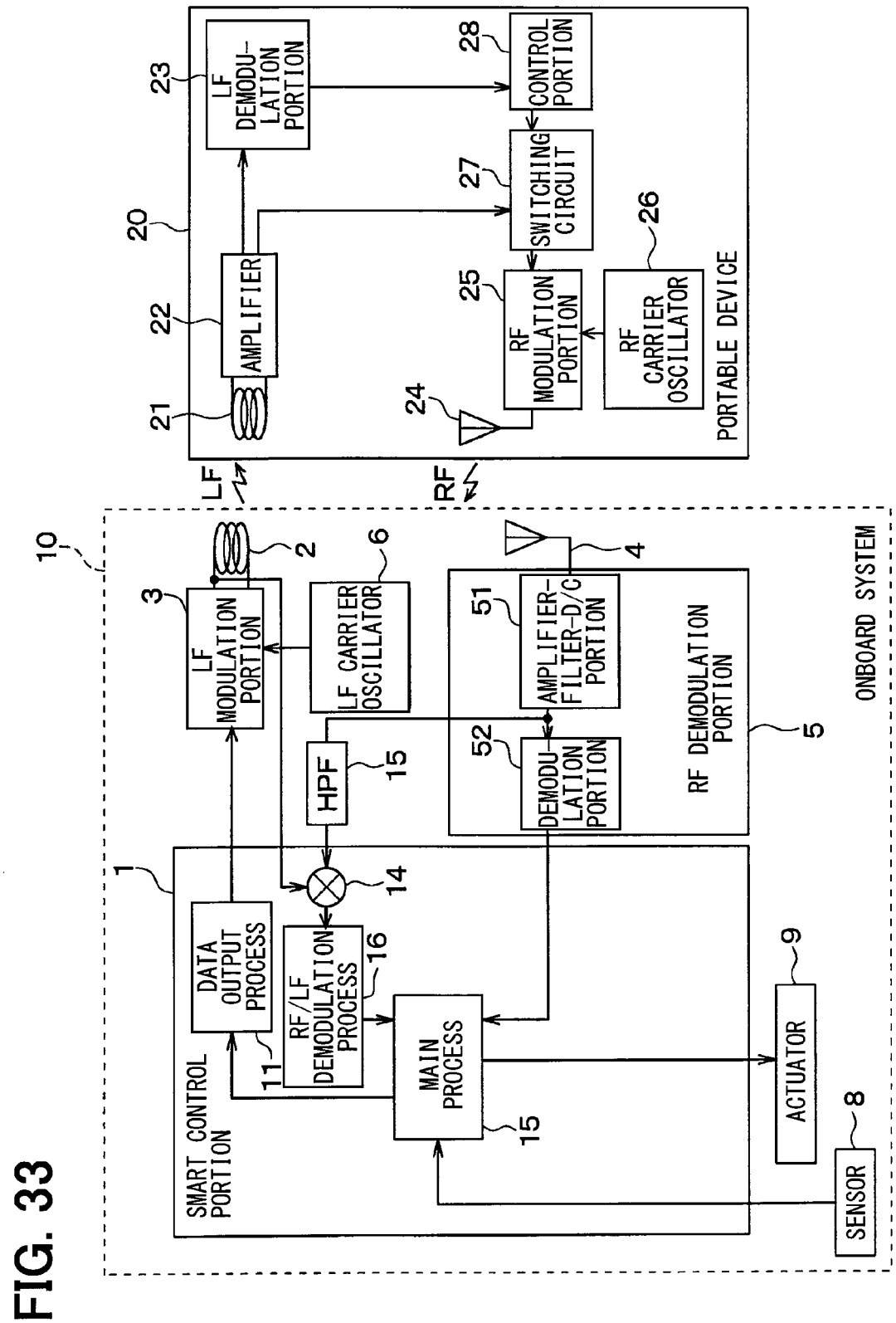
FIG. 33 is a configuration diagram illustrating a smart system according to an eleventh embodiment.

The following describes the eleventh embodiment of the disclosure. The embodiment changes the configuration of the onboard system 10 as illustrated in FIG. 33 compared to the sixth to eighth embodiments. The eleventh embodiment will be described mainly with respect to differences from the sixth to eighth embodiments.

The configuration of the onboard system 10 according to the eleventh embodiment differs from the configuration (see FIG. 25) of the onboard system 10 according to the sixth to eighth embodiments in that the HPF portion 15 is provided, the multiplication process 14 is supplied with output from the LF modulation portion 3 instead of output from the data output process 11, and the LF demodulation process 12 and the HPF process 13 are eliminated from the smart control portion 1, and the RF/LF demodulation process 16 is newly provided. The configuration and operations of the portable device 20 are unchanged from the sixth to eighth embodiments.

Operation of the onboard system 10 according to the embodiment will be described mainly with respect to differences from the sixth through eighth embodiments.

According to the embodiment, the RF reception antenna 4 in the RF demodulation portion 5 receives a signal (e.g., the counter-RA modulation signal 43). The amplifier-filter-D/C portion 51 amplifies the signal, filters its frequency, performs frequency down-conversion on the signal into an IF band (an intermediate frequency band or a band approximate to 300 kHz according to the embodiment). The counter-RA modulation signal 43 is input to the demodulation portion 52 and the HPF portion 15. The HPF portion 15 supplies the smart control portion 1 with the counter-RA modulation signal 43 whose unnecessary low frequency components (lower than the RF carrier frequency) are removed.

The signal input from the HPF portion 15 is input to the multiplication process 14 of the smart control portion 1. The LF modulation portion 3 modulates an LF carrier using the data (e.g., the counter-RA data 42d) output from the data output process 11. The resulting signal (e.g., the counter-RA signal 42) is input to the multiplication process 14 of the smart control portion 1.

The multiplication process 14 multiplies the signal input from the LF modulation portion 3 by the signal input from the HPF portion 15. The signal resulting from the multiplication is input to the RF/LF demodulation process 16.

The RF/LF demodulation process 16 RF-demodulates (demodulation using a carrier signal in the above-mentioned intermediate frequency band) the signal input from the multiplication process 14. The RF/LF demodulation process 16 LF-demodulates (demodulation using an LF-band carrier signal) the signal resulting from the RF demodulation. The RF/LF demodulation process 16 performs an LPF (low-pass filtering) process on data resulting from the LF demodulation and supplies the main process 15 with the signal after the LPF process.

The main process 15 is changed from the sixth to eighth embodiments (see FIGS. 26, 29, and 30) as follows according to the above-mentioned basic operations of the multiplication process 14, the HPF portion 15, and the RF/LF demodulation process 16.

At S520 (S620 in the seventh embodiment), the smart control portion 1 acquires the RF-demodulated and LF-demodulated data from the RF/LF demodulation process 16 instead of acquiring the LF-demodulated data from the LF demodulation process 12.

The smart control portion 1 does not receive the counter-RA modulation signal 43 from the portable device 20 yet at time t21 (see FIG. 27) when the data acquisition started. The multiplication process 14 acquires the counter-RA signal 42 from the LF modulation portion 3 but acquires only data indicating value 0 (voltage value) from the HPF portion 15.

The multiplication process 14 supplies the RF/LF demodulation process 16 with the data that contains bits representing 0. Therefore, the data containing bits representing 0 is also input to the main process 15 from the RF/LF demodulation process 16.

At t22 (see FIG. 27), the RF demodulation portion 5 receives and RF-demodulates the counter-RA modulation signal 43 while the smart control portion 1 awaits completion of acquiring the RF-demodulated signal from the RF demodulation portion 5 at S535 (S635 in the seventh embodiment).

The multiplication process 14 is supplied with an intermediate frequency band signal, namely, the counter-RA modulation signal 43 whose unnecessary low frequency components (lower than an intermediate-frequency carrier signal) are removed in the HPF portion 15.

The multiplication process 14 multiplies the counter-RA signal 42 input from the LF modulation portion 3 by the signal input from the HPF portion 15. Suppose that Fi denotes the frequency of the intermediate-frequency carrier signal and FI denotes the frequency of the counter-RA signal 42. The multiplication process multiplies the signal of frequency FI input from the LF modulation portion 3 by the signal of frequency Fi input from the HPF portion 15. As a result, a signal of frequency Fi±FI is input to the RF/LF demodulation process 16.

The RF/LF demodulation process 16 thereby selects one of the two frequencies by filtering. The RF/LF demodulation process 16 performs the RF demodulation, the LF demodulation, and the LPF process to supply the main process 15 with a bit string (corresponding to DC components) comparable to the counter-RA data 43*d*. This state continues from time t22 to time t23 (see FIG. 27).

At time t23, the LF modulation portion 3 finishes outputting the counter-RA signal 42. Thereafter, the LF modulation portion 3 supplies the multiplication process 14 with a signal whose value (voltage value) is set to 0.

Therefore, the multiplication process 14 supplies the RF/LF demodulation process 16 with a multiplication result set to 0 though the HPF portion 15 still inputs the intermediate frequency band signal to the multiplication process 14.

According to the above-mentioned configuration, the smart control portion 1 transmits counter-RA data 42*d* (counter-RA data contained in the counter-RA signal 42) to the portable device 20 at transmission timing t21. The smart control portion 1 receives counter-RA data 43*d* (counter-RA data contained in the returned counter-RA signal 42) from the portable device 20 at reception timing t22. Timing t22 follows timing t21 after delay time T. At S540 (S640 in the seventh embodiment), the smart control portion 1 calculates duration L according to an equation of L=X−T similarly to the sixth to eighth embodiments.

At S540 (S640 in the seventh embodiment), the smart control portion 1 calculates duration L during which the RF/LF demodulation process 16, not the LF demodulation portion 12, continues supplying the main process 15 with a signal (bit string) set to Hi.

According to the above-mentioned configuration, the determination at S545 (S645 in the seventh embodiment) similarly to the sixth to eighth embodiments can highly reliably confirm the presence or absence of relay station attack intervention similarly to the sixth to eighth embodiments. The main process 15 operates equally to the sixth to eighth embodiments except the above-mentioned.

Twelfth Embodiment

The following describes the twelfth embodiment of the disclosure mainly with respect to differences from the sixth through eighth embodiments. The twelfth embodiment modifies the contents of counter-RA data applicable to the sixth through eighth embodiments. According to the sixth through eighth embodiments, each of the counter-RA data 42*d* and 43*d* is data in which only bits representing 1 successively occur as illustrated in FIGS. 8 and 9.

Figure 34:
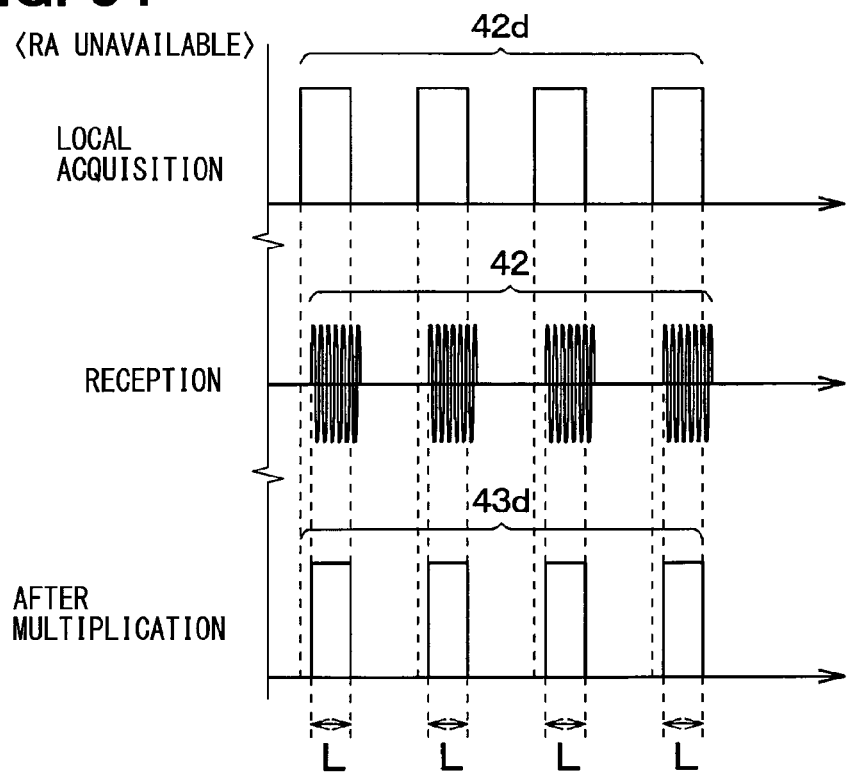
FIG. 34 illustrates time difference T in the absence of relay station attack according to a twelfth embodiment.
Figure 35:
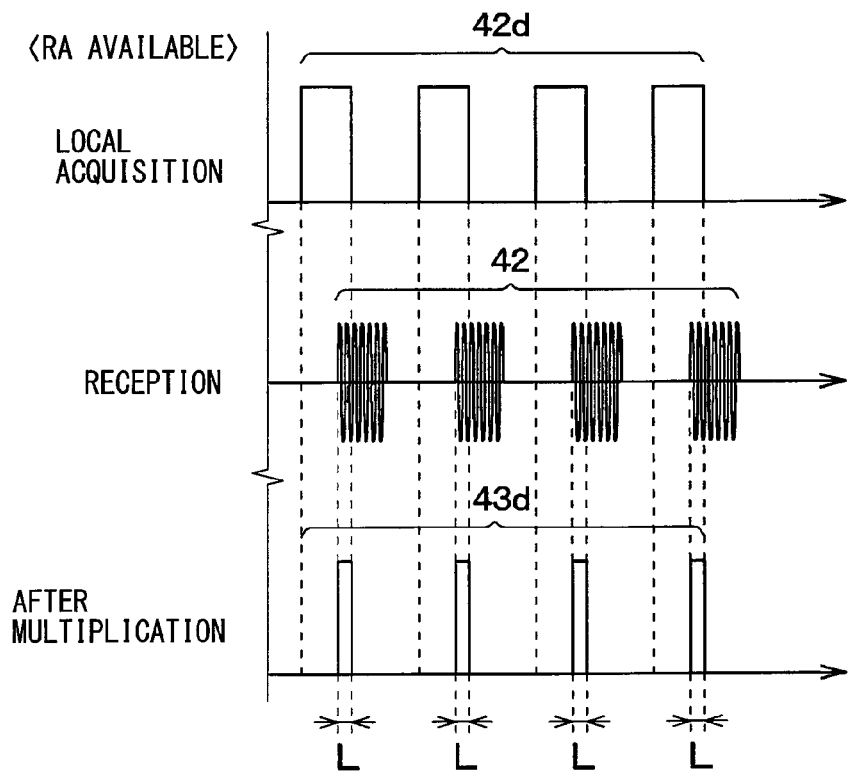
FIG. 35 illustrates time difference T in the absence of relay station attack according to the twelfth embodiment.
Figure 36:
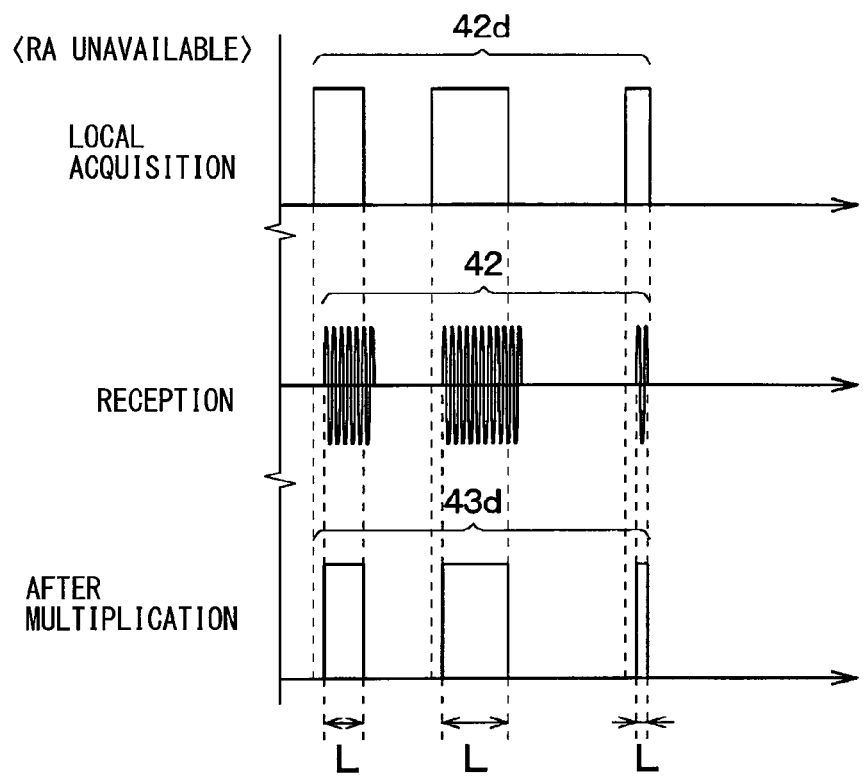
FIG. 36 illustrates time difference T in the absence of relay station attack according to a thirteenth embodiment.
Figure 37:
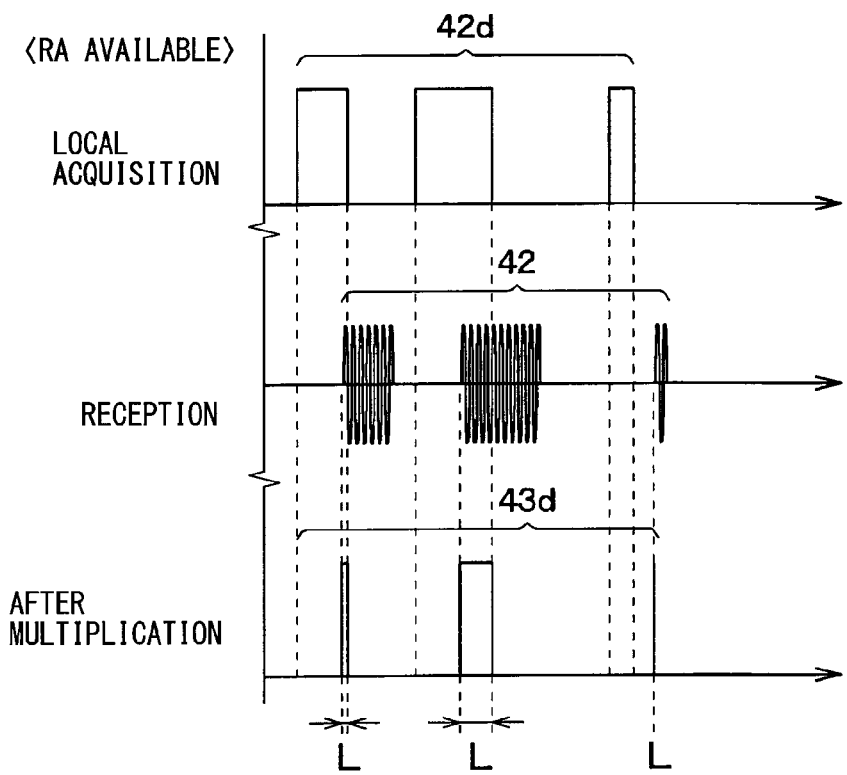
FIG. 37 illustrates time difference T in the absence of relay station attack according to the thirteenth embodiment.

As illustrated in FIGS. 34 and 35, the counter-RA data 42*d* according to the twelfth embodiment is not data in which only the bits representing 1 successively occurs, but is data in which a plurality of bits successively representing 1 and a plurality of bits successively representing 0 alternately occur. The successive number of bits representing 1 and the successive number of bits representing 0 are always constant in one piece of the counter-RA data.

Operation of the portable device 20 is unchanged if the above-mentioned counter-RA data is used. Regarding operation of the onboard system 10, the main process 15 performed by the smart control portion 1 differs from the sixth through eighth embodiments only in the contents of the process to calculate duration L (S540 in FIG. 26, S640 in FIG. 29, and S540 in FIG. 30) and the process to compare time difference T with reference time T0 (S545 in FIG. 26, S645 in FIG. 29, and S540 in FIG. 30).

Specifically, the sixth through eighth embodiments calculate duration L only based on the continuous time for a single string of the bits representing 1 acquired from the LF demodulation process 12.

As illustrated in FIGS. 34 and 35, the twelfth embodiment calculates multiple durations L for multiple bit strings representing 1 contained in the counter-RA data 42*d* and 43*d*. The comparison process determines whether average value L of the durations L is greater than reference duration L0.

Since an average value of the time differences corresponding to edges is used to determine the presence or absence of relay station attack intervention, the possibility of a determination error can be decreased even if an unexpected extraneous noise (pulse or impulse) overlaps the counter-RA modulation signal 43 during communication.

Thirteenth Embodiment

The following describes the thirteenth embodiment of the disclosure mainly with respect to differences from the sixth through eighth embodiments. The twelfth embodiment modifies the contents of counter-RA data applicable to the sixth through eighth embodiments. According to the sixth through eighth embodiments, each of the counter-RA data 42*d* and 43*d* is data in which only the bits representing 1 successively occurs as illustrated in FIGS. 8 and 9.

As illustrated in FIGS. 34 and 35, the counter-RA data 42*d* according to the thirteenth embodiment is not data in which only the bits representing 1 successively occurs, but is data in which a plurality of bits successively representing 1 and a plurality of bits successively representing 0 alternately occur. A successive number of the successive bits representing 1 and a successive number of the successive bits representing 0 are variable in one piece of the counter-RA data.

Operation of the portable device 20 is unchanged if the above-mentioned counter-RA data is used. Regarding operation of the onboard system 10, the main process 15 performed by the smart system 1 differs from the sixth through eighth embodiments only in the contents of the process to calculate duration L (S540 in FIG. 26, S640 in FIG. 29, and S540 in FIG. 30) and the process to compare time difference T with reference time T0 (S545 in FIG. 26, S645 in FIG. 29, and S540 in FIG. 30).

Specifically, the sixth through eighth embodiments calculate duration L only based on the continuous time for a single string the bits representing 1 acquired from the LF demodulation process 12.

As illustrated in FIGS. 34 and 35, the twelfth embodiment calculates multiple durations L for multiple bit strings representing 1 contained in the counter-RA data 42*d* and 43*d*. The comparison process determines whether average value L of the durations L is greater than reference duration L0.

Since an average value of the time differences corresponding to edges is used to determine the presence or absence of relay station attack intervention, the possibility of a determination error can be decreased even if an unexpected extraneous noise (pulse or impulse) overlaps the counter-RA modulation signal 43 during communication.

According to the embodiment, the number of successive bits representing 1 and the number of successive bits representing 0 are variable in one piece of the counter-RA data.

Since an average value of the time differences corresponding to edges with indefinite length or interval is used to determine the presence or absence of relay station attack intervention, the possibility of a determination error can be decreased even if a periodic extraneous noise (pulse or impulse) overlaps the counter-RA modulation signal 43 during communication.

According to the embodiment, the number of successive bits representing 1 and the number of successive bits representing 0 are variable in one piece of counter-RA data. Since an average value of the time differences corresponding to edges with indefinite length or interval is used to determine the presence or absence of relay station attack intervention, the possibility of a determination error can be decreased even if a periodic extraneous noise (pulse or impulse) overlaps the counter-RA modulation signal 43 during communication.

For example, the embodiment can prevent an RA determination error that may occur if multiple vehicles simultaneously receive a counter-RA modulation signal. Specifically, suppose the vehicle's onboard system 10 communicates with the portable device 20 for this vehicle and another vehicle's onboard system communicates with a portable device for this vehicle. The onboard system 10 receives the counter-RA modulation signal 43 (containing the counter-RA signal 42) from the portable device 20 and, at the same time, may receive a counter-RA modulation signal (containing the counter-RA signal) from the other vehicle's portable device. In such a case, these signals overlap with each other and may cause an error in calculation of time difference T.

By contrast, according to the embodiment, the above-mentioned counter-RA data is used and the counter-RA data contains the variable number of successive bits representing 1 and the variable number of successive bits representing 0 for each vehicle. There is a high possibility of preventing two signals from overlapping (correctly determining the presence or absence of relay station attack).

As a modification of the embodiment, the counter-RA data may contain an alternation of one bit representing 1 and successive bits representing 0. One piece of the counter-RA data may contain the variable number of successive bits representing 0.

According to the modification, the bit representing 1 is always followed by successive bits representing 0. The length of the bit representing 1 is shortened. This enables to accordingly reduce unfavorable effects on the other vehicles. The time length of the bit representing 1 is sufficiently longer than the system delay time (D1+D2 described in the first embodiment).

Fourteenth Embodiment

The following describes the fourteenth embodiment of the disclosure. According to the first through third embodiments described above, the onboard system 10 transmits request data and counter-RA data. In response, the portable device 20 returns the counter-RA modulation signal and the answer data. The smart drive is provided immediately after this. However, the disclosure is not limited thereto. For example, the smart drive may be provided after a communication procedure as illustrated in FIG. 38 is performed.

Figure 38:
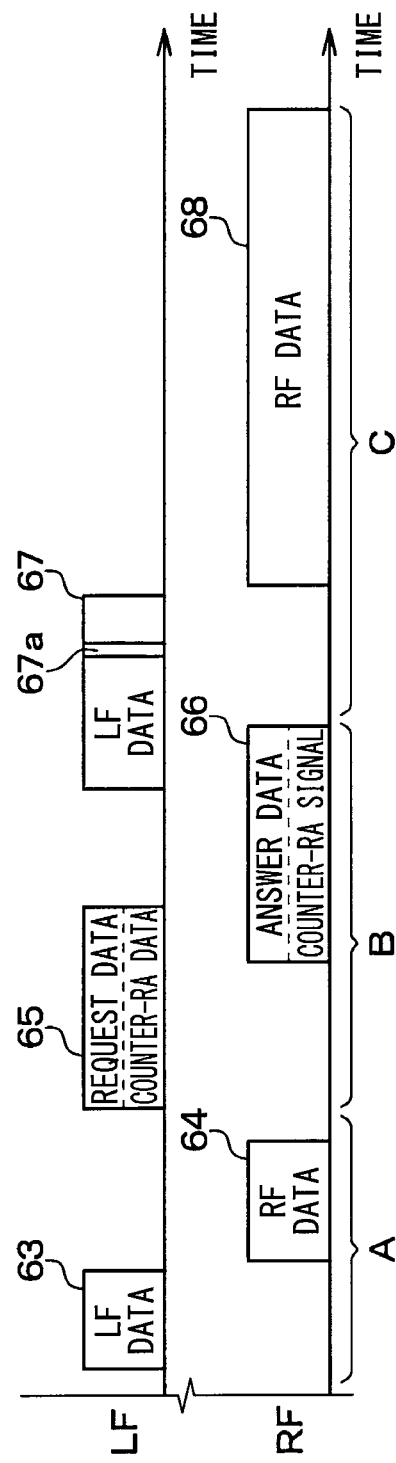
FIG. 38 illustrates a communication procedure of a smart system according to a fourteenth embodiment.
Figure 39:
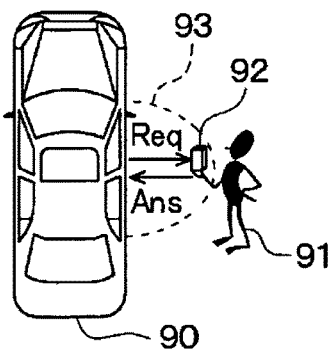
FIG. 39 illustrates an overview of a smart system according to a related art.
Figure 40:
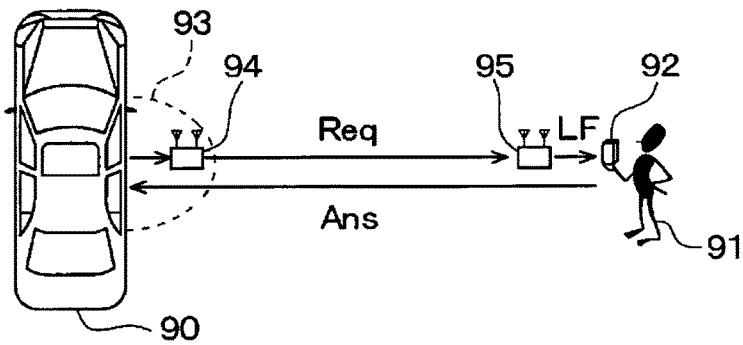
FIG. 40 is a schematic diagram illustrating operation of a smart system in the event of relay station attack intervention according to a related art.
Figure 41:
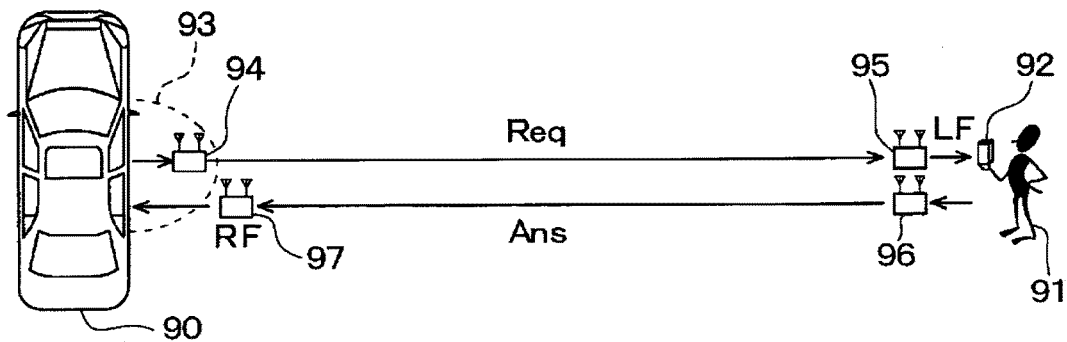
FIG. 41 is a schematic diagram illustrating operation of a smart system in the event of relay station attack intervention according to a related art.

Stage A of the procedure in FIG. 38 confirms whether the portable device 20 is available around the vehicle. The smart control portion 1 first outputs LF data to the LF modulation portion 3. The LF modulation portion 3 wirelessly transmits a first onboard signal 63 (several milliseconds long) containing the LF data. The portable device 20 wirelessly receives the first onboard signal 63 using the LF reception antenna 21, the amplifier 22, and the LF demodulation portion 23. The mobile control portion 28 acquires the LF data contained in the first onboard signal 63. Based on acquisition of the LF data, the mobile control portion 28 outputs RF data to the RF modulation portion 25. The RF modulation portion 25 thereby wirelessly transmits a first mobile signal 64 (several milliseconds long) containing the RF data. In the onboard system 10, the RF demodulation portion 5 wirelessly receives the first mobile signal 64. The smart control portion 1 acquires the RF data contained in the first mobile signal 64.

Stage B determines whether the onboard system 10 and the portable device 20 are authentic and whether the relay station attack occurs. Based on reception of the first mobile signal 64, the onboard system 10 wirelessly transmits a second onboard signal 65 (comparable to the request signal 41 and the counter-RA signal 42) containing the request data and the counter-RA data as described in the first through thirteenth embodiments. Based on wireless reception of the second onboard signal 65, the portable device 20 wirelessly transmits a second mobile signal 66 containing the answer signal 44 (containing the answer data) and the counter-RA modulation signal 43 (the modulated counter-RA signal 42). The onboard system 10 receives the second mobile signal 66. Based on the received second mobile signal 66, the onboard system 10 determines whether the relay station attack intervenes and the portable device 20 is authentic as described in the first through thirteenth embodiments.

Stage C performs authentication according to encryption. Based on the determination that the portable device 20 is authentic, the smart control portion 1 of the onboard system 10 outputs LF data for encryption authentication to the LF modulation portion 3. The LF modulation portion 3 wirelessly transmits a third onboard signal 67 (several tens of milliseconds long) containing the LF data. The LF data contains RA data 67a indicating the presence or absence of relay station attack intervention.

The portable device 20 wirelessly receives the third onboard signal 67 using the LF reception antenna 21, the amplifier 22, and the LF demodulation portion 23. The mobile control portion 28 acquires the LF data for encryption authentication contained in the third onboard signal 67.

When acquiring the LF data, the mobile control portion 28 determines based on the RA data 67a whether the relay station attack intervenes. The mobile control portion 28 performs a specified authentication process using the LF data if no intervention is determined (when the RA data indicates no relay station attack intervention). If the authentication succeeds, the mobile control portion 28 outputs RF data for authentication to the RF modulation portion 25. The RF modulation portion 25 thereby wirelessly transmits a third mobile signal 68 (several milliseconds long) containing the RF data. In the onboard system 10, the RF demodulation portion 5 wirelessly receives the third mobile signal 68. The smart control portion 1 performs authentication using the RF data contained in the third mobile signal 68. If the authentication succeeds, the smart control portion 1 performs the smart drive.

The mobile control portion 28 determines based on the RA data 17a whether the relay station attack intervenes. The mobile control portion 28 operates an alarm device (a light emitting device, a sound generation device, or a vibration device not illustrated) provided for the portable device 20 if the intervention is determined (when the RA data indicates the relay station attack intervention). The mobile control portion 28 notifies the user of the relay station attack intervention and does not transmit the third mobile signal 68 described above. This prevents the smart drive and notifies the relay station attack intervention to the user of the portable device 20. Providing stage C for authentication with transmission of the RA data 67a eliminates the need to increase the number of communications for notifying the user of relay station attack intervention.

According to the embodiment, the signals 65 and 66 exchanged at stage B include the counter-RA signal 42 (containing the counter-RA data) and the counter-RA modulation signal 43 (counter-RA signal 42) described in the first through fourteenth embodiments.

As another example, however, the signal 63 exchanged at stage A may include the counter-RA signal 42 and the signal 64 may include the counter-RA modulation signal 43. In this case, LF data in the signal 63 is comparable to the request data and RF data in the signal 64 is comparable to the answer data.

As still another example, however, the signal 67 exchanged at stage C may include the counter-RA signal 42 and the signal 68 may include the counter-RA modulation signal 43. In this case, LF data in the signal 67 is comparable to the request data and RF data in the signal 68 is comparable to the answer data.

The RF modulation portion 25 of the portable device 20 enters the sleep state when the portable device 20 receives the signal 63 if the counter-RA signal 42 and the counter-RA modulation signal 43 are contained in the signals 63 and 64 exchanged at stage A. This is because the RF modulation portion 25 consumes less power than the normal state and therefore enters the sleep state incapable of communication when the portable device 20 receives no signal for a specified time (sufficiently longer than the total time of stages A, B, and C described above) or longer.

The portable device 20 may receive the signal 63 when the RF modulation portion 25 of the portable device 20 remains the sleep state. The RF modulation portion 25 then tries to wake up and return to the normal state. However, returning to the normal state consumes the time and increases the delay time.

According to the embodiment, the signals 65 and 66 exchanged at stage B include the counter-RA signal 42 and the counter-RA modulation signal 43. The signals 67 and 68 exchanged at stage C include the counter-RA signal 42 and the counter-RA modulation signal 43. The RF modulation portion 25 already returns to the normal state (to enable the communication) when the portable device 20 receives the counter-RA signal 42. The delay time does not increase due to the wake-up operation.

The signals 63 and 64 exchanged at stage A may include the counter-RA signal 42 and the counter-RA modulation signal 43. Also in this case, the delay time does not increase due to the wake-up operation if the onboard system 10 transmits the counter-RA signal 42 after the RF modulation portion 25 wakes up and returns to the normal state.

According to the embodiment, the portable device 20 performs S235, S275, and S430 to illustratively function as an answer data output portion. The portable device 20 performs S170 and S370 to illustratively function as a smart drive portion. The portable device 20 performs S145, S345, S545, and S645 to illustratively function as an RA determination portion.

Other Embodiments

While there have been described specific preferred embodiments of the present disclosure, the scope of the disclosure is not limited thereto but may include various modes that may embody the function of each specific matter described in the disclosure. For example, the following modes may be allowable.

(1) According to the above-mentioned embodiments, ASK is used as the modulation system (comparable to an example of first modulation system) for the LF modulation portion 3 and as demodulation system (comparable to an example of first demodulation system) for the LF demodulation portion 23. The modulation system for the LF modulation portion 3 and the demodulation system for the LF demodulation portion 23 are not limited to ASK but may use any of AM, FM, PM, ASK, FSK, and PSK. Any of the systems can solve the problem that occurs even if the system is used. When the configuration in FIG. 33 is used, however, only ASK can solve the problems of the disclosure.

(2) In the sixth through thirteenth embodiments, the multiplication process 14 may be embodied as a multiplication circuit to handle analog signals. A DBM (Double Balanced Mixer) may be used as such multiplication circuit.

In each of the above-mentioned embodiments, the multiplication process 14 may be embodied as an analog circuit to handle analog signals similarly to the other processes (namely, the LF demodulation process 12, the HPF process 13, the RF/LF demodulation process 16, and the LPF process 17) than the data output process 11 and the main process 15 in the smart control portion 1.

(3) The counter-RA data 42d according to the twelfth and thirteenth embodiments is applicable to the ninth to eleventh embodiments as well as the sixth to eighth embodiments.

(4) The function of the switching circuit 27 may be incorporated into the mobile control portion 28.

(5) The HPF process 13 and the HPF portion 15 in the above-mentioned embodiments also provide an effect of removing a signal (corresponding to normal data such as FM modulation) from the other portable devices. A BB signal to be transmitted in the RF band is set to approximately 1 kbps and uses a frequency of approximately 100 kHz in the LF band. The HPF may be set to a cutoff frequency that removes 1 kbps.

(6) In the above-mentioned embodiments, the data output process 11, the LF demodulation process 12, the HPF process 13, the multiplication process 14, and the main process 15 may be also understood as the data output process portion 11, the LF demodulation process portion 12, the HPF process portion 13, the multiplication process portion 14, and the main process portion 15, respectively. The RF/LF demodulation process 16 and the LPF process 17 may be also understood as the RF/LF demodulation process portion 16 and the LPF process portion 17, respectively.

While there has been described the specific preferred embodiment and configurations of the present disclosure, it is to be distinctly understood that the disclosure is not limited thereto but may be otherwise variously embodied within the spirit and scope of the disclosure. The disclosure is supposed to include various modified examples and modifications within the applicable scope. It is also understood that the scope of the disclosure and the general inventive concept thereof cover preferred combinations and forms or the other combinations and forms including only one element or more or less than the same.

What is claimed is:

1. A smart system comprising an onboard system and a portable device carried by a user,
wherein the onboard system includes:
a first modulation portion that performs modulation in a first modulation system using specified request data; and
a first transmission antenna that transmits a request signal resulting from the modulation to the portable device;
wherein the portable device includes:
a first reception antenna that receives the request signal;
a first demodulation portion that performs demodulation in a first demodulation system corresponding to the first modulation system using the request signal received by the first reception antenna;
an answer data output portion that outputs specified answer data based on acquisition of the request data resulting from demodulation in the first demodulation portion;
a switching portion that outputs the output answer data for transmission;
a second modulation portion that performs modulation in a second modulation system using the answer data for transmission output from the switching portion; and
a second transmission antenna that transmits an answer signal resulting from the modulation to the onboard system;
wherein the onboard system includes a smart drive portion that receives the answer signal and performs smart drive to operate an actuator in the vehicle based on the answer data contained in the received answer signal;
wherein the first modulation portion performs modulation using specified counter-RA data according to the first modulation system and the first transmission antenna transmits a counter-RA signal resulting from the modulation to the portable device;
wherein the first reception antenna receives the transmitted counter-RA signal;
wherein, when the first reception antenna receives the counter-RA signal, the switching portion outputs the counter-RA signal received by the first reception antenna to the second modulation portion while bypassing the first demodulation portion to avoid demodulation of the counter-RA signal in the first demodulation system by the first demodulation portion;
wherein the second modulation portion performs modulation according to the second modulation system using the counter-RA signal that has bypassed the first demodulation portion;
wherein the second transmission antenna transmits a counter-RA modulation signal resulting from the modulation of the counter-RA signal to the onboard system; and
wherein the onboard system includes an RA determination portion that determines whether to allow the smart drive performed by the smart drive portion based on delay time of timing to receive the counter-RA modulation signal with reference to timing to transmit the counter-RA signal.

2. The smart system according to claim 1,
wherein the request data is data in which only bits representing 1 successively occurs.

3. The smart system according to claim 1,
wherein the counter-RA data is data in which a plurality of successive bits representing 1 and a plurality of successive bits representing 0 alternately occur; and
wherein a successive number of the plurality of successive bits representing 1 is constant and a successive number of the plurality of successive bits representing 0 is constant, in one piece of the counter-RA data.

4. The smart system according to claim 1,
wherein the counter-RA data is data in which at least one bit representing 1 and a plurality of successive bits representing 0 alternately occur; and
wherein a successive number of the plurality of successive bits representing 0 is not constant, in one piece of the counter-RA data.

5. The smart system according to claim 4,
wherein the counter-RA data is data in which one bit representing 1 and a plurality of successive bits representing 0 alternately occur; and
wherein a successive number of the successive bits representing 0 is not constant, in one piece of the counter-RA data.

6. The smart system according to claim 1,
wherein the onboard system transmits the request signal and thereafter transmits the counter-RA signal; and
wherein, based on completion of receiving the request signal, the portable device starts transmitting the counter-RA modulation signal based on the counter-RA signal, finishes transmitting the counter-RA modulation signal, and thereafter transmits the answer signal.

7. The smart system according to claim 1,
wherein the onboard system transmits the counter-RA signal after transmitting the request signal;
wherein, based on completion of receiving the request signal, the portable device starts transmitting the counter-RA modulation signal based on the counter-RA signal;
wherein, during transmission of the counter-RA modulation signal, the portable device determines whether the request data contained in the request signal is authentic;
wherein the portable device transmits the answer signal when determining that the data is authentic; and
wherein the portable device does not transmit the answer signal when determining that the data is unauthentic.

8. The smart system according to claim 1,
wherein the onboard system transmits the counter-RA signal and thereafter transmits the request signal; and
wherein the portable device transmits the counter-RA modulation signal based on the counter-RA signal, receives the request signal, and thereafter transmits the answer signal.

9. The smart system according to claim 1,
wherein the onboard system transmits the request signal, waits for at least a time period required for the portable device to determine whether request data contained in request signal is authentic, and thereafter transmits the counter-RA signal;
wherein the portable device receives the request signal and thereafter determines whether the request data contained in the request signal is authentic;
wherein the portable device transmits the answer signal when determining that the data is authentic; and
wherein the portable device does not transmit the answer signal when determining that the data is unauthentic.

10. The smart system according to claim 1,
wherein, when receiving the counter-RA modulation signal, the onboard system demodulates the counter-RA modulation signal according to a demodulation system corresponding to a second demodulation system, demodulates a signal resulting from the demodulation according to the first demodulation system using an input impedance higher than the first modulation portion, and calculates delay time of timing to receive the counter-RA modulation signal with reference to timing to transmit the counter-RA signal based on a signal resulting from the demodulation.

* * * * *